(12) United States Patent
Takahata et al.

(10) Patent No.: US 12,542,003 B2
(45) Date of Patent: Feb. 3, 2026

(54) PERSONAL AUTHENTICATION SYSTEM, PERSONAL AUTHENTICATION DEVICE, AND PERSONAL AUTHENTICATION METHOD

(71) Applicant: Magnolia White Corporation, Tokyo (JP)

(72) Inventors: Masashi Takahata, Tokyo (JP); Gang Shao, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 407 days.

(21) Appl. No.: 18/131,507

(22) Filed: Apr. 6, 2023

(65) Prior Publication Data

US 2023/0326255 A1    Oct. 12, 2023

(30) Foreign Application Priority Data

Apr. 11, 2022 (JP) ................................ 2022-065317

(51) Int. Cl.
*G06V 40/70* (2022.01)
*G06V 40/12* (2022.01)
*G06V 40/13* (2022.01)

(52) U.S. Cl.
CPC .......... *G06V 40/70* (2022.01); *G06V 40/1306* (2022.01); *G06V 40/1347* (2022.01); *G06V 40/1365* (2022.01)

(58) Field of Classification Search
CPC .............. G06V 40/70; G06V 40/1306; G06V 40/1347; G06V 40/1365; G06V 40/1335; G06V 40/53; G06V 10/267; G06V 40/12; G06F 21/32
See application file for complete search history.

(56) References Cited

U.S. PATENT DOCUMENTS

| | | | | |
|---|---|---|---|---|
| 2001/0002933 | A1* | 6/2001 | Satoh | G06V 40/1365 382/124 |
| 2018/0225494 | A1* | 8/2018 | Rhee | G06V 40/1365 |
| 2019/0238891 | A1* | 8/2019 | Heo | H04N 19/86 |
| 2021/0165987 | A1* | 6/2021 | Kim | G06V 40/50 |

FOREIGN PATENT DOCUMENTS

JP         2006-085559 A         3/2006

* cited by examiner

*Primary Examiner* — Wassim Mahrouka
(74) *Attorney, Agent, or Firm* — K&L Gates LLP

(57) ABSTRACT

According to an aspect, a personal authentication system is configured to execute fingerprint authentication processing by collating a first fingerprint image registered at fingerprint registration with a second fingerprint image acquired at personal authentication. The personal authentication system includes: a detection device configured to detect a touch position on a sensor and fingerprint data; and a control device configured to generate the first fingerprint image based on fingerprint data acquired at the fingerprint registration, segment the first fingerprint image into a plurality of first segmented images, and register the first segmented images.

22 Claims, 42 Drawing Sheets

FIG.3A
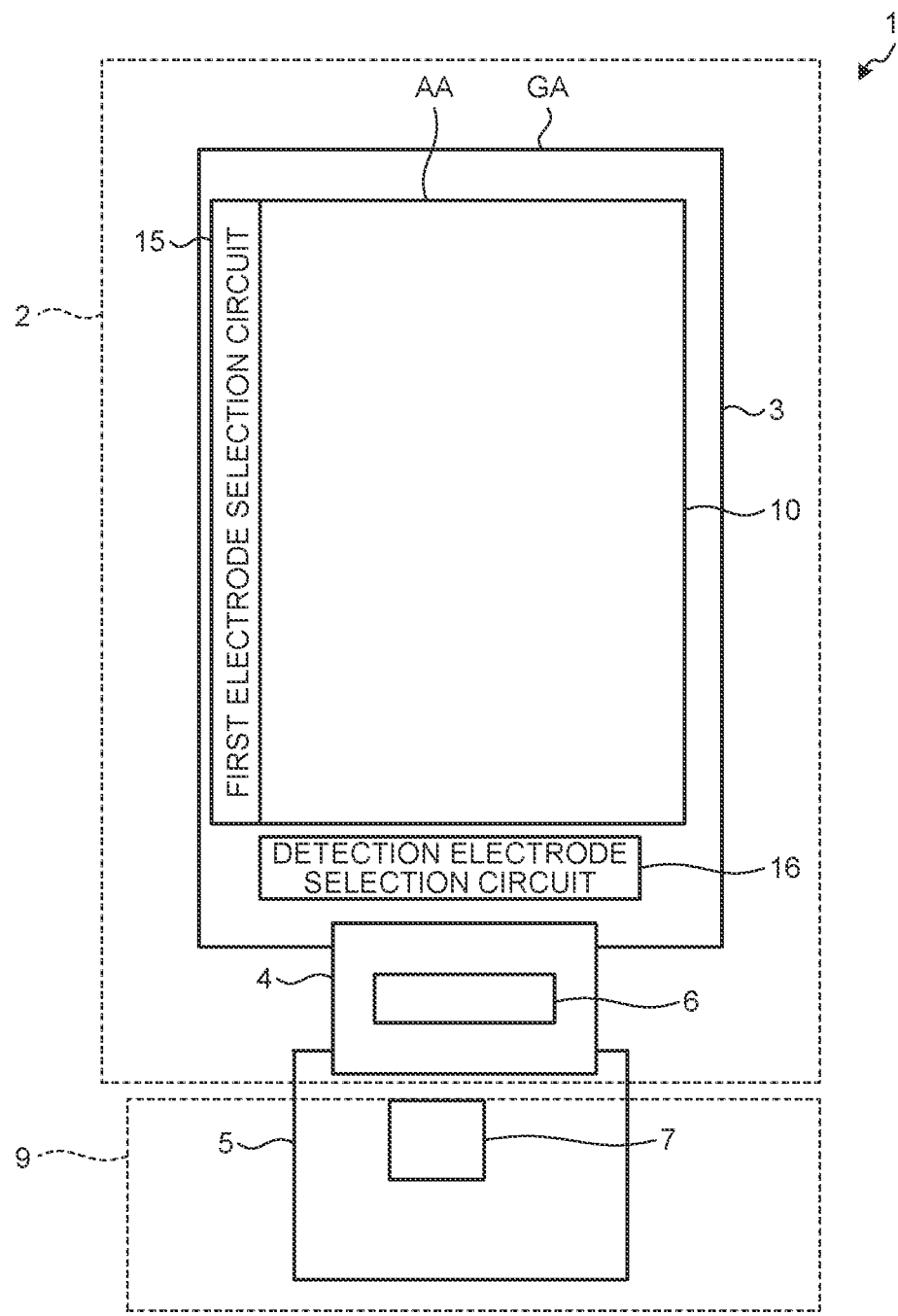
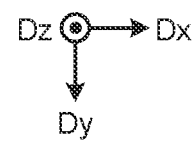

FIG.3B
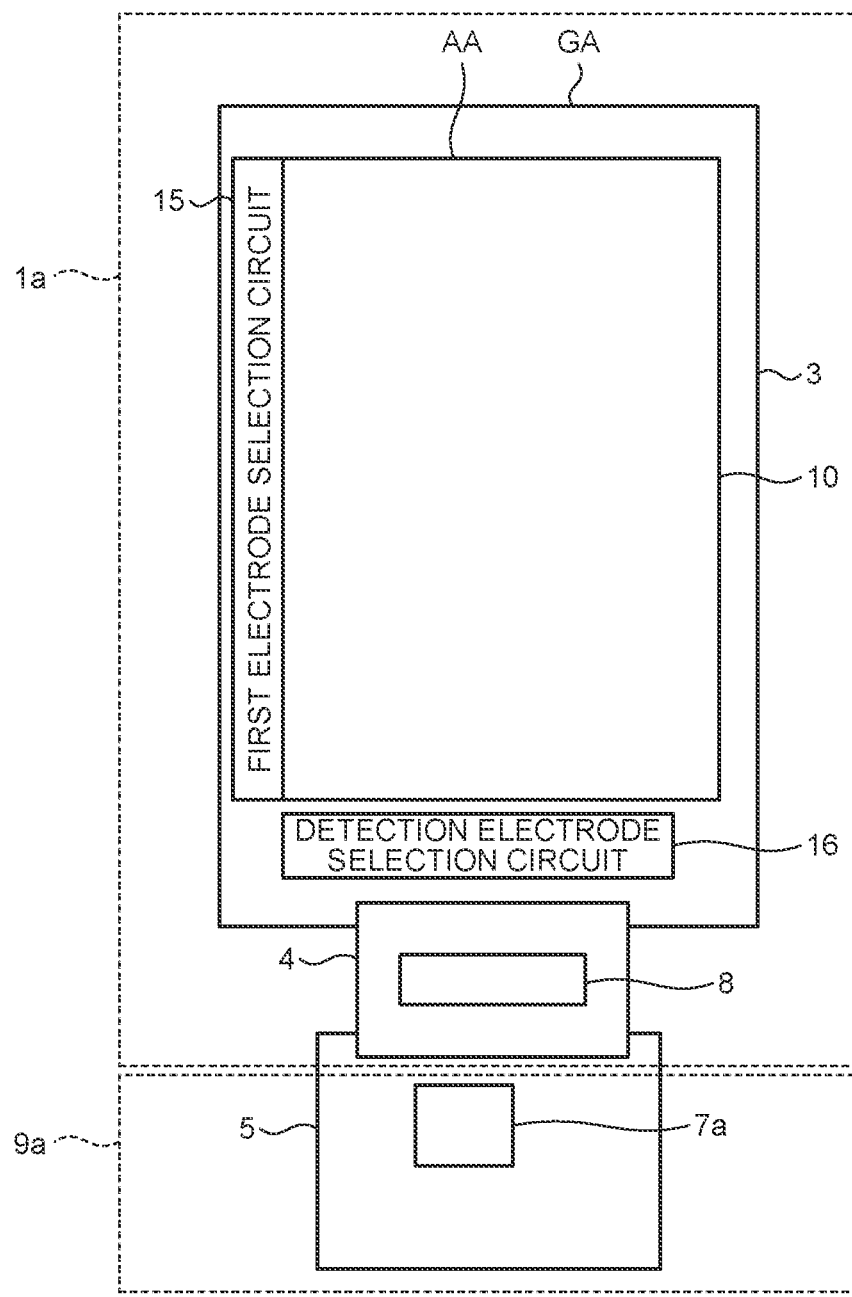
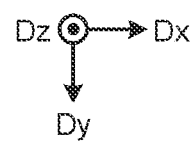

FIG.14
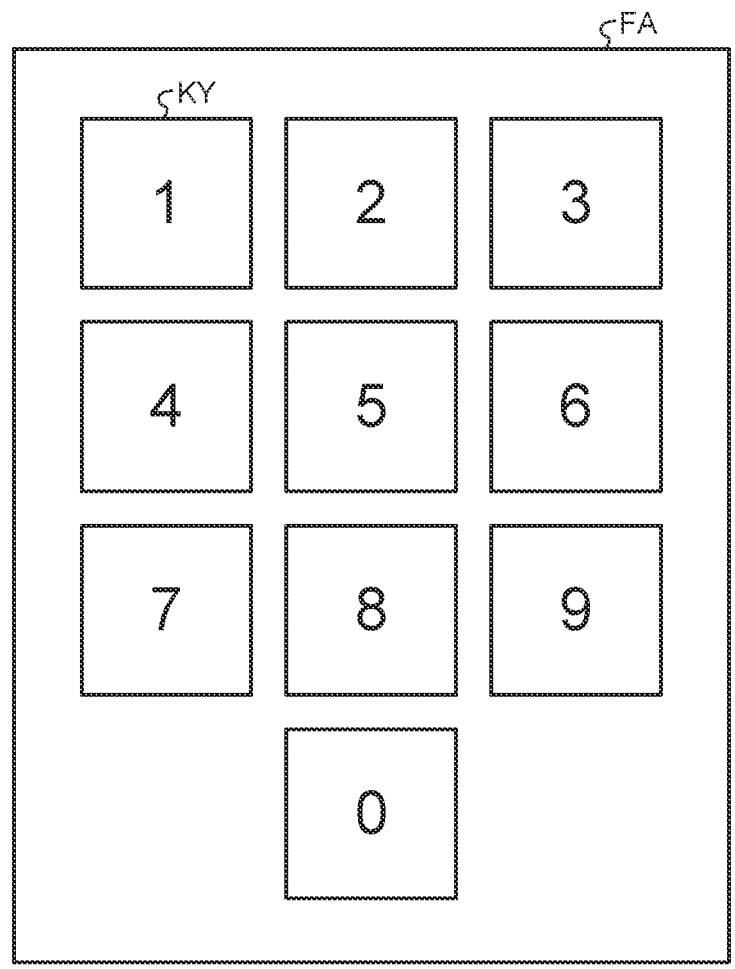
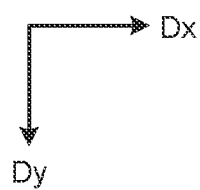

FIG.17
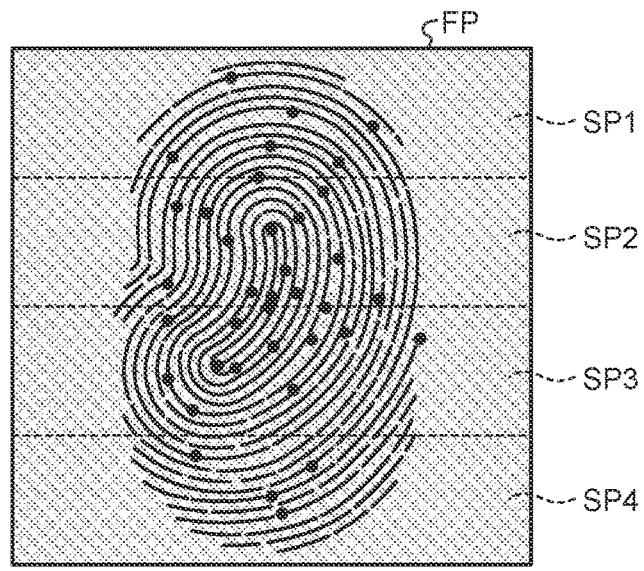
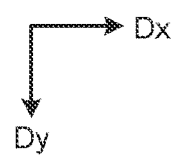
FIG.18
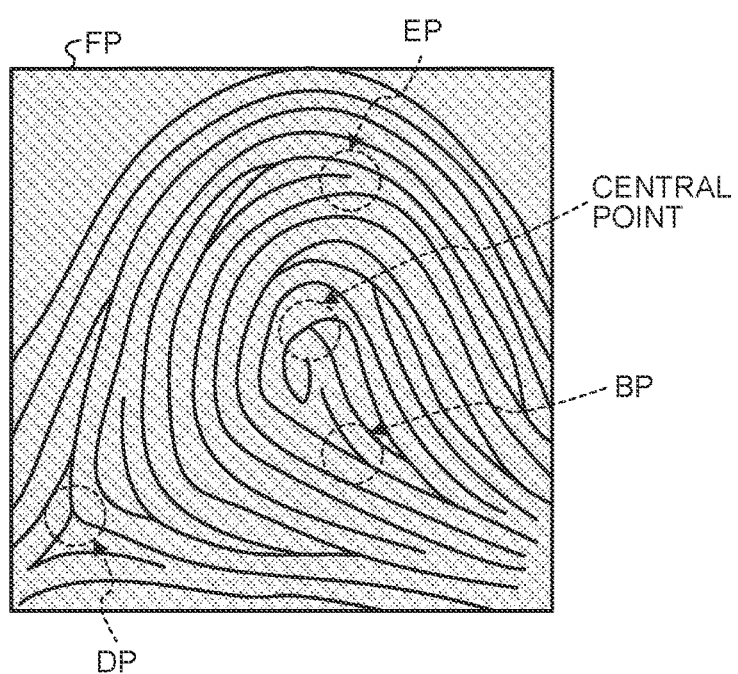

| SEGMENTED REGION | NUMBER OF FEATURE POINTS |
|---|---|
| SF1 | 6 |
| SF2 | 14 |
| SF3 | 13 |
| SF4 | 4 |

| SEGMENTED IMAGE | SEGMENTATION PATTERN (M_s_o) 3_1_1 | | SEG-MENTED IMAGE | SEGMENTATION PATTERN (M_s_o) 3_1_2 | | SEG-MENTED IMAGE | SEGMENTATION PATTERN (M_s_o) 3_1_3 | |
|---|---|---|---|---|---|---|---|---|
| SP1 | 86 | A | SP1 | 86 | A | SP1 | 84 | B |
| SP2 | 86 | A | SP2 | 84 | B | SP2 | 86 | A |
| SP3 | 84 | B | SP3 | 86 | A | SP3 | 86 | A |

| SEGMENTED IMAGE | SEGMENTATION PATTERN (M_s_o) | | | | | | | | | | |
|---|---|---|---|---|---|---|---|---|---|---|---|
| | 4_1_1 | 4_2_1 | 4_3_1 | 4_4_1 | 4_5_1 | 4_6_1 | 4_7_1 | 4_8_1 | 4_9_1 | 4_10_1 | |
| SP1 | 86 | 82 | 82 | 78 | 78 | 74 | 74 | 70 | 70 | 66 | A |
| SP2 | 64 | 66 | 64 | 66 | 64 | 68 | 64 | 68 | 64 | 64 | B |
| SP3 | 64 | 66 | 64 | 66 | 64 | 68 | 64 | 68 | 64 | 64 | B |
| SP4 | 42 | 42 | 46 | 46 | 50 | 46 | 54 | 50 | 58 | 62 | C |

| SEGMENTED IMAGE | SEGMENTATION PATTERN (M_s_o) | | | | | | | | | | |
|---|---|---|---|---|---|---|---|---|---|---|---|
| | 4_1_2 | 4_2_2 | 4_3_2 | 4_4_2 | 4_5_2 | 4_6_2 | 4_7_2 | 4_8_2 | 4_9_2 | 4_10_2 | |
| SP1 | 86 | 82 | 82 | 78 | 78 | 74 | 74 | 70 | 70 | 66 | A |
| SP2 | 64 | 66 | 64 | 66 | 64 | 68 | 64 | 68 | 64 | 64 | B |
| SP3 | 42 | 42 | 46 | 46 | 50 | 46 | 54 | 50 | 58 | 62 | C |
| SP4 | 64 | 66 | 64 | 66 | 64 | 68 | 64 | 68 | 64 | 64 | B |

| SEGMENTED IMAGE | SEGMENTATION PATTERN (M_s_o) | | | | | | | | | | |
|---|---|---|---|---|---|---|---|---|---|---|---|
| | 4_1_3 | 4_2_3 | 4_3_3 | 4_4_3 | 4_5_3 | 4_6_3 | 4_7_3 | 4_8_3 | 4_9_3 | 4_10_3 | |
| SP1 | 86 | 82 | 82 | 78 | 78 | 74 | 74 | 70 | 70 | 66 | A |
| SP2 | 42 | 42 | 46 | 46 | 50 | 46 | 54 | 50 | 58 | 62 | C |
| SP3 | 64 | 66 | 64 | 66 | 64 | 68 | 64 | 68 | 64 | 64 | B |
| SP4 | 64 | 66 | 64 | 66 | 64 | 68 | 64 | 68 | 64 | 64 | B |

| SEGMENTED IMAGE | SEGMENTATION PATTERN (M_s_o) | | | | | | | | | | |
|---|---|---|---|---|---|---|---|---|---|---|---|
| | 4_1_4 | 4_2_4 | 4_3_4 | 4_4_4 | 4_5_4 | 4_6_4 | 4_7_4 | 4_8_4 | 4_9_4 | 4_10_4 | |
| SP1 | 64 | 66 | 64 | 66 | 64 | 68 | 64 | 68 | 64 | 64 | B |
| SP2 | 86 | 82 | 82 | 78 | 78 | 74 | 74 | 70 | 70 | 66 | A |
| SP3 | 64 | 66 | 64 | 66 | 64 | 68 | 64 | 68 | 64 | 64 | B |
| SP4 | 42 | 42 | 46 | 46 | 50 | 46 | 54 | 50 | 58 | 62 | C |

| SEGMENTED IMAGE | SEGMENTATION PATTERN (M_s_o) | | | | | | | | | | |
|---|---|---|---|---|---|---|---|---|---|---|---|
| | 4_1_5 | 4_2_5 | 4_3_5 | 4_4_5 | 4_5_5 | 4_6_5 | 4_7_5 | 4_8_5 | 4_9_5 | 4_10_5 | |
| SP1 | 64 | 66 | 64 | 66 | 64 | 68 | 64 | 68 | 64 | 64 | B |
| SP2 | 64 | 66 | 64 | 66 | 64 | 68 | 64 | 68 | 64 | 64 | B |
| SP3 | 86 | 82 | 82 | 78 | 78 | 74 | 74 | 70 | 70 | 66 | A |
| SP4 | 42 | 42 | 46 | 46 | 50 | 46 | 54 | 50 | 58 | 62 | C |

| SEGMENTED IMAGE | SEGMENTATION PATTERN (M_s_o) | | | | | | | | | | |
|---|---|---|---|---|---|---|---|---|---|---|---|
| | 4_1_6 | 4_2_6 | 4_3_6 | 4_4_6 | 4_5_6 | 4_6_6 | 4_7_6 | 4_8_6 | 4_9_6 | 4_10_6 | |
| SP1 | 64 | 66 | 64 | 66 | 64 | 68 | 64 | 68 | 64 | 64 | B |
| SP2 | 64 | 66 | 64 | 66 | 64 | 68 | 64 | 68 | 64 | 64 | B |
| SP3 | 42 | 42 | 46 | 46 | 50 | 46 | 54 | 50 | 58 | 62 | C |
| SP4 | 86 | 82 | 82 | 78 | 78 | 74 | 74 | 70 | 70 | 66 | A |

| SEGMENTED IMAGE | SEGMENTED IMAGE (M_s_o) | | | | | | | | | | |
|---|---|---|---|---|---|---|---|---|---|---|---|
| | 4_1_7 | 4_2_7 | 4_3_7 | 4_4_7 | 4_5_7 | 4_6_7 | 4_7_7 | 4_8_7 | 4_9_7 | 4_10_7 | |
| SP1 | 64 | 66 | 64 | 66 | 64 | 68 | 64 | 68 | 64 | 64 | B |
| SP2 | 42 | 42 | 46 | 46 | 50 | 46 | 54 | 50 | 58 | 62 | C |
| SP3 | 64 | 66 | 64 | 66 | 64 | 68 | 64 | 68 | 64 | 64 | B |
| SP4 | 86 | 82 | 82 | 78 | 78 | 74 | 74 | 70 | 70 | 66 | A |

| SEGMENTED IMAGE | SEGMENTED IMAGE (M_s_o) | | | | | | | | | | |
|---|---|---|---|---|---|---|---|---|---|---|---|
| | 4_1_8 | 4_2_8 | 4_3_8 | 4_4_8 | 4_5_8 | 4_6_8 | 4_7_8 | 4_8_8 | 4_9_8 | 4_10_8 | |
| SP1 | 64 | 66 | 64 | 66 | 64 | 68 | 64 | 68 | 64 | 64 | B |
| SP2 | 42 | 42 | 46 | 46 | 50 | 46 | 54 | 50 | 58 | 62 | C |
| SP3 | 86 | 82 | 82 | 78 | 78 | 74 | 74 | 70 | 70 | 66 | A |
| SP4 | 64 | 66 | 64 | 66 | 64 | 68 | 64 | 68 | 64 | 64 | B |

| SEGMENTED IMAGE | SEGMENTATION PATTERN (M_s_o) | | | | | | | | | | |
|---|---|---|---|---|---|---|---|---|---|---|---|
| | 4_1_9 | 4_2_9 | 4_3_9 | 4_4_9 | 4_5_9 | 4_6_9 | 4_7_9 | 4_8_9 | 4_9_9 | 4_10_9 | |
| SP1 | 42 | 42 | 46 | 46 | 50 | 46 | 54 | 50 | 58 | 62 | C |
| SP2 | 86 | 82 | 82 | 78 | 78 | 74 | 74 | 70 | 70 | 66 | A |
| SP3 | 64 | 66 | 64 | 66 | 64 | 68 | 64 | 68 | 64 | 64 | B |
| SP4 | 64 | 66 | 64 | 66 | 64 | 68 | 64 | 68 | 64 | 64 | B |

| SEGMENTED IMAGE | SEGMENTATION PATTERN (M_s_o) | | | | | | | | | | |
|---|---|---|---|---|---|---|---|---|---|---|---|
| | 4_1_10 | 4_2_10 | 4_3_10 | 4_4_10 | 4_5_10 | 4_6_10 | 4_7_10 | 4_8_10 | 4_9_10 | 4_10_10 | |
| SP1 | 42 | 42 | 46 | 46 | 50 | 46 | 54 | 50 | 58 | 62 | C |
| SP2 | 64 | 66 | 64 | 66 | 64 | 68 | 64 | 68 | 64 | 64 | B |
| SP3 | 86 | 82 | 82 | 78 | 78 | 74 | 74 | 70 | 70 | 66 | A |
| SP4 | 64 | 66 | 64 | 66 | 64 | 68 | 64 | 68 | 64 | 64 | B |

| SEGMENTED IMAGE | SEGMENTATION PATTERN (M_s_o) | | | | | | | | | | |
|---|---|---|---|---|---|---|---|---|---|---|---|
| | 4_1_11 | 4_2_11 | 4_3_11 | 4_4_11 | 4_5_11 | 4_6_11 | 4_7_11 | 4_8_11 | 4_9_11 | 4_10_11 | |
| SP1 | 42 | 42 | 46 | 46 | 50 | 46 | 54 | 50 | 58 | 62 | C |
| SP2 | 64 | 66 | 64 | 66 | 64 | 68 | 64 | 68 | 64 | 64 | B |
| SP3 | 64 | 66 | 64 | 66 | 64 | 68 | 64 | 68 | 64 | 64 | B |
| SP4 | 86 | 82 | 82 | 78 | 78 | 74 | 74 | 70 | 70 | 66 | A |

| SEGMENTED IMAGE | SEGMENTATION PATTERN (M_s_o) 4_11_12 |
|---|---|
| SP1 | 64 |
| SP2 | 64 |
| SP3 | 64 |
| SP4 | 64 |

| SEGMENTED IMAGE (4_11_12) ||
|---|---|
| NUMBER M OF SEGMENTS | SEGMENTATION POSITION Smy |
| M=4 | S1y=0 |
| | S2y=64 |
| | S3y=128 |
| | S4y=192 |

FIG.25

| SEGMENTED IMAGE | ADDRESS | | | |
|---|---|---|---|---|
| | 0x0000 | 0x1000 | 0x2000 | 0x3000 |
| SP1 | | | | |
| SP2 | ▨ | | | |
| SP3 | | | ▨ | |
| SP4 | | | | ▨ |
| | | ▨ | | |

FIG.27

| FEATURE POINT IDENTIFICATION REGION CPq | COORDINATE Pn |
|---|---|
| CP1 | P1_1 (P1_1x, P1_1y) |
| | P1_2 (P1_1x, P1_2y) |
| | P1_3 (P1_2x, P1_1y) |
| | P1_4 (P1_2x, P1_2y) |
| CP2 | P2_1 (P2_1x, P2_1y) |
| | P2_2 (P2_1x, P2_2y) |
| | P2_3 (P2_2x, P2_1y) |
| | P2_4 (P2_2x, P2_2y) |
| ⋮ | ⋮ |
| CPq | Pq_1 (Pq_1x, Pq_1y) |
| | Pq_2 (Pq_1x, Pq_2y) |
| | Pq_3 (Pq_2x, Pq_1y) |
| | Pq_4 (Pq_2x, Pq_2y) |
| ⋮ | ⋮ |
| CPQ | PQ_1 (PQ_1x, PQ_1y) |
| | PQ_2 (PQ_1x, PQ_2y) |
| | PQ_3 (PQ_2x, PQ_1y) |
| | PQ_4 (PQ_2x, PQ_2y) |

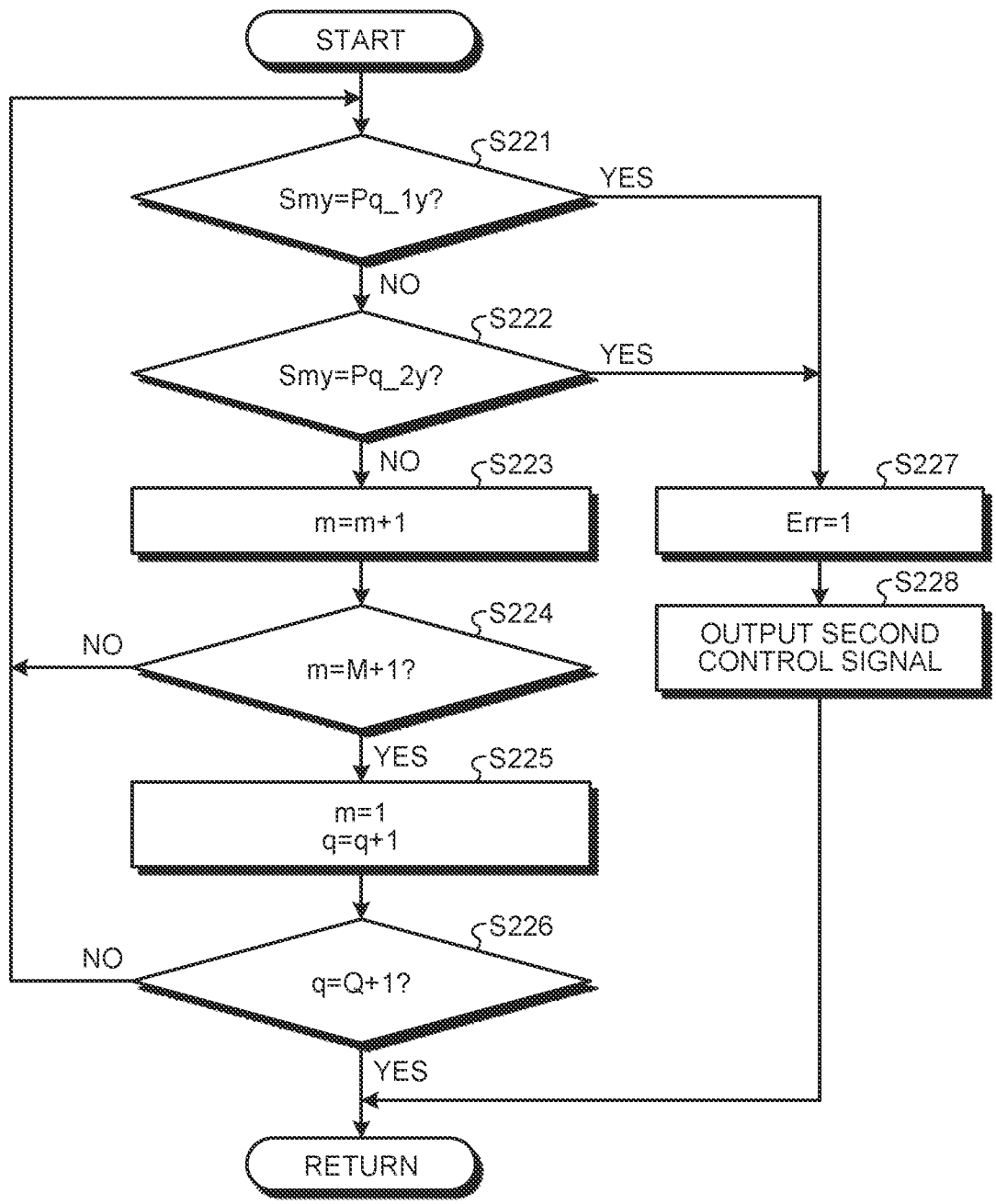

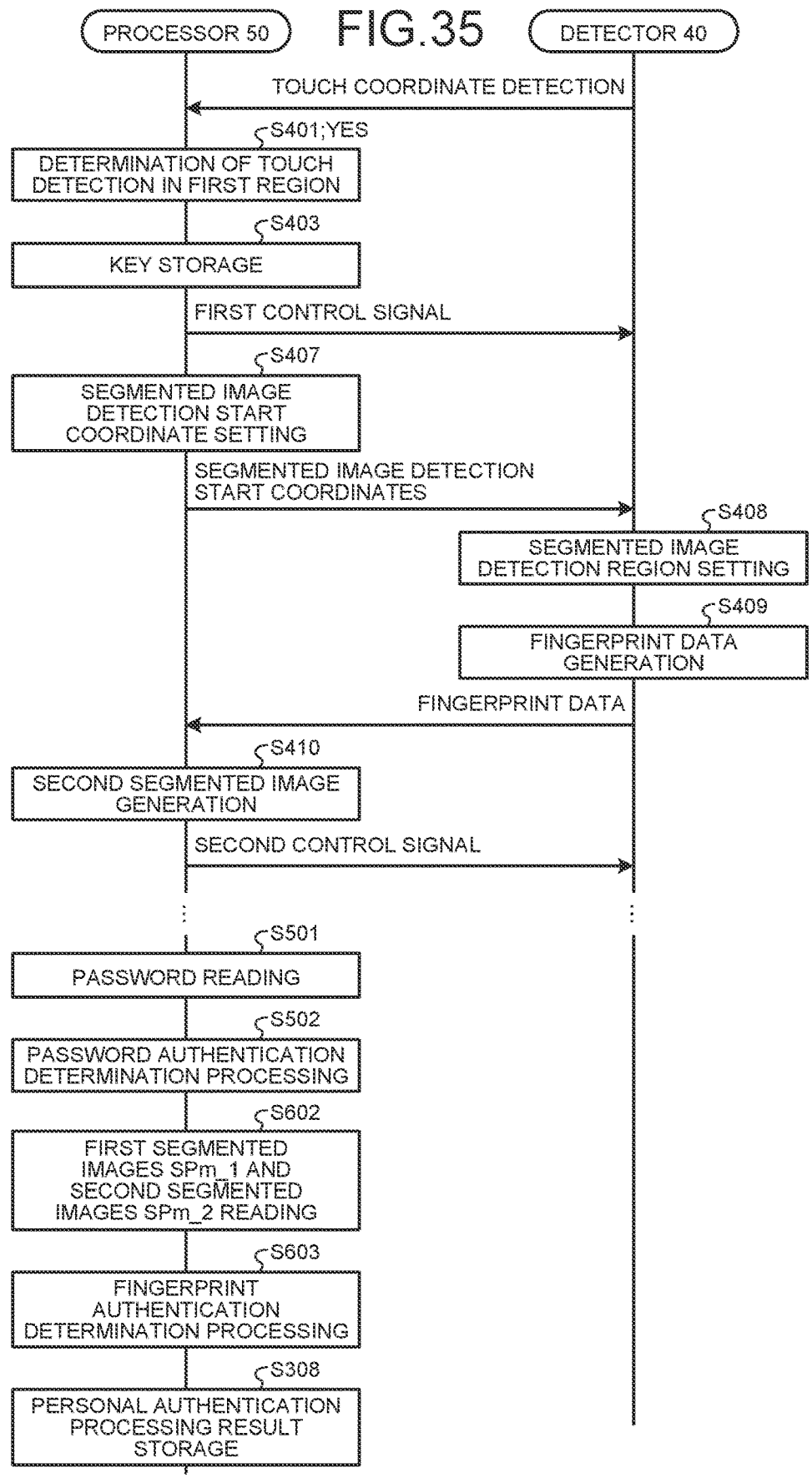

| SEGMENTED IMAGE | | SP 1 | SP 2 | SP 3 |
|---|---|---|---|---|
| SEGMENTATION PATTERN (M_s_o) | 3_1_1 | 86 | 86 | 84 |
|  |  | A | A | B |

| SEGMENTED IMAGE | | SP 1 | SP 2 | SP 3 |
|---|---|---|---|---|
| SEGMENTATION PATTERN (M_s_o) | 3_1_2 | 86 | 84 | 86 |
|  |  | A | B | A |

| SEGMENTED IMAGE | | SP 1 | SP 2 | SP 3 |
|---|---|---|---|---|
| SEGMENTATION PATTERN (M_s_o) | 3_1_3 | 84 | 86 | 86 |
|  |  | B | A | A |

| SEGMENTED IMAGE | | SP 1 | SP 2 | SP 3 | SP 4 |
|---|---|---|---|---|---|
| SEGMENTATION PATTERN (M_s_o) | 4_1_1 | 86 | 64 | 64 | 42 |
|  | 4_2_1 | 82 | 66 | 66 | 42 |
|  | 4_3_1 | 82 | 64 | 64 | 46 |
|  | 4_4_1 | 78 | 66 | 66 | 46 |
|  | 4_5_1 | 78 | 64 | 64 | 50 |
|  | 4_6_1 | 74 | 68 | 68 | 46 |
|  | 4_7_1 | 74 | 64 | 64 | 54 |
|  | 4_8_1 | 70 | 68 | 68 | 50 |
|  | 4_9_1 | 70 | 64 | 64 | 58 |
|  | 4_10_1 | 66 | 64 | 64 | 62 |
|  |  | A | B | B | C |

| SEGMENTED IMAGE | | SP 1 | SP 2 | SP 3 | SP 4 |
|---|---|---|---|---|---|
| SEGMENTATION PATTERN (M_s_o) | 4_1_2 | 86 | 64 | 42 | 64 |
|  | 4_2_2 | 82 | 66 | 42 | 66 |
|  | 4_3_2 | 82 | 64 | 46 | 64 |
|  | 4_4_2 | 78 | 66 | 46 | 66 |
|  | 4_5_2 | 78 | 64 | 50 | 64 |
|  | 4_6_2 | 74 | 68 | 46 | 68 |
|  | 4_7_2 | 74 | 64 | 54 | 64 |
|  | 4_8_2 | 70 | 68 | 50 | 68 |
|  | 4_9_2 | 70 | 64 | 58 | 64 |
|  | 4_10_2 | 66 | 64 | 62 | 64 |
|  |  | A | B | C | B |

| SEGMENTED IMAGE | | SP 1 | SP 2 | SP 3 | SP 4 |
|---|---|---|---|---|---|
| SEGMENTATION PATTERN (M_s_o) | 4_1_3 | 86 | 42 | 64 | 64 |
|  | 4_2_3 | 82 | 42 | 66 | 66 |
|  | 4_3_3 | 82 | 46 | 64 | 64 |
|  | 4_4_3 | 78 | 46 | 66 | 66 |
|  | 4_5_3 | 78 | 50 | 64 | 64 |
|  | 4_6_3 | 74 | 46 | 68 | 68 |
|  | 4_7_3 | 74 | 54 | 64 | 64 |
|  | 4_8_3 | 70 | 50 | 68 | 68 |
|  | 4_9_3 | 70 | 58 | 64 | 64 |
|  | 4_10_3 | 66 | 62 | 64 | 64 |
|  |  | A | C | B | B |

| SEGMENTED IMAGE | | SP 1 | SP 2 | SP 3 | SP 4 |
|---|---|---|---|---|---|
| SEGMENTATION PATTERN (M_s_o) | 4_1_4 | 64 | 86 | 64 | 42 |
|  | 4_2_4 | 66 | 82 | 66 | 42 |
|  | 4_3_4 | 64 | 82 | 64 | 46 |
|  | 4_4_4 | 66 | 78 | 66 | 46 |
|  | 4_5_4 | 64 | 78 | 64 | 50 |
|  | 4_6_4 | 68 | 74 | 68 | 46 |
|  | 4_7_4 | 64 | 74 | 64 | 54 |
|  | 4_8_4 | 68 | 70 | 68 | 50 |
|  | 4_9_4 | 64 | 70 | 64 | 58 |
|  | 4_10_4 | 64 | 66 | 64 | 62 |
|  |  | B | A | B | C |

| SEGMENTED IMAGE | | SP 1 | SP 2 | SP 3 | SP 4 |
|---|---|---|---|---|---|
| SEGMENTATION PATTERN (M_s_o) | 4_1_5 | 64 | 64 | 86 | 42 |
|  | 4_2_5 | 66 | 66 | 82 | 42 |
|  | 4_3_5 | 64 | 64 | 82 | 46 |
|  | 4_4_5 | 66 | 66 | 78 | 46 |
|  | 4_5_5 | 64 | 64 | 78 | 50 |
|  | 4_6_5 | 68 | 68 | 74 | 46 |
|  | 4_7_5 | 64 | 64 | 74 | 54 |
|  | 4_8_5 | 68 | 68 | 70 | 50 |
|  | 4_9_5 | 64 | 64 | 70 | 58 |
|  | 4_10_5 | 64 | 64 | 66 | 62 |
|  |  | B | B | A | C |

| SEGMENTED IMAGE | | SP 1 | SP 2 | SP 3 | SP 4 |
|---|---|---|---|---|---|
| SEGMENTATION PATTERN (M_s_o) | 4_1_6 | 64 | 64 | 42 | 86 |
|  | 4_2_6 | 66 | 66 | 42 | 82 |
|  | 4_3_6 | 64 | 64 | 46 | 82 |
|  | 4_4_6 | 66 | 66 | 46 | 78 |
|  | 4_5_6 | 64 | 64 | 50 | 78 |
|  | 4_6_6 | 68 | 68 | 46 | 74 |
|  | 4_7_6 | 64 | 64 | 54 | 74 |
|  | 4_8_6 | 68 | 68 | 50 | 70 |
|  | 4_9_6 | 64 | 64 | 58 | 70 |
|  | 4_10_6 | 64 | 64 | 62 | 66 |
|  |  | B | B | C | A |

| SEGMENTED IMAGE | | SP 1 | SP 2 | SP 3 | SP 4 |
|---|---|---|---|---|---|
| SEGMENTATION PATTERN (M_s_o) | 4_1_7 | 64 | 42 | 64 | 86 |
|  | 4_2_7 | 66 | 42 | 66 | 82 |
|  | 4_3_7 | 64 | 46 | 64 | 82 |
|  | 4_4_7 | 66 | 46 | 66 | 78 |
|  | 4_5_7 | 64 | 50 | 64 | 78 |
|  | 4_6_7 | 68 | 46 | 68 | 74 |
|  | 4_7_7 | 64 | 54 | 64 | 74 |
|  | 4_8_7 | 68 | 50 | 68 | 70 |
|  | 4_9_7 | 64 | 58 | 64 | 70 |
|  | 4_10_7 | 64 | 62 | 64 | 66 |
|  |  | B | C | B | A |

| SEGMENTED IMAGE | | SP 1 | SP 2 | SP 3 | SP 4 |
|---|---|---|---|---|---|
| SEGMENTATION PATTERN (M_s_o) | 4_1_8 | 64 | 42 | 86 | 64 |
|  | 4_2_8 | 66 | 42 | 82 | 66 |
|  | 4_3_8 | 64 | 46 | 82 | 64 |
|  | 4_4_8 | 66 | 46 | 78 | 66 |
|  | 4_5_8 | 64 | 50 | 78 | 64 |
|  | 4_6_8 | 68 | 46 | 74 | 68 |
|  | 4_7_8 | 64 | 54 | 74 | 64 |
|  | 4_8_8 | 68 | 50 | 70 | 68 |
|  | 4_9_8 | 64 | 58 | 70 | 64 |
|  | 4_10_8 | 64 | 62 | 66 | 64 |
|  |  | B | C | A | B |

| SEGMENTED IMAGE | | SP 1 | SP 2 | SP 3 | SP 4 |
|---|---|---|---|---|---|
| SEGMENTATION PATTERN (M_s_o) | 4_1_9 | 42 | 86 | 64 | 64 |
|  | 4_2_9 | 42 | 82 | 66 | 66 |
|  | 4_3_9 | 46 | 82 | 64 | 64 |
|  | 4_4_9 | 46 | 78 | 66 | 66 |
|  | 4_5_9 | 50 | 78 | 64 | 64 |
|  | 4_6_9 | 46 | 74 | 68 | 68 |
|  | 4_7_9 | 54 | 74 | 64 | 64 |
|  | 4_8_9 | 50 | 70 | 68 | 68 |
|  | 4_9_9 | 58 | 70 | 64 | 64 |
|  | 4_10_9 | 62 | 66 | 64 | 64 |
|  |  | C | A | B | B |

| SEGMENTED IMAGE | | SP 1 | SP 2 | SP 3 | SP 4 |
|---|---|---|---|---|---|
| SEGMENTATION PATTERN (M_s_o) | 4_1_10 | 42 | 64 | 86 | 64 |
|  | 4_2_10 | 42 | 66 | 82 | 66 |
|  | 4_3_10 | 46 | 64 | 82 | 64 |
|  | 4_4_10 | 46 | 66 | 78 | 66 |
|  | 4_5_10 | 50 | 64 | 78 | 64 |
|  | 4_6_10 | 46 | 68 | 74 | 68 |
|  | 4_7_10 | 54 | 64 | 74 | 64 |
|  | 4_8_10 | 50 | 68 | 70 | 68 |
|  | 4_9_10 | 58 | 64 | 70 | 64 |
|  | 4_10_10 | 62 | 64 | 66 | 64 |
|  |  | C | B | A | B |

| SEGMENTED IMAGE | | SP 1 | SP 2 | SP 3 | SP 4 |
|---|---|---|---|---|---|
| SEGMENTATION PATTERN (M_s_o) | 4_1_11 | 42 | 64 | 64 | 86 |
|  | 4_2_11 | 42 | 66 | 66 | 82 |
|  | 4_3_11 | 46 | 64 | 64 | 82 |
|  | 4_4_11 | 46 | 66 | 66 | 78 |
|  | 4_5_11 | 50 | 64 | 64 | 78 |
|  | 4_6_11 | 46 | 68 | 68 | 74 |
|  | 4_7_11 | 54 | 64 | 64 | 74 |
|  | 4_8_11 | 50 | 68 | 68 | 70 |
|  | 4_9_11 | 58 | 64 | 64 | 70 |
|  | 4_10_11 | 62 | 64 | 64 | 66 |
|  |  | C | B | B | A |

| SEGMENTED IMAGE | | SP 1 | SP 2 | SP 3 | SP 4 |
|---|---|---|---|---|---|
| SEGMENTATION PATTERN (M_s_o) | 4_11_12 | 64 | 64 | 64 | 64 |

| SEGMENTED IMAGE (4_11_12) | NUMBER M OF SEGMENTS | M=4 | | | |
|---|---|---|---|---|---|
| | SEGMENTATION POSITION Smx | S1x=0 | S2x=64 | S3x=128 | S4x=192 |

PERSONAL AUTHENTICATION SYSTEM, PERSONAL AUTHENTICATION DEVICE, AND PERSONAL AUTHENTICATION METHOD

CROSS-REFERENCE TO RELATED APPLICATION

This application claims the benefit of priority from Japanese Patent Application No. 2022-065317 filed on Apr. 11, 2022, the entire contents of which are incorporated herein by reference.

BACKGROUND

1. Technical Field

What is disclosed herein relates to a personal authentication system, a personal authentication device, and a personal authentication method.

2. Description of the Related Art

Personal authentication with a password is considered to have a high security level as an existing personal authentication method. However, in personal authentication with a password, unauthorized access by impersonation is concerned because authentication can be made with any person who knows the password. Thus, password authentication can be combined with biometric authentication with a fingerprint, a face, or the like to reinforce security, but a plurality of authentication methods potentially spoil user convenience. For example, in a disclosed personal authentication method, password authentication and fingerprint authentication are combined to reinforce security by detecting a fingerprint on a key through which a user performs inputting.

When a collation fingerprint image is registered, the risk of leakage of the collation fingerprint image can be lowered by, after acquisition, segmenting fingerprint image and registering the segmented images. However, when the acquired fingerprint image is segmented, duplication and omission of registration of feature points occur depending on segmentation positions, and the accuracy of the segmented fingerprint image potentially cannot be maintained.

For the foregoing reasons, there is a need for a personal authentication system, a personal authentication device, and a personal authentication method that can achieve both security reinforcement and authentication accuracy improvement without degradation of convenience.

SUMMARY

According to an aspect, a personal authentication system is configured to execute fingerprint authentication processing by collating a first fingerprint image registered at fingerprint registration with a second fingerprint image acquired at personal authentication. The personal authentication system includes: a detection device configured to detect a touch position on a sensor and fingerprint data; and a control device configured to generate the first fingerprint image based on fingerprint data acquired at the fingerprint registration, segment the first fingerprint image into a plurality of first segmented images, and register the first segmented images.

According to an aspect, a personal authentication device is configured to execute fingerprint authentication processing by collating a first fingerprint image registered at fingerprint registration with a second fingerprint image acquired at personal authentication. The personal authentication device includes: a detector configured to detect a touch position on a sensor and fingerprint data; and a processor configured to generate the first fingerprint image based on fingerprint data acquired at the fingerprint registration, segment the first fingerprint image into a plurality of first segmented images, and register the first segmented images.

According to an aspect, a personal authentication method of executing fingerprint authentication processing by collating a first fingerprint image registered at fingerprint registration with a second fingerprint image acquired at personal authentication, includes: generating the first fingerprint image based on fingerprint data acquired at the fingerprint registration; setting a segmentation pattern in which no segmentation position of the first fingerprint image overlaps any feature point identification region that is identifiable as a feature point on a fingerprint image among a plurality of segmentation patterns in each of which a segmentation direction of a fingerprint image, the number of segments, and relative sizes of segmented images are defined; and segmenting the first fingerprint image into a plurality of first segmented images based on the set segmentation pattern and registering the first segmented images.

BRIEF DESCRIPTION OF THE DRAWINGS

FIG. 3A is a plan view illustrating the personal authentication system according to the embodiment;

FIG. 3B is a plan view illustrating a personal authentication device according to the embodiment;

FIG. 14 is a diagram illustrating an exemplary detection region on a screen of a display device 100 when fingerprint authentication is performed in a personal authentication method according to the first embodiment;

FIG. 17 is a diagram illustrating feature points in the fingerprint image of the exemplary segmentation pattern illustrated in FIG. 16A;

FIG. 18 is a diagram illustrating a specific example of feature points used for fingerprint collation;

FIG. 21 is a diagram illustrating a specific example of segmentation patterns in personal authentication processing according to the first embodiment;

FIG. 24 is a diagram illustrating an example of the number of segments and segmentation positions in a fingerprint image in a case of a segmentation pattern illustrated in FIG. 21;

FIG. 25 is a diagram illustrating an exemplary storage region in which first segmented images are stored;

FIG. 27 is a diagram illustrating exemplary coordinate information of feature point identification regions stored in a fingerprint image storage;

FIG. 29B is a sub flowchart illustrating exemplary segmentation pattern setting processing performed in the personal authentication system and the personal authentication device according to the first embodiment;

FIG. 35 is a sequence diagram illustrating a specific example of personal authentication processing performed in the personal authentication system and the personal authentication device according to the first embodiment;

FIG. 37 is a diagram illustrating a specific example of segmentation patterns in personal authentication processing according to the second embodiment;

FIG. 39 is a diagram illustrating an example of the number of segments and segmentation positions in a fingerprint image in a case of a segmentation pattern illustrated in FIG. 37;

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

Figure 1:
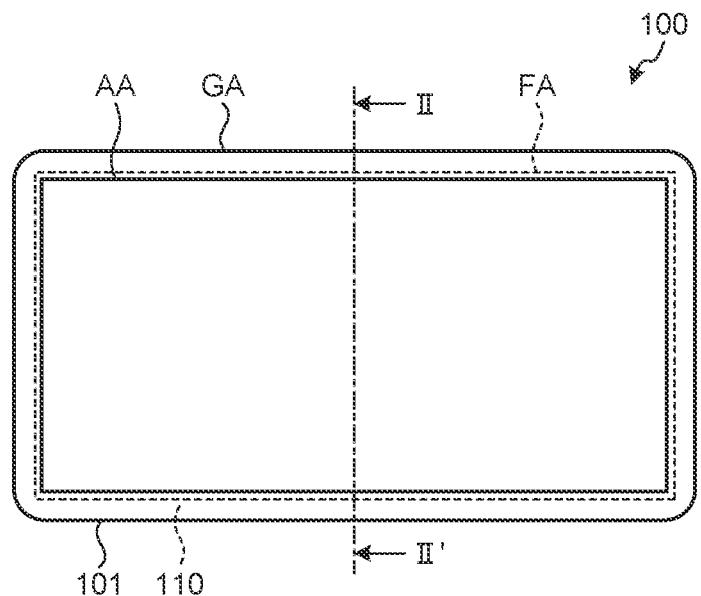
FIG. 1 is a plan view of a display device including a detection device constituting a personal authentication system according to an embodiment.
Figure 2:
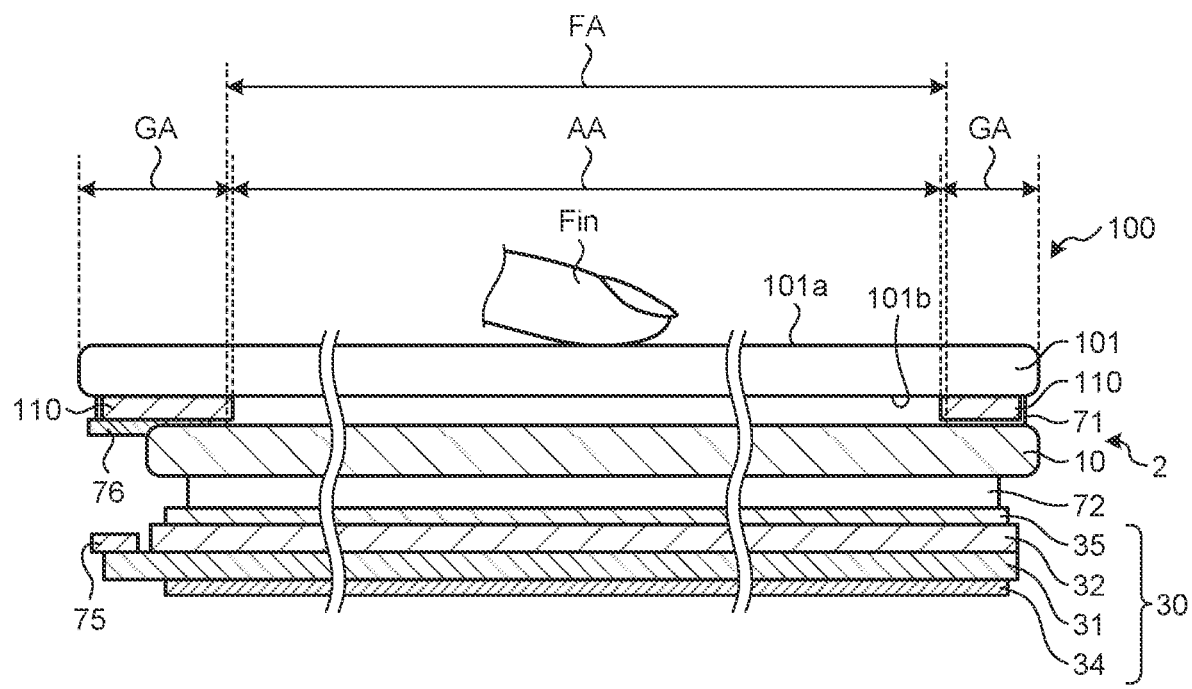
FIG. 2 is a sectional view taken along line II-II' in FIG. 1.

FIG. 1 is a plan view of a display device including a detection device constituting a personal authentication system according to an embodiment. FIG. 2 is a sectional view taken along line II-II' in FIG. 1. As illustrated in FIGS. 1 and 2, a display device 100 of the present embodiment includes a display region AA, a frame region GA, and a detection region FA. The display region AA is a region in which an image on a display panel 30 is displayed. The frame region GA is a region outside the display region AA. The detection region FA is a region in which detection of asperities on a surface of a finger or the like in contact therewith or in proximity thereto is performed. The detection region FA is provided over the entire surface of the display region AA.

As illustrated in FIG. 2, the display device 100 of the present embodiment includes a cover member 101, a detection device 2, and the display panel 30. The cover member 101 is a plate member having a first surface 101a and a second surface 101b on an opposite side to the first surface 101a. The first surface 101a of the cover member 101 is a detection surface of the detection device 2. When a detection target body contacts the detection surface, the planar coordinate position of the detection target body on the detection surface is detected, and also asperities on the surface of the detection target body are detected. In the present embodiment, the detection target body is a finger of a user, and the asperities on the surface of the detection target body include a fingerprint. The first surface 101a of the cover member 101 is a display surface on which an image on the display panel 30 is displayed, and also serves as an observation surface on which the user observes the image. The display panel 30 and a sensor 10 of the detection device 2 are provided on the second surface 101b side of the cover member 101. The cover member 101 is a member for protecting the sensor 10 and the display panel 30 and is provided to cover the sensor 10 and the display panel 30. The cover member 101 is, for example, a glass substrate or a resin substrate.

The cover member 101, the sensor 10, and the display panel 30 are each not limited to a rectangular shape in plan view but may each have a circular shape, an elliptical shape, or an irregular shape in which part of any of these outer shapes is omitted. The cover member 101 may have a different outer shape from those of the sensor 10 and the display panel 30. For example, the cover member 101 may have a circular shape, and the sensor 10 and the display panel 30 each may have a regular polygonal shape. The cover member 101 is not limited to a flat plate shape but may have a configuration in which, for example, the display region AA is a curved surface or the frame region GA curves toward the display panel 30; that is, a curved surface display having a curved surface can be employed.

As illustrated in FIGS. 1 and 2, a decorative layer 110 is provided on the second surface 101b of the cover member 101 in the frame region GA. The decorative layer 110 is a colored layer having an optical transmittance less than that of the cover member 101. The decorative layer 110 can restrain wiring, circuits, and the like overlapping on the frame region GA from being visually recognized by a viewer. In the example illustrated in FIG. 2, the decorative layer 110 is provided on the second surface 101b, but may be provided on the first surface 101a. The decorative layer 110 is not limited to a single layer but may have a structure in which a plurality of layers are stacked.

The detection device 2 includes the sensor 10 configured to detect asperities on the surface of a finger Fin or the like in contact with or in proximity to the first surface 101a of the cover member 101. As illustrated in FIG. 2, the sensor 10 of the detection device 2 is provided on the display panel 30. Specifically, the sensor 10 is provided between the cover member 101 and the display panel 30 and overlaps the display panel 30 when viewed in a direction orthogonal to the first surface 101a. The sensor 10 is coupled to a flexible printed board 76 through which a detection signal from the sensor 10 can be output to the outside.

One surface of the sensor 10 is bonded to the cover member 101 with a bonding layer 71 interposed therebetween. The other surface of the sensor 10 is bonded to a polarization plate 35 of the display panel 30 with a bonding layer 72 interposed therebetween. The bonding layer 71 is, for example, an optical transparent resin (optical clear resin (OCR) or liquid optically clear adhesive (LOCA)) that is a liquid UV curing resin. The bonding layer 72 is, for example, an optical adhesive film (optical clear adhesive (OCA)).

The display panel 30 includes a first substrate 31, a second substrate 32, a polarization plate 34 provided on the lower side of the first substrate 31, and the polarization plate 35 provided on the upper side of the second substrate 32. A flexible printed board 75 is coupled to the first substrate 31. A liquid crystal display element as a display functional layer is provided between the first substrate 31 and the second substrate 32. In other words, the display panel 30 is a liquid crystal panel. The display panel 30 is not limited thereto but may be, for example, an organic EL display panel (organic light emitting diode (OLED)) or an inorganic EL display (micro LED or mini LED). Alternatively, the display panel may be a liquid crystal display panel (liquid crystal display (LCD)) in which a liquid crystal element is used as a display element, or an electrophoretic display panel (electrophoretic display (EPD)) in which an electrophoretic element is used as a display element.

As illustrated in FIG. 2, the sensor 10 is disposed at a position closer to the cover member 101 than the display panel 30 in a direction orthogonal to the second surface 101b of the cover member 101. Thus, for example, the distance between a detection electrode and the first surface 101a as the detection surface can be reduced as compared to a configuration in which a detection electrode for fingerprint detection is provided integrally with the display panel 30. Consequently, it is possible to improve detection performance with the display device 100 including the detection device 2 of the present embodiment.

The display device 100 has a configuration of what is called an out-cell type in which the sensor 10 and the display panel 30 are independent from each other, but may have a configuration of what is called an in-cell type or an on-cell type in which some substrates or some electrodes of the sensor 10 and the display panel 30 are shared with each other.

FIG. 3A is a plan view illustrating a personal authentication system according to the embodiment. As illustrated in FIG. 3A, this personal authentication system 1 includes the detection device 2 and a control device 9. The detection device 2 includes a substrate 3 and a wiring substrate 4. The control device 9 includes a control board 5. The control board 5 is electrically coupled to the substrate 3 through the wiring substrate 4.

The substrate 3 has the detection region FA and the frame region GA described above. The sensor 10 is provided in the detection region FA. A first electrode selection circuit 15 and a detection electrode selection circuit 16 are provided in the frame region GA.

A detection circuit 6 is provided at the wiring substrate 4. The detection circuit 6 is provided in, for example, a detection integrated circuit (IC).

A control circuit 7 is provided at the control board 5. The control circuit 7 is provided at a host IC formed by, for example, a field programmable gate array (FPGA). The control circuit 7 controls detection operation of the sensor 10 by supplying control signals to the sensor 10, the first electrode selection circuit 15, the detection electrode selection circuit 16, and the detection circuit 6. One or both of the first electrode selection circuit 15 and the detection electrode selection circuit 16 may be provided in the detection circuit 6 or the control circuit 7.

The first electrode selection circuit 15 is provided in a region extending in a second direction Dy in the frame region GA. The detection electrode selection circuit 16 is provided in a region extending in a first direction Dx in the frame region GA and is provided between the sensor 10 and the detection circuit 6.

The first direction Dx is a direction in a plane parallel to the substrate 3. The second direction Dy is another direction in the plane parallel to the substrate 3 and is orthogonal to the first direction Dx. The second direction Dy does not necessarily need to be orthogonal to the first direction Dx but may intersect the first direction Dx. A third direction Dz is a direction orthogonal to the first direction Dx and the second direction Dy and is the normal direction of the substrate 3.

FIG. 3B is a plan view illustrating a personal authentication device according to the embodiment. As illustrated in FIG. 3B, this personal authentication device 1a corresponds to the detection device 2 of the personal authentication system 1 illustrated in FIG. 3A.

In the personal authentication device 1a illustrated in FIG. 3B, a personal authentication circuit 8 is provided at the wiring substrate 4. The personal authentication circuit 8 is provided at, for example, the detection IC.

In the example illustrated in FIG. 3B, a control circuit 7a is provided at the control board 5 of a control device 9a. Different functions are allocated to the detection circuit 6 of the personal authentication system 1 illustrated in FIG. 3A and the personal authentication circuit 8 of the personal authentication device 1a illustrated in FIG. 3B.

The following describes detailed configurations of the personal authentication system 1 and the personal authentication device 1a.

Figure 4A:
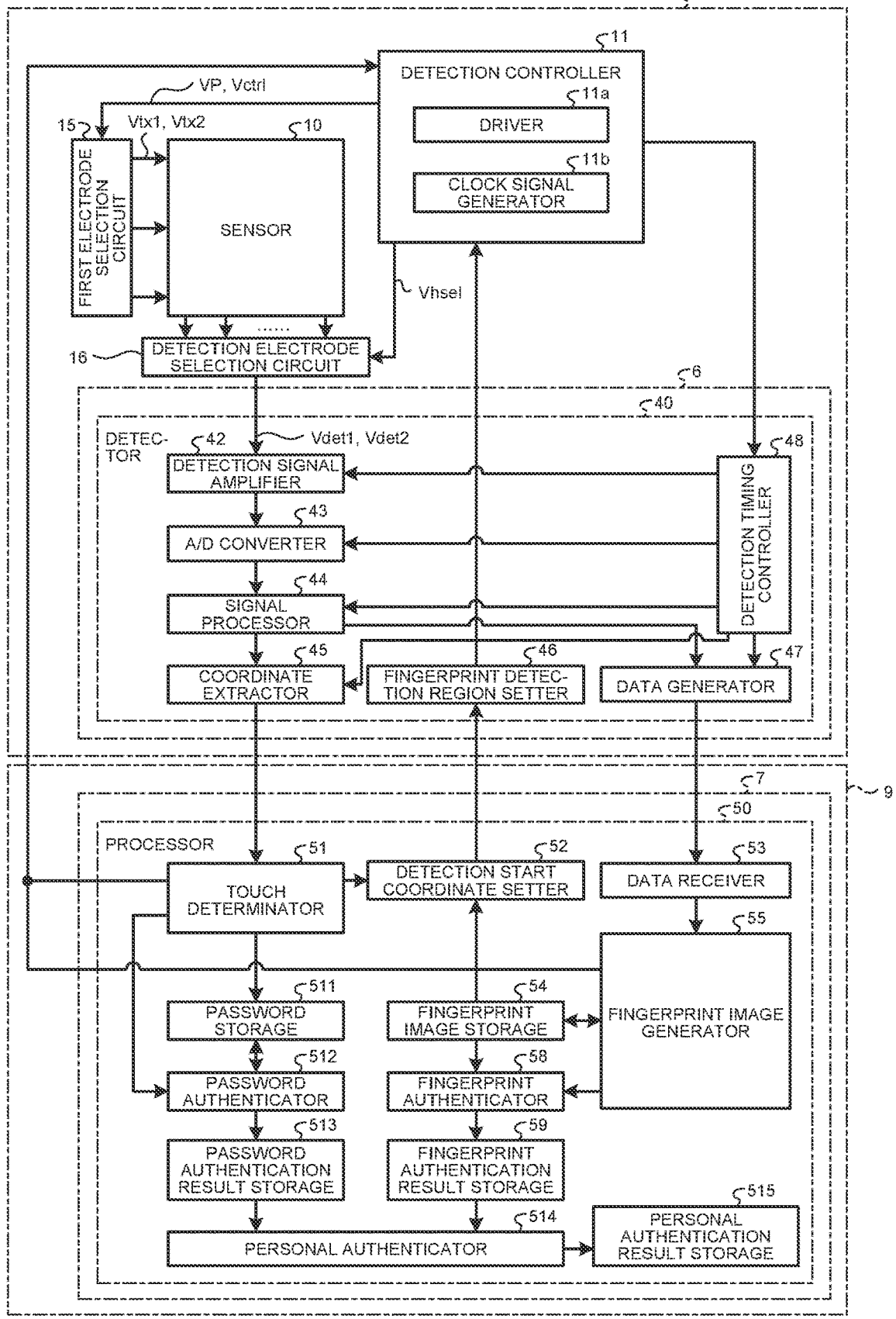
FIG. 4A is a diagram illustrating an exemplary block configuration of a personal authentication system according to a first embodiment.

FIG. 4A is a diagram illustrating an exemplary block configuration of the personal authentication system according to a first embodiment. As illustrated in FIG. 4A, the personal authentication system 1 includes the detection device 2 and the control device 9 as a host device of the detection device 2. The detection device 2 includes the sensor 10, a detection controller 11, the first electrode selection circuit 15, the detection electrode selection circuit 16, and the detection circuit 6 including a detector 40. The control device 9 includes the control circuit 7 including a processor 50.

Figure 4B:
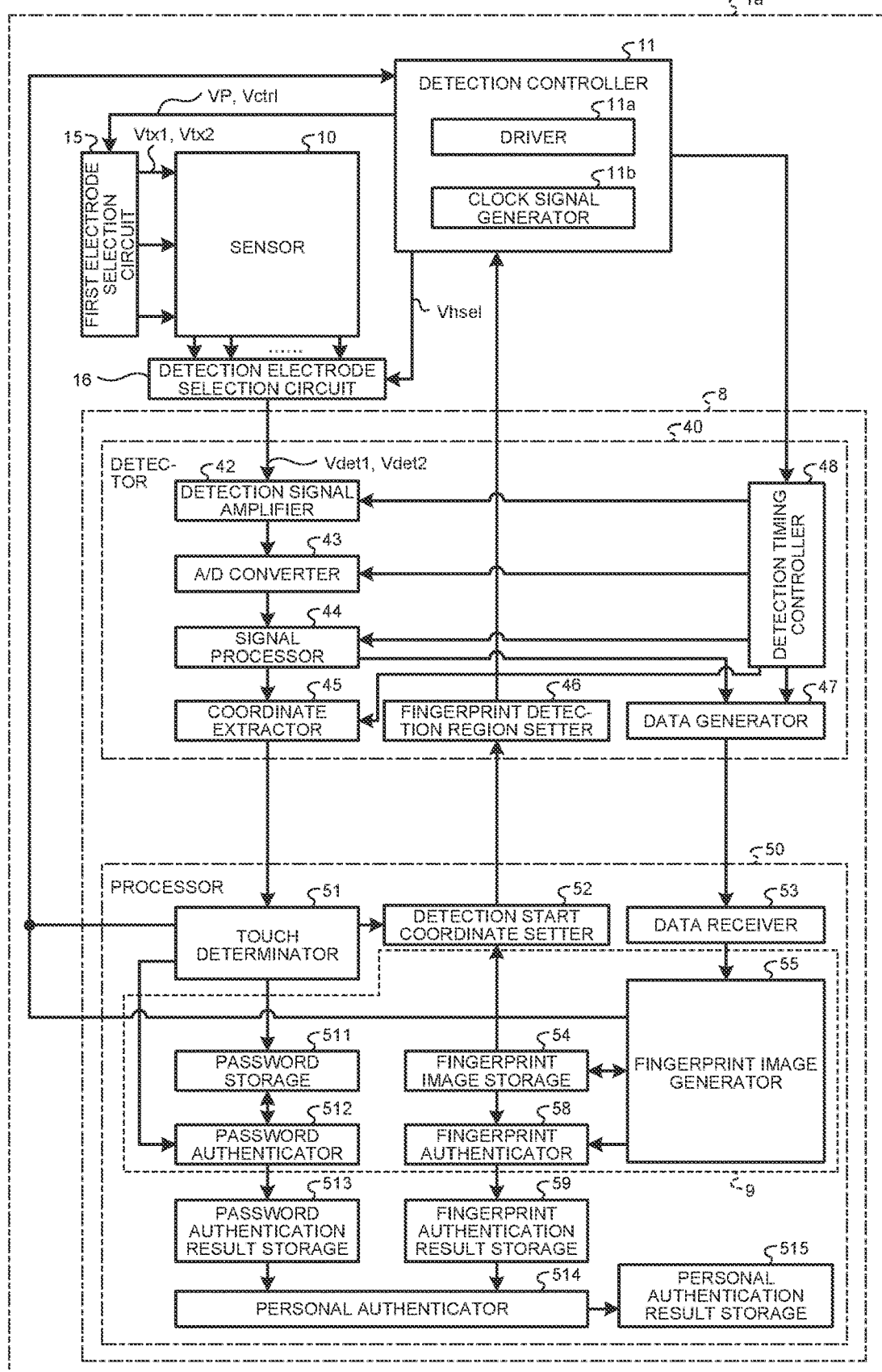
FIG. 4B is a diagram illustrating an exemplary block configuration of a personal authentication device according to the first embodiment.

FIG. 4B is a diagram illustrating an exemplary block configuration of the personal authentication device according to the first embodiment. As illustrated in FIG. 4B, the personal authentication device 1a includes the sensor 10, the detection controller 11, the first electrode selection circuit 15, the detection electrode selection circuit 16, and the personal authentication circuit 8 including the detector 40 and the processor 50. Specifically, in the personal authentication device 1a illustrated in FIGS. 3B and 4B, the personal authentication circuit 8 has functions of the processor 50 included in the control circuit 7 of the personal authentication system 1 illustrated in FIGS. 3A and 4A. Components in the following description are applicable to any of the personal authentication system 1 illustrated in FIGS. 3A and 4A and the personal authentication device 1a illustrated in FIGS. 3B and 4B.

The sensor 10 performs detection in accordance with a second drive signal Vtx2 supplied from the first electrode selection circuit 15. Specifically, a plurality of first electrodes Tx (refer to FIG. 6) are individually or simultaneously selected through operation of the first electrode selection circuit 15. Then, the first electrode selection circuit 15 supplies, to each of the selected first electrodes Tx, the second drive signal Vtx2 with a phase determined based on a predetermined sign. The sensor 10 converts a change in asperities on the surface of the finger Fin or a hand in contact therewith or in proximity thereto into a change in an electric signal based on the principle of mutual-capacitive detection and outputs the electric signal to the detection circuit 6.

The sensor 10 can also detect the position (coordinates) of the finger Fin or the like in contact therewith or in proximity thereto in accordance with a first drive signal Vtx1 supplied from the first electrode selection circuit 15. The sensor 10 performs the detection in the entire detection region FA by scanning the first electrodes Tx for each first electrode block or at the ratio of one in some first electrodes Tx. The first electrode block includes a plurality of adjacent first electrodes Tx. Based on the principle of mutual-capacitive detection, the sensor 10 outputs, to the detection circuit 6, a variation in an electric signal due to existence or nonexistence of the finger Fin in contact with the detection surface. The above-described touch detection on the detection surface in accordance with the first drive signal Vtx1 only needs to detect and identify the coordinates of the finger and thus has a detection resolution lower than that of the detection in accordance with the second drive signal Vtx2.

The detection controller 11 is a circuit configured to supply a control signal to each of the first electrode selection circuit 15, the detection electrode selection circuit 16, and the detector 40 to control operation of these components. The detection controller 11 includes a driver 11a and a clock signal generator 11b. The driver 11a supplies a power voltage VP to the first electrode selection circuit 15. The detection controller 11 supplies various kinds of control signals Vctrl to the first electrode selection circuit 15 based on a clock signal from the clock signal generator 11b.

The first electrode selection circuit 15 is a circuit configured to simultaneously or individually select more than one of the first electrodes Tx based on the various kinds of control signals Vctrl. The first electrode selection circuit 15 supplies the first drive signal Vtx1 or the second drive signal Vtx2 to the selected first electrodes Tx based on the various kinds of control signals Vctrl and a plurality of power voltages VP. The first drive signal Vtx1 and the second drive signal Vtx2 include not only signals that have waveforms mutually different in wavelength and/or amplitude but also signals that have the same waveform but are respectively output to the sensor 10 in mutually different periods. The first electrode selection circuit 15 changes the selection state of the first electrodes Tx, whereby the sensor 10 can achieve a first detection mode M1, a second detection mode M2, a third detection mode M3, and a fourth detection mode M4 (refer to FIGS. 10 to 13).

Figure 6:
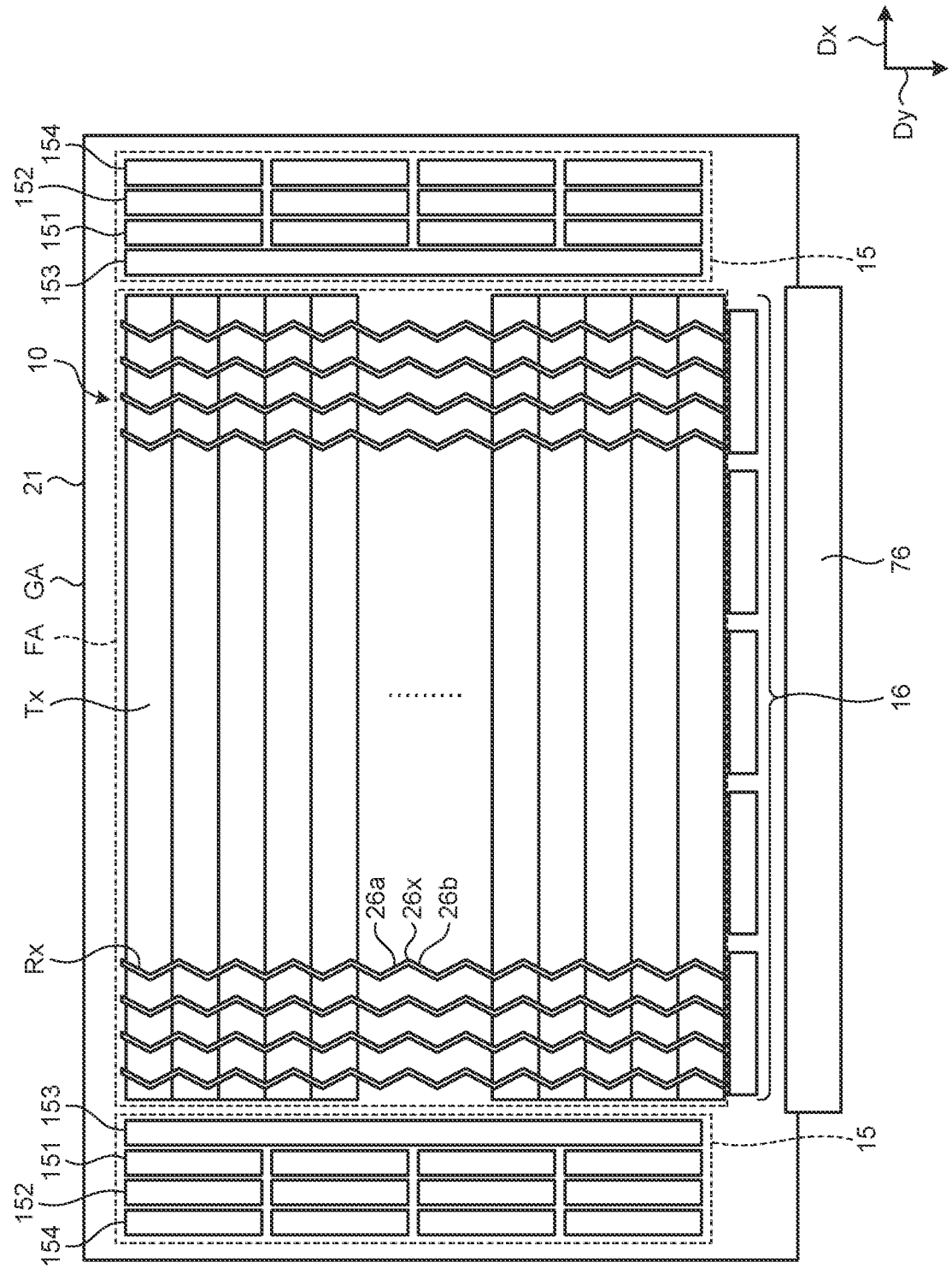
FIG. 6 is a plan view of a sensor substrate.

The detection electrode selection circuit 16 is a switch circuit configured to simultaneously select a plurality of second electrodes Rx (refer to FIG. 6). The detection electrode selection circuit 16 selects second electrodes Rx based on a second electrode selection signal Vhsel supplied from the detection controller 11 and couples the selected second electrodes Rx to the detection circuit 6.

The detector 40 is a circuit configured to detect a touch of a finger on the detection surface at a relatively large pitch and to detect the fingerprint of the finger at a relatively small pitch, based on a control signal supplied from the detection controller 11 and a first detection signal Vdet1 and a second detection signal Vdet2 supplied from the sensor 10. Components of the detector 40 operate in synchronization based on a control signal supplied from the detection controller 11. The detector 40 includes, as the components, a detection signal amplifier 42, an analog-to-digital (A/D) converter 43, a signal processor 44, a coordinate extractor 45, a fingerprint detection region setter 46, a data generator 47, and a detection timing controller 48. When the first detection signal Vdet1 and the second detection signal Vdet2 do not need to be distinguished from each other in the following description, they are simply referred to as detection signals Vdet.

Based on a control signal supplied from the detection controller 11, the detection timing controller 48 controls the detection signal amplifier 42, the A/D converter 43, the signal processor 44, the coordinate extractor 45, and the data generator 47 to operate them in synchronization.

The detection signal amplifier 42 amplifies the detection signals Vdet. The A/D converter 43 converts an analog signal output from the detection signal amplifier 42 into a digital signal.

The signal processor 44 performs predetermined decoding processing based on an output signal from the A/D converter 43. Specifically, the signal processor 44 performs processing of obtaining a differential signal (absolute value $|\Delta V|$) of the detection signals Vdet. The signal processor 44 compares the absolute value $|\Delta V|$ with a predetermined threshold voltage and outputs the comparison results.

The coordinate extractor 45 extracts the coordinates (hereinafter also referred to as a "touch detection coordinates") of the touch detection position of the detection target body in contact with or in proximity to the sensor 10 based on the results of the decoding processing by the signal processor 44 and outputs the touch detection coordinates to the processor 50.

The fingerprint detection region setter 46 sets a region in which detection is to be performed based on coordinates of a detection start position (herein after, referred to as a detection start coordinates) output from the processor 50. The detection start coordinates and the region in which detection is to be performed will be described later.

The data generator 47 extracts asperities on the surface of the detection target body based on the result of the decoding processing by the signal processor 44 and generates fingerprint data.

In the present embodiment, the personal authentication system 1 illustrated in FIG. 4A and the personal authentication device 1a illustrated in FIG. 4B each detect the finger Fin in contact with the detection surface of the sensor 10 based on the principle of capacitive detection (hereinafter referred to as "touch detection"). In addition, the personal authentication system 1 and the personal authentication device 1a each detect a fingerprint by detecting asperities on the surface of the finger Fin in contact with the sensor 10 based on the principle of capacitive detection (hereinafter referred to as "fingerprint detection").

In capacitive touch detection operation, a state in which capacitance change occurs due to contact of the finger Fin is referred to as a "touch state" below. In addition, a state in which no capacitance change occurs due to the finger Fin is referred to as a "non-touch state" below.

Figure 5:
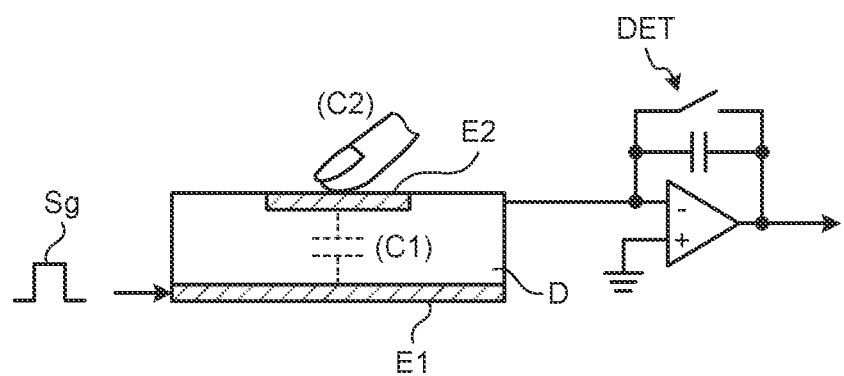
FIG. 5 is an explanatory diagram for description of the fundamental principle of mutual-capacitive touch detection.

The following describes the fundamental principle of mutual-capacitive touch detection by the personal authentication system 1 and the personal authentication device 1a of the present embodiment with reference to FIG. 5. FIG. 5 is an explanatory diagram for description of the fundamental principle of mutual-capacitive touch detection. FIG. 5 also illustrates the detection circuit.

As illustrated in FIG. 5, a capacitive element Cl includes a pair of electrodes, namely a drive electrode E1 and a detection electrode E2, disposed opposite to each other with a dielectric D interposed therebetween. The capacitive element Cl is subjected to an electric field (not illustrated) formed between facing surfaces of the drive electrode E1 and the detection electrode E2 as well as an electric field extending from end parts of the drive electrode E1 toward the upper surface of the detection electrode E2. One end of the capacitive element Cl is coupled to an alternating-current signal source (drive signal source), and the other end thereof is coupled to a voltage detector DET. The voltage detector DET is, for example, an integration circuit included in the detector 40 illustrated in FIGS. 4A and 4B.

An alternating-current square wave Sg at a predetermined frequency (for example, several kHz to several hundreds kHz) is applied from the alternating-current signal source to the drive electrode E1 (one end of the capacitive element C1). Current in accordance with the capacitance value of the capacitive element Cl flows to the voltage detector DET. The voltage detector DET converts a variation in current corresponding to the alternating-current square wave Sg into a variation in voltage.

Fringe lines of electric force between the drive electrode E1 and the detection electrode E2 are interrupted by a conductor (finger) as electrostatic capacitance C2 formed by the finger is in contact with the detection electrode E2 or comes as close to the detection electrode E2 as it can be identified as being in contact therewith. Thus, the capacitive element Cl acts as a capacitive element having a capacitance value that gradually decreases from the capacitance value in the non-contact state as it comes closer thereto.

The amplitude of a voltage signal output from the voltage detector DET decreases from the amplitude in the non-contact state as the finger Fin approaches the contact state. The absolute value $|\Delta V|$ of this voltage difference changes depending on influence of the finger Fin in contact with the detection surface. The detector 40 determines contact/non-contact of the finger Fin on the detection surface by comparing the absolute value $|\Delta V|$ with the predetermined threshold voltage. In the present embodiment, such determination is performed by any one of the signal processor 44 and the coordinate extractor 45 of the detector 40 or by both thereof in cooperation.

The detector 40 determines asperities on the finger Fin or the like based on the absolute value $|\Delta V|$. This asperity determination may be performed by comparing the absolute value $|\Delta V|$ with a predetermined threshold, and the threshold may be different from a threshold for determining contact/proximity of the finger Fin or may include a plurality of thresholds. In the present embodiment, such determination is performed by the signal processor 44 of the detector 40. In this manner, the detector 40 can perform the touch detection and the fingerprint detection based on the fundamental principle of mutual-capacitive touch detection.

In the present disclosure, a fingerprint image is data serving as surface information generated based on outputs from the second electrodes Rx and is different from touch coordinates (point information) that specifies one or a plurality of coordinate positions on the detection surface. More specifically, the fingerprint image is an aggregate of detection data in a plurality of detection unit regions, and each detection data includes, for example, the coordinates of the corresponding detection unit region and a result of asperity determination at the coordinate position. In the asperity determination, the threshold as described above is used as a border value, and a binary determination as the comparison result with the threshold can be employed. For example, when the detection result is larger than the threshold, it indicates a concavity; and when the detection result is smaller than the threshold, it indicates a convexity. Alternatively, the fingerprint image may be data obtained by more finely digitizing an actual detection signal based on a plurality of thresholds. Alternatively, the fingerprint image may be data including RAW data, which is not processed, of the magnitude of an output signal at each set of coordinates. Such data for each set of coordinates is accumulated to generate two-dimensional surface information.

In the present embodiment, the finger Fin as the detection target body and the fingerprint thereof are detected, but needless to say, the detection target body is not limited to a finger, and asperities on the detection target body are not limited to a fingerprint.

Figure 7:
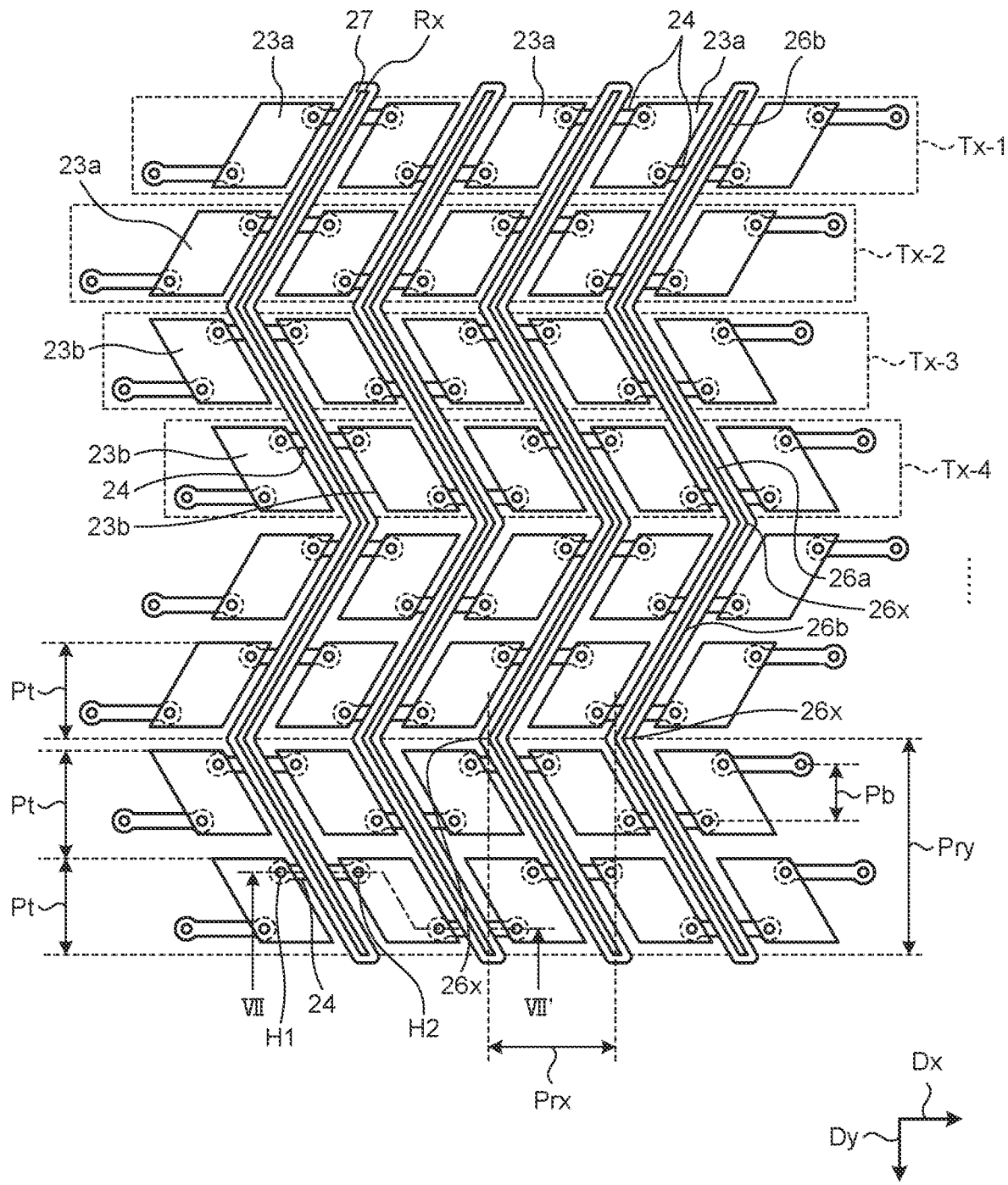
FIG. 7 is an enlarged plan view illustrating part of first and second electrodes.
Figure 8:
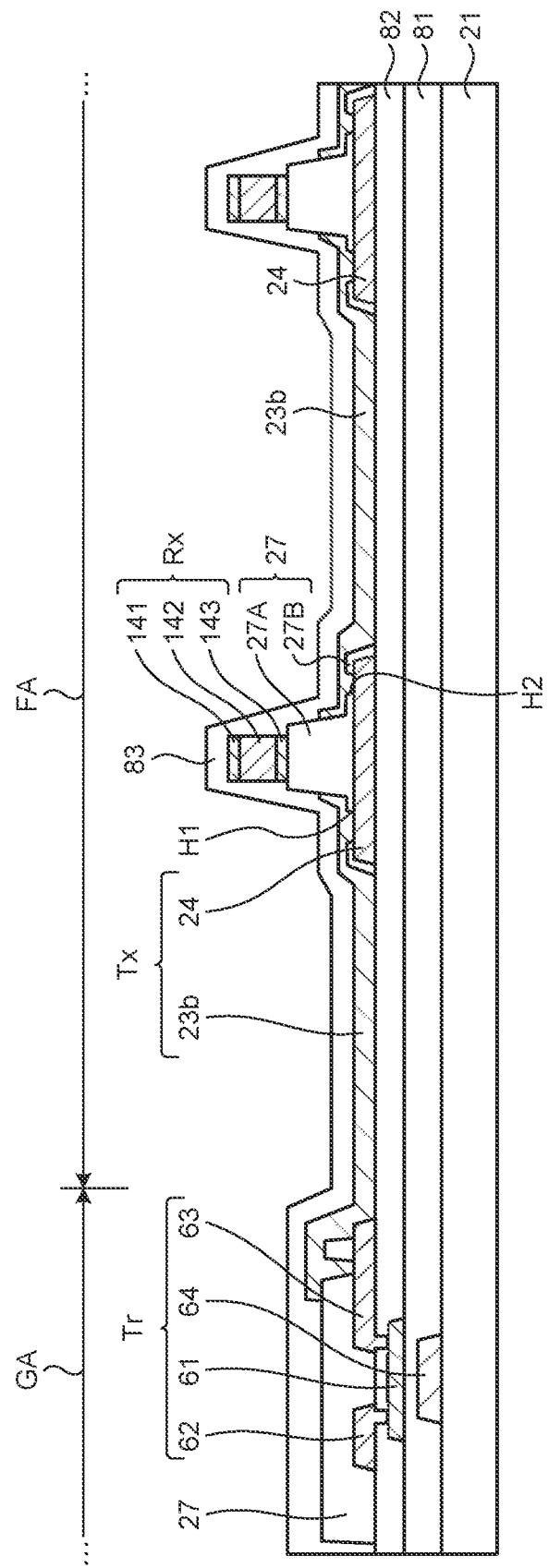
FIG. 8 is a sectional view taken along line VII-VII' in FIG. 7.

The following describes the configurations of the first electrodes Tx and the second electrodes Rx. FIG. 6 is a plan view of a sensor substrate. FIG. 7 is an enlarged plan view illustrating part of the first and second electrodes. FIG. 8 is a sectional view taken along line VII-VII' in FIG. 7.

As illustrated in FIG. 6, the first electrodes Tx and the second electrodes Rx are provided on a sensor substrate 21. The sensor substrate 21 is a light-transmitting glass substrate that can transmit visible light. Alternatively, the sensor substrate 21 may be a light-transmitting resin substrate or resin film made of resin such as polyimide. The sensor 10 is a light-transmitting sensor.

The first electrodes Tx extend in the first direction Dx and are arrayed in the second direction Dy. The second electrodes Rx extend in the second direction Dy and are arrayed in the first direction Dx. The second electrodes Rx extend in a direction intersecting the first electrodes Tx in plan view. Each second electrode Rx is coupled to the flexible printed board 76 provided on a short side of the frame region GA of the sensor substrate 21 through a frame wiring (not illustrated). The first electrodes Tx and the second electrodes Rx are provided in the detection region FA. The first electrodes Tx are made of light-transmitting conductive material such as indium tin oxide (ITO). The second electrodes Rx are made of metallic material such as aluminum or aluminum alloy. The first electrodes Tx may be made of metallic material and the second electrodes Rx may be made of ITO. However, resistance on the detection signals Vdet can be reduced when the second electrodes Rx are made of metallic material.

The first direction Dx is a direction in a plane parallel to the sensor substrate 21 and is, for example, a direction parallel to a side of the detection region FA. The second direction Dy is another direction in the plane parallel to the sensor substrate 21 and is a direction orthogonal to the first direction Dx. The second direction Dy does not necessarily need to be orthogonal to the first direction Dx but may intersect the first direction Dx. In the present specification, "plan view" is view in a direction orthogonal to the sensor substrate 21.

Capacitors are formed at respective intersections of the second electrodes Rx and the first electrodes Tx. When mutual-capacitive touch detection operation is performed at the sensor 10, the first electrode selection circuit 15 selects first electrodes Tx and supplies the first drive signal Vtx1 or the second drive signal Vtx2 simultaneously to the selected first electrodes Tx. Then, the detection signals Vdet depending on a capacitance change due to asperities on the surface of a finger or the like in a contact state or in a proximity state are output from the second electrodes Rx, and thus, fingerprint detection is performed. Alternatively, the detection signals Vdet depending on a capacitance change due to a finger or the like in a contact state or in a proximity state are output from the second electrodes Rx, and thus, touch detection is performed.

As illustrated in FIG. 6, various circuits such as the first electrode selection circuit 15 and the detection electrode selection circuit 16 are provided in the frame region GA of the sensor substrate 21. The first electrode selection circuit 15 includes a first selection circuit 151, a second selection circuit 152, a third selection circuit 153, and a first electrode block selection circuit 154. However, this configuration is merely exemplary. At least some of the various circuits may be included in an integrated circuit (IC) for detection mounted on the flexible printed board 76. Alternatively, at least some of the various circuits may be provided on an external control board. The first selection circuit 151, the second selection circuit 152, the third selection circuit 153, and the first electrode block selection circuit 154 do not necessarily need to be each provided as an individual circuit. The first electrode selection circuit 15 may be provided as one integrated circuit having functions of the first selection circuit 151, the second selection circuit 152, the third selection circuit 153, and the first electrode block selection circuit 154. The first electrode selection circuit 15 may be a semiconductor integrated circuit (IC).

The following describes more specific configurations of the first electrodes Tx and the second electrodes Rx in the detection region. As illustrated in FIG. 7, each second electrode Rx is a zigzag line and has a longitudinal direction in the second direction Dy as a whole. For example, each second electrode Rx includes a plurality of first straight parts 26a, a plurality of second straight parts 26b, and a plurality of bent parts 26x. The second straight parts 26b extend in a direction intersecting the first straight parts 26a. Each bent part 26x couples a first straight part 26a and the corresponding second straight part 26b.

The first straight parts 26a extend in a direction intersecting the first direction Dx and the second direction Dy. The second straight parts 26b extend in another direction intersecting the first direction Dx and the second direction Dy. Each first straight part 26a and the corresponding second straight part 26b are symmetrically disposed with respect to a virtual line (not illustrated) parallel to the first direction Dx. In each second electrode Rx, the first straight parts 26a and the second straight parts 26b are alternately coupled in the second direction Dy.

The disposition interval of the bent parts 26x in the second direction Dy in each second electrode Rx is represented by Pry. The disposition interval of the bent parts 26x of adjacent second electrodes Rx in the first direction Dx is represented by Prx. In the present embodiment, it is preferable to satisfy, for example, Prx<Pry. Each second electrode Rx is not limited to a zigzag shape but may have another shape such as a wavy line shape or a straight line shape.

As illustrated in FIG. 7, the first electrodes Tx-1, Tx-2, Tx-3, Tx-4, each include a plurality of electrode parts 23a or 23b and a plurality of coupling parts 24. When the first electrodes Tx-1, Tx-2, Tx-3, Tx-4, . . . do not need to be distinguished from one another in the following description, they are simply referred to as the first electrodes Tx.

The first electrodes Tx-1 and Tx-2 intersecting the second straight parts 26b of the second electrodes Rx include the electrode parts 23a having two sides parallel to the second straight parts 26b. The first electrodes Tx-3 and Tx-4 intersecting the first straight parts 26a of the second electrodes Rx include the electrode parts 23b having two sides parallel to the first straight parts 26a. In other words, the electrode parts 23a and 23b are disposed along the second electrodes Rx. With this configuration, each second electrode Rx in a zigzag shape is separated from the corresponding electrode parts 23a and 23b at a constant distance in plan view.

In the first electrodes Tx-1 and Tx-2, the electrode parts 23a are arranged in the first direction Dx and separated from each other. In each first electrode Tx, each coupling part 24 couples adjacent electrode parts 23a. Each second electrode Rx intersects the coupling parts 24 through a gap between adjacent electrode parts 23a in plan view. The first electrodes Tx-3 and Tx-4 have the same configuration. Each second electrode Rx is a metal thin line and has a width in the first direction Dx less than the widths of the electrode parts 23a and 23b in the first direction Dx. With such a configuration, the area of overlapping of the first electrodes Tx and the second electrodes Rx is reduced to reduce parasitic capacitance.

The disposition interval of the first electrodes Tx in the second direction Dy is represented by Pt. The disposition interval Pt is about half of the disposition interval Pry of the bent parts 26x of the second electrodes Rx. The disposition interval Pt is not limited thereto and may be other than a half-integer multiple of the disposition interval Pry. The disposition interval Pt is, for example, 50 μm to 100 μm inclusive. In each first electrode Tx, the coupling parts 24 adjacent to each other in the first direction Dx are disposed in a staggered manner with a disposition interval Pb in the second direction Dy. The electrode parts 23a and 23b each have a parallelogram shape but may have another shape. For example, the electrode parts 23a and 23b may each have a rectangular shape, a polygonal shape, or an irregular shape.

The following describes a sectional structure taken along line VII-VII' in FIG. 7. In FIG. 8, a section of the frame region GA is a section of a part including a thin film transistor Tr included in the first electrode selection circuit 15. In FIG. 8, the section taken along line VII-VII' in the detection region FA and the section of the part including the thin film transistor Tr in the frame region GA are schematically connected in order to illustrate the relation between a layer structure of the detection region FA and a layer structure of the frame region GA.

As illustrated in FIG. 8, the thin film transistor Tr is provided in the frame region GA on the sensor substrate 21. The thin film transistor Tr includes a semiconductor layer 61, a source electrode 62, a drain electrode 63, and a gate electrode 64. The gate electrode 64 is provided on the sensor substrate 21. A first inter-layer insulating film 81 is provided on the sensor substrate 21 and covers the gate electrode 64. The gate electrode 64 is made of aluminum (Al), copper (Cu), silver (Ag), molybdenum (Mo), or alloy of these materials. The first inter-layer insulating film 81 is made of a silicon oxide film (SiO), a silicon nitride film (SiN), or a silicon oxidize nitride film (SiON). The first inter-layer insulating film 81 is not limited to a single layer but may be a film of a multilayered structure. For example, the first inter-layer insulating film 81 may be a film of a multilayered structure in which a silicon nitride film is formed on a silicon oxide film.

The semiconductor layer 61 is provided on the first inter-layer insulating film 81. A second interlayer insulating film 82 is provided on the first inter-layer insulating film 81 and covers the semiconductor layer 61. The semiconductor layer 61 is exposed at a bottom part of a contact hole provided in the second interlayer insulating film 82. The semiconductor layer 61 is made of polysilicon or oxide semiconductor. The second interlayer insulating film 82 is made of a silicon oxide film, a silicon nitride film, or a silicon oxidize nitride film. The second interlayer insulating film 82 is not limited to a single layer but may be a film of a multilayered structure. For example, the second interlayer insulating film 82 may be a film of a multilayered structure in which a silicon nitride film is formed on a silicon oxide film.

The source electrode 62 and the drain electrode 63 are provided on the second interlayer insulating film 82. The source electrode 62 and the drain electrode 63 are each coupled to the semiconductor layer 61 through a contact hole provided in the second interlayer insulating film 82. The source electrode 62, the drain electrode 63, and the coupling parts 24 are made of titanium aluminide (TiAl), which is alloy of titanium and aluminum.

In addition, an insulating resin layer 27 and the electrode parts 23b and the coupling parts 24 of the first electrodes Tx are provided on the second interlayer insulating film 82. The resin layer 27 provided in the frame region GA covers the source electrode 62 and the drain electrode 63. The drain electrode 63 is electrically coupled to a first electrode Tx through a contact hole provided in the resin layer 27 provided in the frame region GA.

The resin layer 27 provided in the detection region FA includes a first resin layer 27A and a second resin layer 27B thinner than the first resin layer 27A. The first resin layer 27A covers portions of the coupling parts 24 that are positioned directly below the second electrodes Rx. The second resin layer 27B provided in the detection region FA covers portions of the coupling parts 24 that are positioned directly below the electrode parts 23b.

Contact holes H1 and H2 are provided in the second resin layer 27B. In the detection region FA, outer edges of the electrode parts 23b are coupled to the coupling parts 24 through the contact holes H1 and H2. In this example, the electrode parts 23b are in contact with the second interlayer insulating film 82.

The second electrodes Rx are provided on the first resin layer 27A. Each second electrode Rx includes, for example, a first metal layer 141, a second metal layer 142, and a third metal layer 143. The second metal layer 142 is provided on the third metal layer 143, and the first metal layer 141 is provided on the second metal layer 142. For example, the first metal layer 141 and the third metal layer 143 are made of molybdenum or molybdenum alloy. The second metal layer 142 is made of aluminum or aluminum alloy. Molybdenum or molybdenum alloy, of which the first metal layer 141 is made has a visible light reflective index lower than that of aluminum or aluminum alloy, of which the second metal layer 142 is made. Thus, the second electrodes Rx are not visually recognizable.

An insulating film 83 is provided on the resin layer 27, the electrode parts 23b, and the second electrodes Rx. The insulating film 83 covers the upper and side surfaces of the second electrodes Rx. The insulating film 83 is made of a film having a high refractive index and a low reflective index, such as a silicon nitride film.

With the above-described configuration, the first electrodes Tx and the second electrodes Rx are formed on the same sensor substrate 21. The first electrodes Tx and the second electrodes Rx are provided in different layers with the resin layer 27 as an insulating layer interposed therebetween.

The following describes a personal authentication data acquisition period of the personal authentication system 1 and the personal authentication device 1a according to the embodiment.

Figure 9:
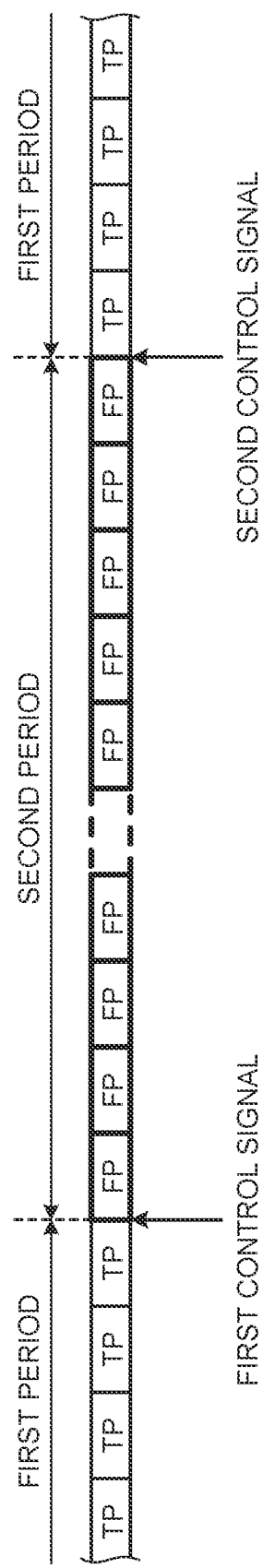
FIG. 9 is a timing chart illustrating exemplary operation of switching between a first period and a second period.

In the present disclosure, the personal authentication data acquisition period of the personal authentication system 1 and the personal authentication device 1a includes a first period and a second period. The first period includes a touch detection period (coordinate detection period) in which touch detection is executed, and the second period includes a fingerprint detection period (surface information detection period) in which fingerprint detection is executed. FIG. 9 is a timing chart illustrating exemplary operation of switching between the first period and the second period. In FIG. 9, TP indicates the touch detection period (coordinate detection period), and FP indicates the fingerprint detection period (surface information detection period).

As illustrated in FIG. 9, the personal authentication system 1 and the personal authentication device 1a according to the present embodiment transition from the first period to the second period based on a first control signal output from the processor 50. The personal authentication system 1 and the personal authentication device 1a according to the present embodiment transition from the second period to the first period based on a second control signal output from the processor 50.

Figure 10:
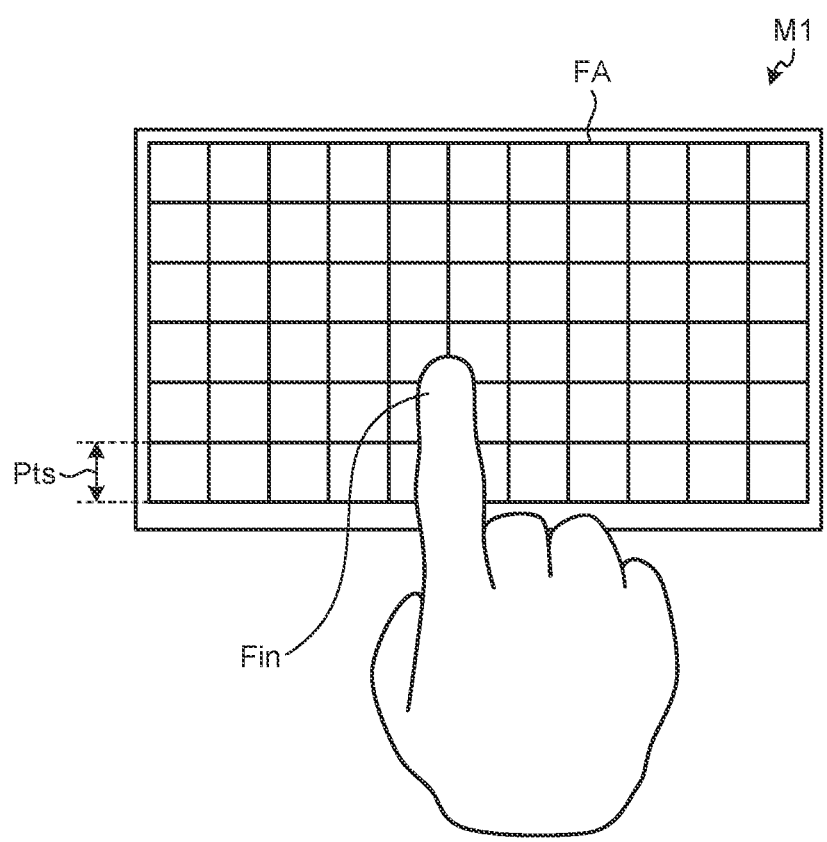
FIG. 10 is a diagram illustrating an exemplary first detection mode.
Figure 11:
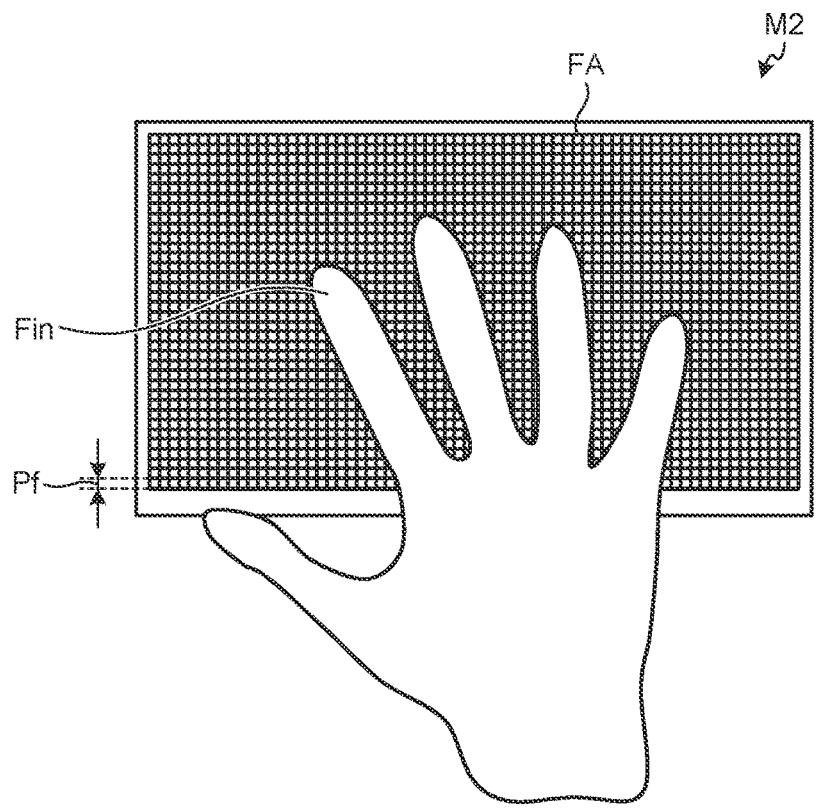
FIG. 11 is a diagram illustrating an exemplary second detection mode.
Figure 12:
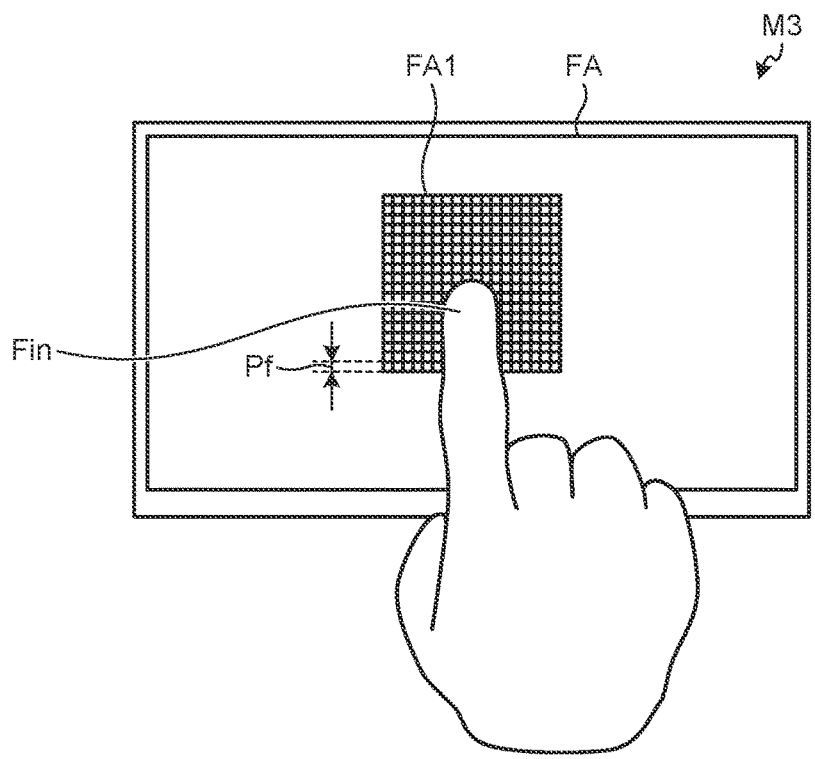
FIG. 12 is a diagram illustrating an exemplary third detection mode.

The following describes a specific example of detection modes of the personal authentication system 1 and the personal authentication device 1a. FIG. 10 is a diagram illustrating an exemplary first detection mode. FIG. 11 is a diagram illustrating an exemplary second detection mode. FIG. 12 is a diagram illustrating an exemplary third detection mode.

As illustrated in FIG. 10, in the first detection mode M1, the personal authentication system 1 and the personal authentication device 1a perform detection of the finger Fin or the like, more specifically, detection of the position of the finger on the detection surface (coordinate position of the finger on the detection surface) by scanning the entire surface of the detection region FA at a first detection pitch Pts that is larger than in the second detection mode M2 (refer to FIG. 11). In the first detection mode M1, the first electrode selection circuit 15 handles, as one first electrode block, collectively more than one of the first electrodes Tx that are adjacent or disposed at a predetermined pitch and supplies the first drive signal Vtx1 to each first electrode block. The same first drive signal Vtx1 is simultaneously supplied to the first electrodes Tx included in each first electrode block. With this, in the first detection mode M1, detection can be performed at the first detection pitch Pts that is larger than in the second detection mode M2 to be described later. In the first detection mode M1, the detection electrode selection circuit 16 may handle, as one second electrode block, collectively more than one of the second electrodes Rx that are adjacent or disposed at a predetermined pitch and supply the second drive signal Vtx2 to each second electrode block. All second electrodes Rx may be each coupled to the detector 40.

As illustrated in FIG. 11, in the second detection mode M2, the personal authentication system 1 and the personal authentication device 1a perform detection of the finger Fin or the like, more specifically, detection of asperities on the surface of the detection target body on the detection surface (for example, a fingerprint image of the detection target body in contact with the detection surface) by scanning the entire surface of the detection region FA at a second detection pitch Pf that is smaller than in the first detection mode M1 (refer to FIG. 10). In the second detection mode M2, the first electrode selection circuit 15 supplies, to each first electrode Tx, the second drive signal Vtx2 with a phase determined based on a predetermined sign. Alternatively, the first electrode selection circuit 15 may individually scan the first electrodes Tx and supply a pulsed wave as the second drive signal Vtx2 along with the scanning. Hereinafter, supply of the second drive signal Vtx2 includes both aspects. With this operation, in the second detection mode M2, the personal authentication system 1 and the personal authentication device 1a can perform detection at the second detection pitch Pf that is smaller than in the first detection mode M1. More specifically, it may happen that although a finger is in contact with the detection surface at macroscopic viewpoint, part of the finger is in contact with the detection surface while the other part is slightly separated from the detection surface due to asperities on the surface of the finger at microscopic viewpoint. The second detection mode M2 is a mode of detecting asperities on the surface of the detection target body (in this example, asperities on the surface of the finger, in other words, fingerprint) at microscopic viewpoint. The second detection pitch Pf only needs to be smaller than the first detection pitch, and the smallest second detection pitch is a pitch between two adjacent first electrodes or two adjacent detection electrodes intersecting them.

In the second detection mode M2, the personal authentication system 1 and the personal authentication device 1a perform detection on the entire surface of the detection region FA. Thus, the personal authentication system 1 and the personal authentication device 1a are not limited to fingerprint detection but can detect, for example, a palm print. Alternatively, the personal authentication system 1 and the personal authentication device 1a can detect the shape of a hand in contact with or in proximity to the detection region FA and identify the position of a fingertip. In this case, a fingerprint can be detected by performing signal processing and arithmetic processing only in a region in which the fingertip is in a contact state or in a proximity state.

In fingerprint detection, a fingerprint region in which detection is to be performed on the detection surface may be a partial region of the detection surface. For example, as illustrated in FIG. 12, in the third detection mode M3, the personal authentication system 1 and the personal authentication device 1a perform detection at the second detection pitch Pf in a first partial region FA1 as a part of the detection region FA. In the third detection mode M3, the first electrode selection circuit 15 supplies the second drive signal Vtx2 only to first electrodes Tx included in the first partial region FA1. In the third detection mode M3 as well, the personal authentication system 1 and the personal authentication device 1a can perform detection at the second detection pitch Pf. For example, in the third detection mode M3, since detection is performed only in the first partial region FA1, time required for detection can be reduced, and processing performed by the detector 40 (refer to FIGS. 4A and 4B) can be reduced. The first partial region FA1 is a fixed region set in advance. However, the position and size of the first partial region FA1 may be changed as appropriate.

Fingerprint detection may be executed in the third detection mode M3 in place of the second detection mode M2 described above. Specifically, touch detection in the first detection mode M1 is executed in the first period, and fingerprint detection in the third detection mode M3 is executed in the second period. With this, the fingerprint detection period FP can be shortened and time required for detection can be reduced.

Figure 13:
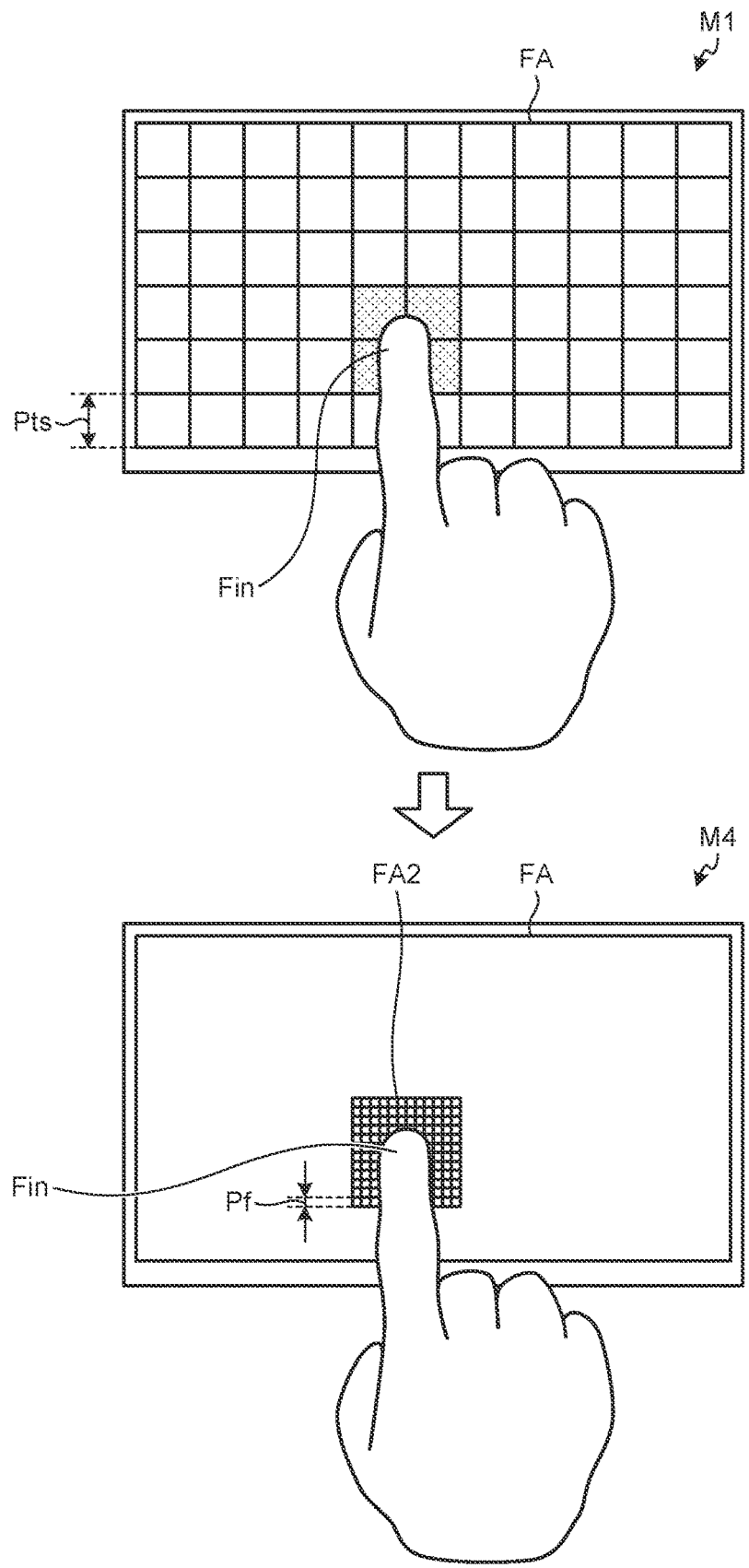
FIG. 13 is a diagram illustrating an exemplary fourth detection mode.

FIG. 13 is a diagram illustrating an exemplary fourth detection mode. For example, the personal authentication system 1 and the personal authentication device 1a execute touch detection in the first detection mode M1 in the first period, thereby detecting whether a finger is in contact with the detection surface. When having detected the finger Fin or the like, the personal authentication system 1 and the personal authentication device 1a transition from the first period to the second period and execute fingerprint detection in the fourth detection mode M4. In the fourth detection mode M4, the personal authentication system 1 and the personal authentication device 1a perform detection at the second detection pitch Pf only in a second partial region FA2 that is a predetermined region including a position at which the finger Fin or the like is detected. The position and size of the second partial region FA2 can be changed based on information of the finger Fin or the like detected in the touch detection period TP. In this manner, fingerprint detection in the fourth detection mode M4 may be performed based on a result of detection in the first detection mode M1. With this, the area of the second partial region FA2 can be reduced, and thus time required for fingerprint detection can be significantly reduced as compared to a case in which fingerprint detection is performed across the entire surface of the detection region.

The following describes a personal authentication method according to the present disclosure. In the present disclosure, fingerprint detection for personal authentication is performed in units of regions partitioned at the minimum second detection pitch Pf in the detection region FA. A personal authentication method performed by the personal authentication system 1 and the personal authentication device 1a is not limited to any personal authentication method described below.

FIG. 14 is a diagram illustrating an exemplary detection region on a screen of the display device 100 when fingerprint authentication is performed in a personal authentication method according to a first embodiment. In the personal authentication method according to the present embodiment, as illustrated in FIG. 14, a plurality of first regions KY in which different input keys are respectively allocated are provided in the detection region FA when fingerprint authentication is to be performed. In the example illustrated in FIG. 14, the input keys are provided in 10 first regions KY "0", "1", "2", . . . , "9" in which 10 numbers of "0" to "9" are respectively allocated. The input keys are not limited to numbers but may include, for example, alphabets in uppercase and lowercase and symbols such as "#" and "*".

When fingerprint authentication is performed in the personal authentication method according to the present embodiment, the personal authentication system 1 and the personal authentication device 1a perform touch detection in the second detection mode M2 described above and identify a key input by a user. Specifically, when the coordinates of a touch in the detection region FA by the user are, for example, coordinates in the first region KY "5", the personal authentication system 1 and the personal authentication device 1a identify inputting of the input key "5".

In the personal authentication method according to the present embodiment, when the coordinates of a touch in the detection region FA by the user correspond to any of the first region KY "0", "1", "2", . . . , "9", a certain region having coordinates C of a center (hereinafter, referred to as center coordinates C) is defined as a second region FG, and the second region FG is set as a region in which a fingerprint image is to be acquired when fingerprint authentication is performed.

Figure 15:
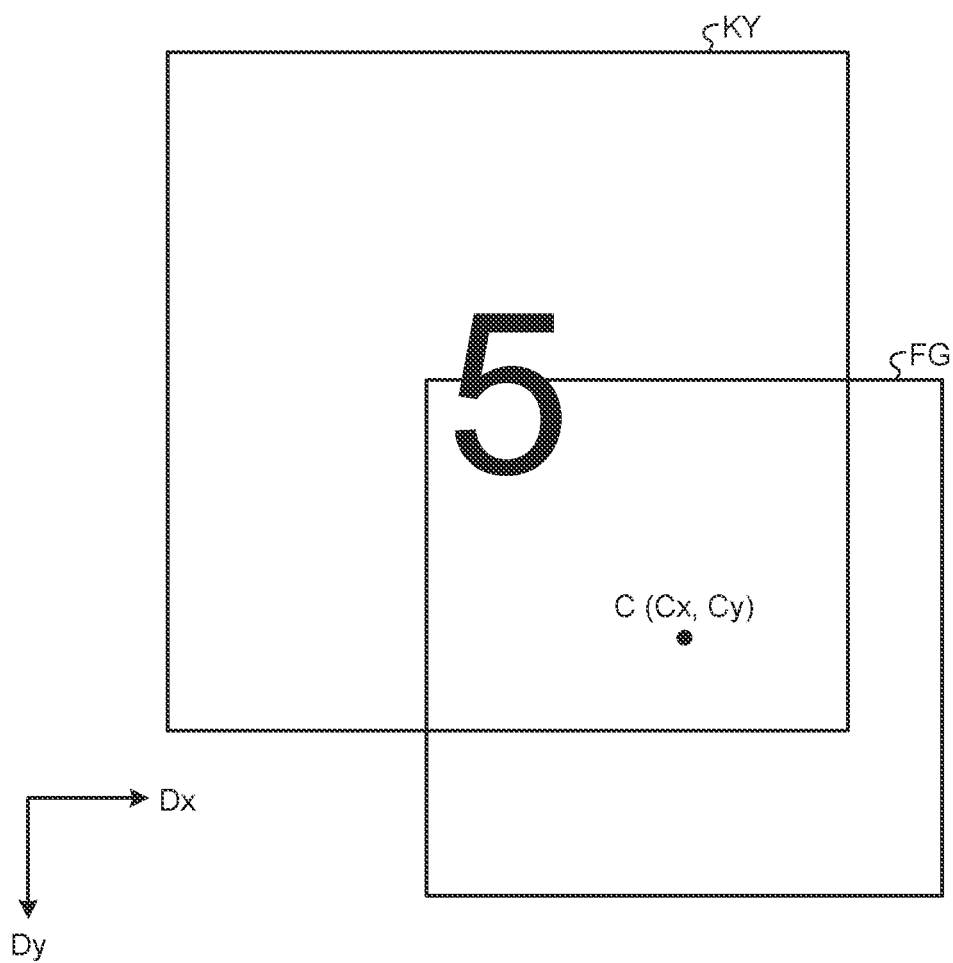
FIG. 15 is a diagram illustrating the positional relation between a first region and a second region.

FIG. 15 is a diagram illustrating the positional relation between a first region and the second region. In the example illustrated in FIG. 15, the coordinates at which inputting of the input key "5" in password inputting for personal authentication has been identified, are defined to be the center coordinates C(Cx, Cy) of the second region FG. Specifically, a user touches the detection surface to touch the input key "5" but touches a position that slightly deviates from the center position of the input key "5", and as a result of arithmetic processing of the touch by the detector and the processor, the center position touched by the user is recognized as the center coordinates C(Cx, Cy). Then, the second region FG for fingerprint detection is determined based on the relation with the center coordinates C.

In the personal authentication method according to the present embodiment, an image of a region smaller than the second region FG illustrated in FIG. 15 is acquired each time a key in a password is input. With this, both a detection region to be detected during a time in which a touch on each input key is maintained in password inputting and an image acquired as a result can be made as small as possible. Thus, the accuracy of an image acquired for each key inputting of the password can be increased.

First Embodiment

Figure 16A:
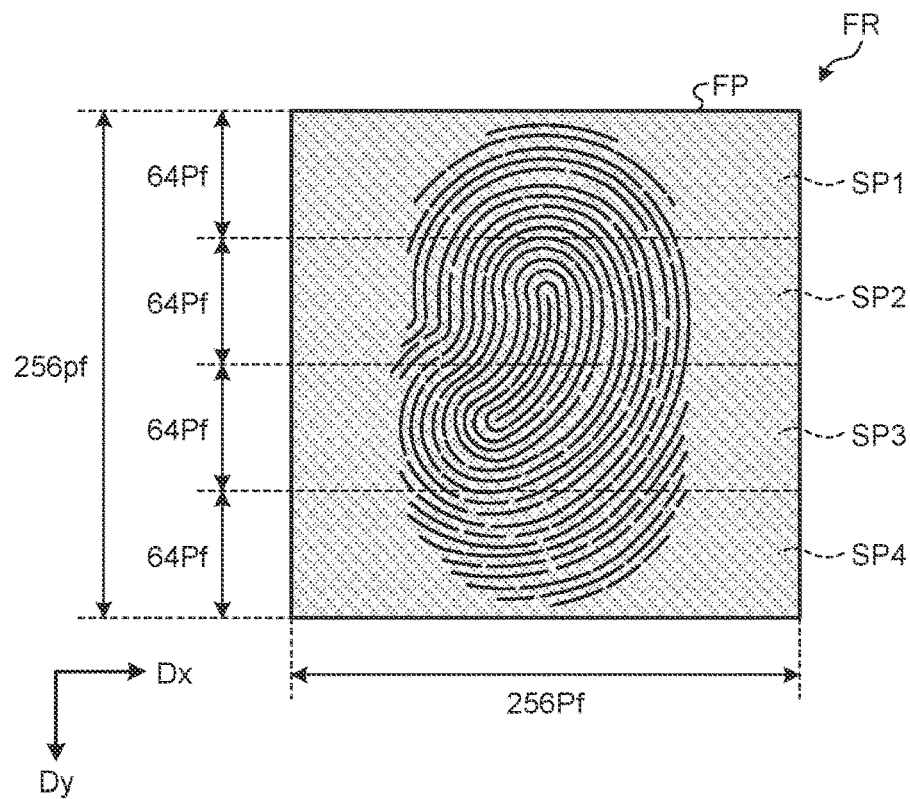
FIG. 16A is a first diagram illustrating an exemplary segmentation pattern of a fingerprint image in the first embodiment.
Figure 16B:
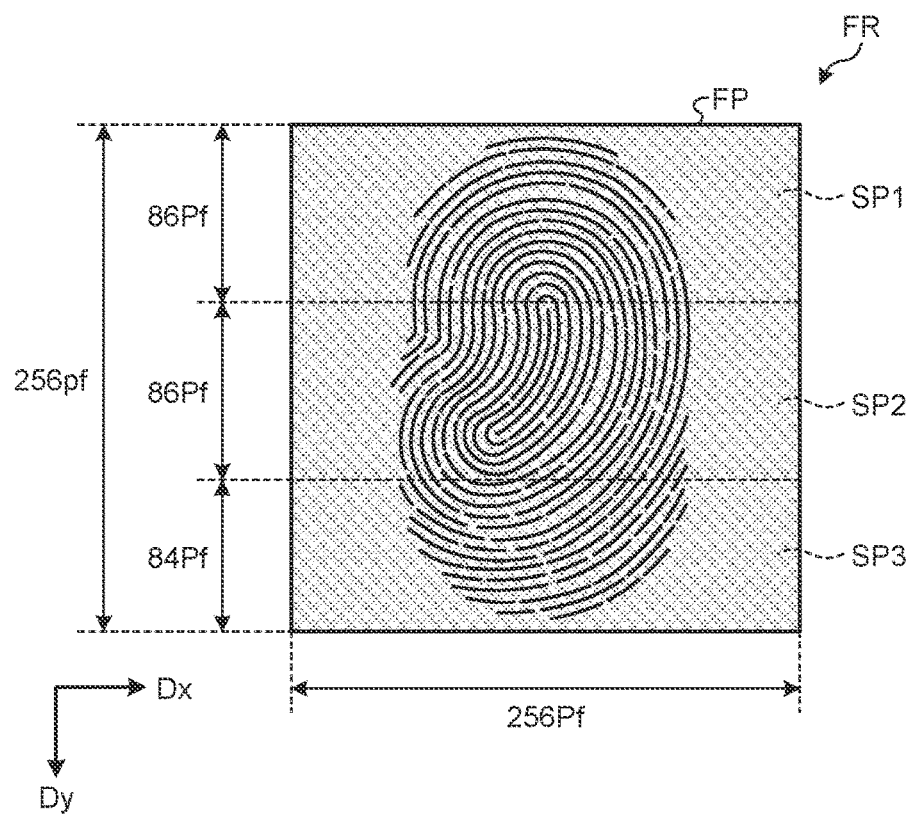
FIG. 16B is a second diagram illustrating an exemplary segmentation pattern of the fingerprint image in the first embodiment.

FIG. 16A is a first diagram illustrating an exemplary segmentation pattern of a fingerprint image in the first embodiment. FIG. 16B is a second diagram illustrating an exemplary segmentation pattern of a fingerprint image in the first embodiment.

In the present disclosure, when fingerprint registration is to be performed, a fingerprint image FP of a finger touching a fingerprint registration region FR provided at a predetermined position in the detection region FA is registered. The size of the fingerprint image FP is equal to the size of the second region FG when fingerprint authentication is performed. In the examples illustrated in FIGS. 16A and 16B, the size of the fingerprint image FP in the fingerprint registration region FR is 256×256 Pf (hereinafter also simply referred to as "256×256") with 256 Pf (256 rows of electrodes Tx) in the first direction Dx and 256 Pf (256 columns of electrodes Rx) in the second direction Dy.

FIG. 16A illustrates an exemplary segmentation pattern in which the fingerprint image FP is segmented into four segmented images SP1, SP2, SP3, and SP4 in the second direction Dy. In the segmentation pattern illustrated in FIG. 16A, the sizes of the segmented images SP1, SP2, SP3, and SP4 in the second direction Dy are equal to one another in the second direction Dy and are each 64 Pf (256/4 Pf).

FIG. 16B illustrates an exemplary segmentation pattern in which the fingerprint image FP is segmented into three segmented images SP1, SP2, and SP3 in the second direction Dy. In the segmentation pattern illustrated in FIG. 16B, the sizes of the segmented images SP1 and SP2 in the second direction Dy are each 86 Pf, and the size of the segmented image SP3 in the second direction Dy is 84 Pf.

In the present disclosure, the number N of digits of a personal authentication password when fingerprint authentication is performed (hereinafter also referred to as "at fingerprint authentication") is equal to or larger than the number M of segments, in other words, the number of segmented images SP of the fingerprint image FP acquired when fingerprint registration is performed (hereinafter also referred to as "at fingerprint registration") (N≥M). Specifically, as in the exemplary segmentation pattern illustrated in FIG. 16A, the number N of password digits may be equal to or larger than four (N≥4) when the number M of segments of the fingerprint image FP is four (M=4). As in the exemplary segmentation pattern illustrated in FIG. 16B, the number N of password digits may be equal to or larger than three (N≥3) when the number M of segments of the fingerprint image FP is three (M=3).

In the present disclosure, the segmentation direction of the fingerprint image FP, the number M of segments, and the relative sizes of the segmented images SPm are set at fingerprint registration. The segmentation direction of the fingerprint image FP, the number M of segments, and the relative sizes of the segmented images SPm that have been set at fingerprint registration are applied at fingerprint authentication to perform fingerprint collation. The segmentation direction of the fingerprint image FP, the number M of segments, and the relative sizes of the segmented images SPm are determined based on, for example, the positions of feature points to be used for fingerprint collation. FIG. 17 is a diagram illustrating feature points of the fingerprint image of the exemplary segmentation pattern illustrated in FIG. 16A. FIG. 18 is a diagram illustrating a specific example of the feature points used for fingerprint collation.

In the present disclosure, a feature point used for fingerprint collation is a portion in the fingerprint image FP having a characteristic to be referred in a determination for identifying a person, such as a bifurcation point (branch point) BP, an end point EP, or a delta DP of a fingerprint pattern as illustrated with dashed lines in FIG. 18. In the present disclosure, in fingerprint registration processing to be described later, feature points of the fingerprint image FP are extracted and registered for each segmented image. In fingerprint authentication processing, the feature points of the fingerprint image FP registered in the fingerprint registration processing are extracted for each segmented image, and the kind (such as a bifurcation point, an end point, or a delta) of each feature point, the direction of each feature point with respect to the center point of the fingerprint image FP, the distance of each feature point from the center point, and the like are collated by using a fingerprint collation algorithm. The present disclosure is not limited by the fingerprint collation algorithm used in the fingerprint authentication processing.

Figures 19, 20:
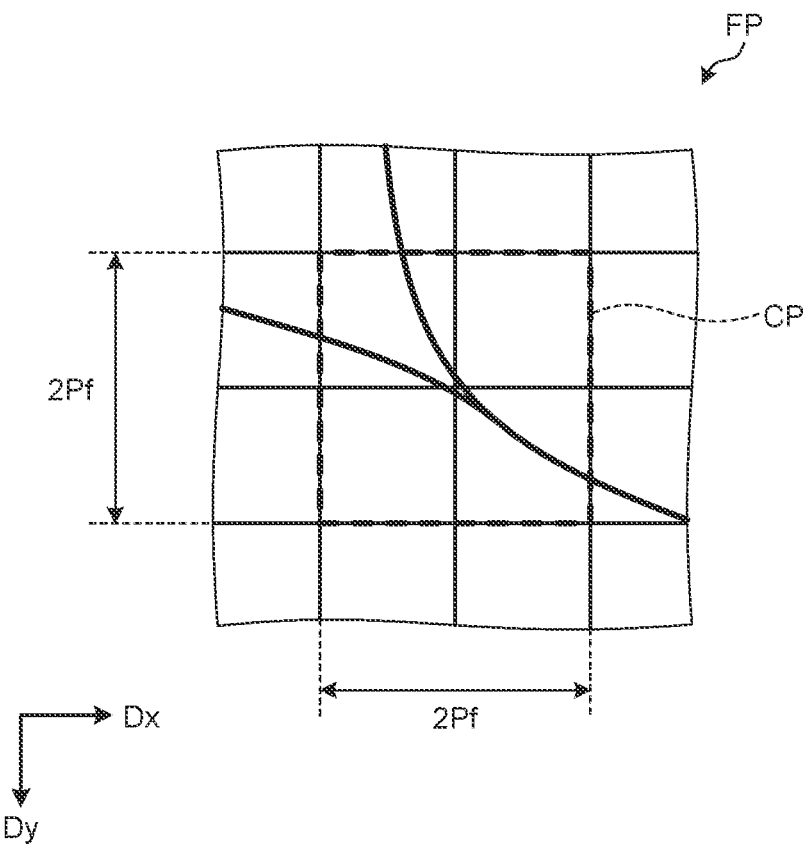
FIG. 19 is a diagram illustrating the number of feature points included in each segmented region.
FIG. 20 is a conceptual diagram illustrating an exemplary feature point identification region.

FIG. 19 is a diagram illustrating the number of feature points included in each segmented image. FIG. 19 exemplarily illustrates the number of feature points of each of the segmented images SP1, SP2, SP3, and SP4 illustrated in FIG. 17.

When a feature point is positioned near the boundary between any segmented images of the segmented images SP1, SP2, SP3, and SP4, the number of feature points acquired at fingerprint registration potentially does not match the number of feature points acquired at fingerprint authentication. Specifically, for example, a feature point positioned on the boundary line between the segmented images SP1 and SP2 illustrated in FIG. 17 is potentially acquired as a feature point of each of the adjacent segmented images SP1 and SP2 (registration duplication) or is potentially not acquired as a feature point of any of the adjacent segmented images SP1 and SP2 (registration omission).

In the present disclosure, at fingerprint registration, a region that can be identified as a feature point on a fingerprint image is set as a feature point identification region CP in fingerprint collation. FIG. 20 is a conceptual diagram illustrating an exemplary feature point identification region.

In FIG. 20, a bifurcation point of a fingerprint pattern is exemplarily illustrated as a feature point of the fingerprint image FP. In the present disclosure, a region of (xxy) Pf (hereinafter also simply referred to as "xxy") with xPf in the first direction Dx and yPf in the second direction Dy is set as the feature point identification region CP in the fingerprint image FP acquired at fingerprint registration. In the example illustrated in FIG. 20, a 2×2 region in the fingerprint image FP is set as the feature point identification region CP. The following description will be made on an example in which a 2×2 region in the fingerprint image FP is set as the feature point identification region CP. However, a region of 3×3 or larger in the fingerprint image FP, for example, may be set as the feature point identification region CP, and a region set as the feature point identification region CP does not necessarily need to have a rectangular shape of xxy. The present disclosure is not limited by the size nor shape of the feature point identification region CP in the fingerprint image FP.

In the present disclosure, a plurality of segmentation patterns in each of which the segmentation direction of the fingerprint image FP, the number M of segments, and the relative sizes of the segmented images SPm are defined, are held in advance. At fingerprint registration, a segmentation pattern in which no segmentation positions of segmented images overlap the feature point identification region CP is selected to acquire segmented images.

FIG. 21 is a diagram illustrating a specific example of segmentation patterns in personal authentication processing according to the first embodiment. In each segmentation pattern (M_s_o) illustrated in FIG. 21, the numerical value of each segmented image SPm represents the size (Pf) of the segmented image SP in the second direction Dy. In each segmentation pattern (M_s_o), M represents the number of segments of the fingerprint image FP, s represents a segmented image size number in the second direction Dy, and o represents a segmented image arrangement order number.

In each segmentation pattern illustrated in FIG. 21, the segmentation direction is the second direction Dy (refer to FIGS. 16A and 16B). In the present embodiment, the number M of segments of the fingerprint image FP in each segmentation pattern is three or four (M=3 or 4).

In a segmentation pattern in which the number M of segments is 3, the pattern of the size of each segmented image SP in the second direction Dy is A=86 or B=84, and the segmentation pattern (M_s_o) has three variations (s=1 and o=1, 2, 3) of combination of these patterns.

In a segmentation pattern in which the number M of segments is 4, the pattern of the size of each segmented image SP in the second direction Dy is A=66, 70, 74, 78, 82, 86, B=64, 66, 68, or C=42, 46, 50, 54, 58, 62, and the relation of A>B>C is satisfied. The segmentation pattern (M_s_o) has 111 variations including 110 variations (s=1 to 10 and o=1 to 11) of combination of one segmented image SP having the size pattern A in the second direction Dy, two segmented images SP having the size pattern B in the second direction Dy, and one segmented image SP having the size pattern C in the second direction Dy, and one variation (s=11, o=12) of all segmented images SP1, SP2, SP3, and SP4 having the size of 64 in the second direction Dy.

In the present disclosure, the personal authentication system 1 and the personal authentication device 1a execute the fingerprint registration processing of a user as a prerequisite for execution of the personal authentication processing. The following describes specific configurations and operation for executing the fingerprint registration processing and the personal authentication processing according to the embodiment.

Referring back to FIGS. 4A and 4B, the processor 50 includes a touch determinator 51, a detection start coordinate setter 52, a data receiver 53, a fingerprint image storage 54, a fingerprint image generator 55, a fingerprint authenticator 58, a fingerprint authentication result storage 59, a password storage 511, a password authenticator 512, a password authentication result storage 513, a personal authenticator 514, and a personal authentication result storage 515. The fingerprint image storage 54, the fingerprint authentication result storage 59, the password storage 511, the password authentication result storage 513, and the personal authentication result storage 515 may be each, for example, a random-access memory (RAM), a read-only memory (ROM), or a register circuit. Alternatively, the fingerprint image storage 54, the fingerprint authentication result storage 59, the password storage 511, the password authentication result storage 513, and the personal authentication result storage 515 may be, for example, a single RAM, ROM, or register circuit.

The touch determinator 51 determines whether the touch state is valid in the personal authentication method according to the present disclosure based on the touch detection coordinates of a touch detection position output from the detector 40 in the first period described above.

In the fingerprint registration processing, the "touch state that is valid in the personal authentication method according to the present disclosure" means that the coordinates of a touch in the detection region FA by a user, in other words, the touch detection coordinates of a touch detection position output from the detector 40 are coordinates in the fingerprint registration region FR illustrated in FIGS. 16A and 16B.

In the fingerprint registration processing, when a touch is detected at the coordinates of a position in the fingerprint registration region FR, the touch determinator 51 outputs, to the detection controller 11, the first control signal for transition from the first period to the second period described above.

In the personal authentication processing, the "touch state that is valid in the personal authentication method according to the present disclosure" means that the coordinates of a touch in the detection region FA by a user, in other words, the touch detection coordinates of a touch detection position output from the detector 40 are coordinates in a first region KY illustrated in FIG. 14.

Specifically, when it is determined that a position at coordinates in the fingerprint registration region FR or in a first region KY is in the touch state, the touch determinator 51 outputs, to the detection controller 11, the first control signal for transition from the first period to the second period described above. Hereinafter, in personal authentication processing, being in "the touch state that is valid in the personal authentication method according to the present disclosure" described above is expressed as being "key-input". Specifically, for example, when the touch detection coordinates of a touch detection position output from the detector 40 are coordinates in the first region KY "5" as illustrated in FIG. 15, it is expressed that "5" is key-input.

In other words, After a key inputting in personal authentication processing is detected, the touch determinator 51 outputs, to the detection controller 11, the first control signal for transition to the second period.

Then, the touch determinator 51 sequentially stores, in the password storage 511, a key ("5" in the example illustrated in FIG. 15) thus key-input in personal authentication processing.

When the touch determinator 51 has detected a touch at coordinates in the fingerprint registration region FR in the fingerprint registration processing, the detection start coordinate setter 52 sets, based on the touch detection coordinates of the touch, fingerprint image detection start coordinates S of a fingerprint image detection start position (first detection start coordinates) in the fingerprint registration processing.

Figure 22:
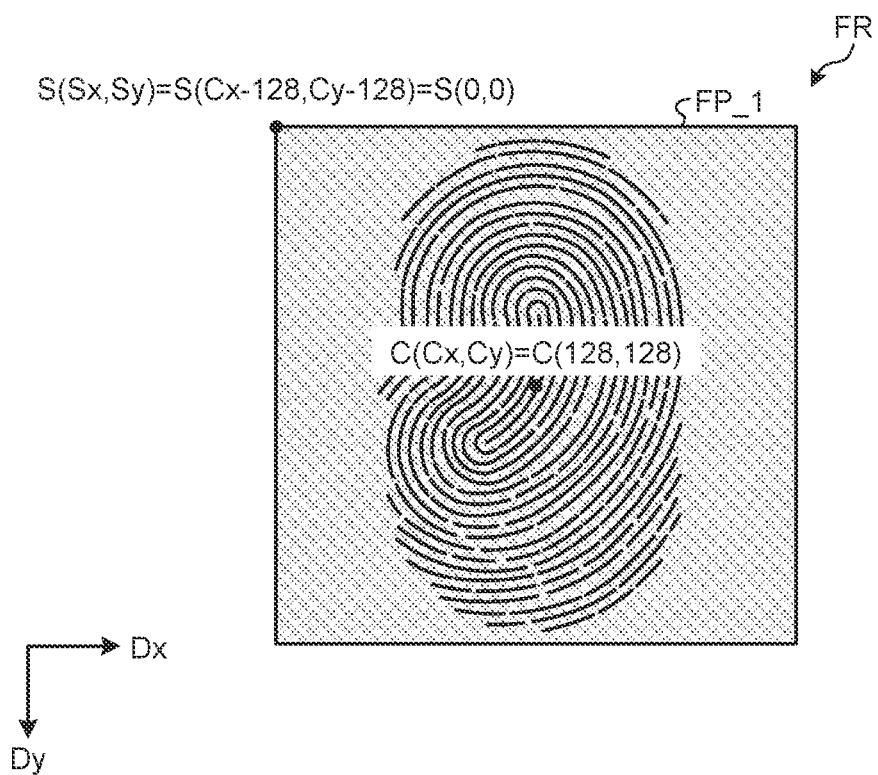
FIG. 22 is a diagram for description of a fingerprint image acquisition region in fingerprint registration processing according to the first embodiment.

FIG. 22 is a diagram for description of a fingerprint image acquisition region in the fingerprint registration processing according to the first embodiment. Coordinates C(Cx, Cy) illustrated in FIG. 22 are the touch detection coordinates of a touch in the fingerprint registration region FR.

In the present disclosure, the fingerprint image detection start coordinates S(Sx, Sy) of a fingerprint image detection start position in the fingerprint registration processing are values normalized with the touch detection coordinates in the fingerprint registration region FR as the center coordinates C(Cx, Cy)=C(128, 128).

Specifically, the fingerprint image detection start coordinates S(Sx, Sy) of the fingerprint image detection start position of a first fingerprint image FP 1 in the fingerprint registration processing are set to S(0, 0) (FIG. 22). In this case, the fingerprint detection region setter 46 of the detector 40 allocates, as a fingerprint image detection region for acquiring the first fingerprint image FP_1 for collation, a region having a 256×256 size with a starting point at the fingerprint image detection start coordinates S(0, 0) illustrated in FIG. 22. In other words, a 256×256 region defined based on the touch detection coordinates of a touch in the fingerprint registration region FR is allocated as the fingerprint image detection region.

When the touch determinator 51 has detected a key inputting in the personal authentication processing, the detection start coordinate setter 52 sets the segmented image detection start coordinates Sm (m is an integer of 1 to M) of a segmented image detection start position (second detection start coordinate) in the personal authentication processing based on the touch detection coordinates of a touch obtained by the key inputting in the second region FG and a segmentation pattern acquired from the fingerprint image storage 54.

Figure 23A:
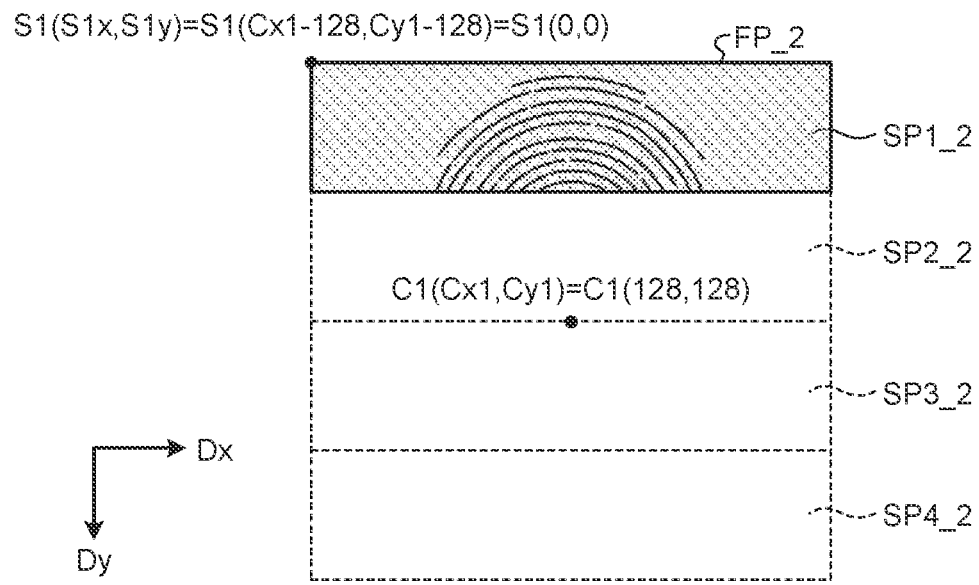
FIG. 23A is a diagram for description of a segmented image acquisition region in the personal authentication processing according to the first embodiment.
Figure 23B:
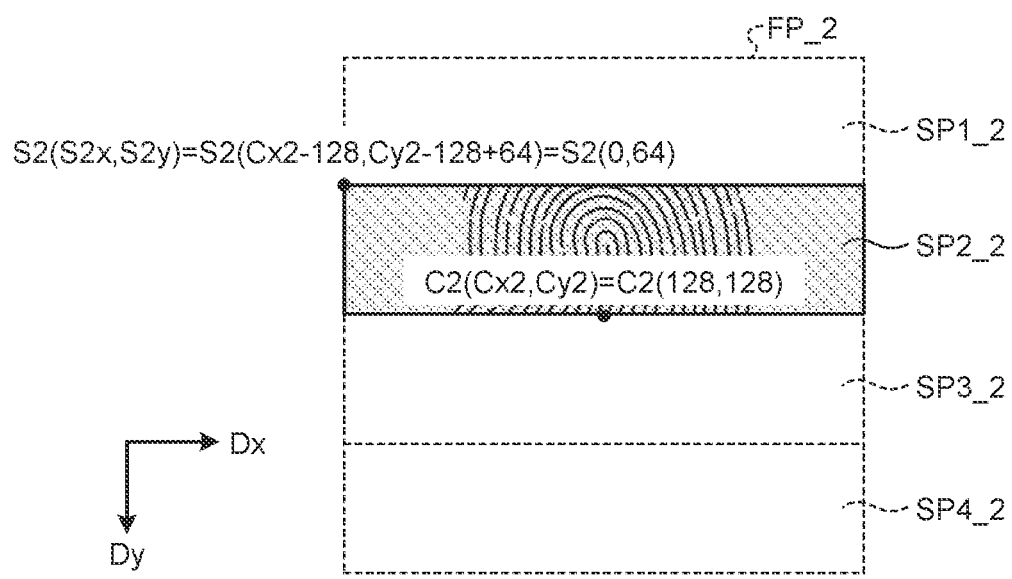
FIG. 23B is a diagram for description of a segmented image acquisition region in the personal authentication processing according to the first embodiment.
Figure 23C:
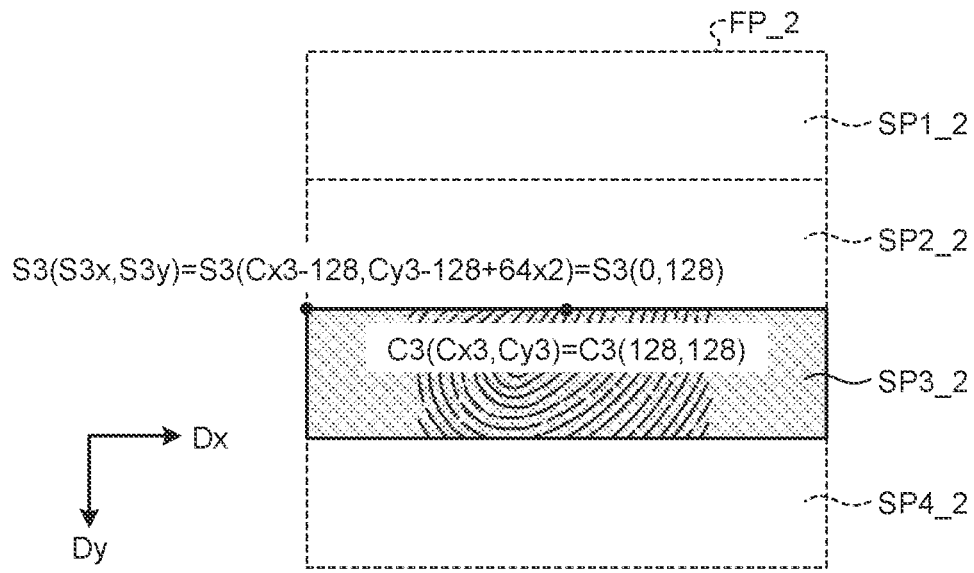
FIG. 23C is a diagram for description of a segmented image acquisition region in the personal authentication processing according to the first embodiment.
Figure 23D:
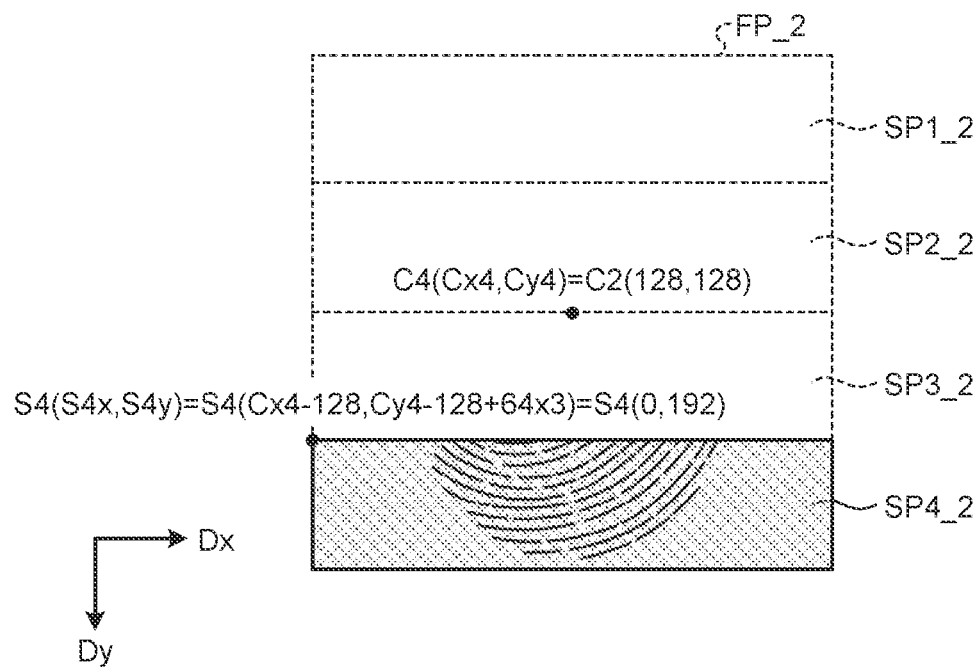
FIG. 23D is a diagram for description of a segmented image acquisition region in the personal authentication processing according to the first embodiment.

FIGS. 23A, 23B, 23C, and 23D are each a diagram for description of a segmented image acquisition region in the personal authentication processing according to the first embodiment. FIGS. 23A, 23B, 23C, and 23D exemplarily illustrate segmented image acquisition regions of second segmented images SPm_2 of a second fingerprint image FP_2 for authentication in a case of a segmentation pattern (4_11_12) illustrated in FIG. 21. FIG. 23A illustrates the segmented image acquisition region of the second segmented image SP1_2, FIG. 23B illustrates the segmented image acquisition region of the second segmented image SP2_2, FIG. 23C illustrates the segmented image acquisition region of the second segmented image SP3_2, and FIG. 23D illustrates the segmented image acquisition region of the second segmented image SP4_2.

In the present disclosure, the segmented image detection start coordinates Sm(Smx, Smy) of the segmented image detection start position in the personal authentication processing are values normalized with touch detection coordinates in a first region KY as center coordinates Cm(Cmx, Cmy)=Cm(128, 128) of the second region FG.

Specifically, the segmented image detection start coordinates S1(S1x, S1y) of the segmented image detection start position of the second segmented image SP1_2 in the personal authentication processing are set to S1(0, 0) (FIG. 23A). In this case, the fingerprint detection region setter 46 of the detector 40 allocates, as a segmented image detection region for acquiring the second segmented image SP1_2 of the second fingerprint image FP_2 for authentication, a region having a 256×64 size with a starting point at the segmented image detection start coordinates S1(0, 0) illustrated in FIG. 23A.

In addition, the segmented image detection start coordinates S2(S2x, S2y) of the segmented image detection start position of the second segmented image SP2_2 in the personal authentication processing are set to S2(0, 64) (FIG. 23B). In this case, the fingerprint detection region setter 46 of the detector 40 allocates, as a segmented image detection region for acquiring the second segmented image SP2_2 of the second fingerprint image FP_2 for authentication, a region having a 256×64 size with a starting point at the segmented image detection start coordinates S2(0, 64) illustrated in FIG. 23B. In other words, the second top segmented region when the second region FG defined based on the touch detection coordinates of a touch in the first region KY and having a 256×256 size is segmented into four in the second direction Dy is allocated.

In addition, the segmented image detection start coordinates S3(S3x, S3y) of the segmented image detection start position of the second segmented image SP3_2 in the personal authentication processing are set to S3(0, 128) (FIG. 23C). In this case, the fingerprint detection region setter 46 of the detector 40 allocates, as a segmented image detection region for acquiring the second segmented image SP3_2 of the second fingerprint image FP_2 for authentication, a region having a 256×64 size with a starting point at the segmented image detection start coordinates S3(0, 128) illustrated in FIG. 23C. In other words, the third top segmented region when the second region FG defined based on the touch detection coordinates of a touch in the first region KY and having a 256×256 size is segmented into four in the second direction Dy is allocated.

In addition, the segmented image detection start coordinates S4(S4x, S4y) of the segmented image detection start position of the second segmented image SP4_2 in the personal authentication processing are set to S4(0, 192) (FIG. 23D). In this case, the fingerprint detection region setter 46 of the detector 40 allocates, as a segmented image detection region for acquiring the second segmented image SP4_2 of the second fingerprint image FP_2 for authentication, a region having a 256×64 size with a starting point at the segmented image detection start coordinates S4(0, 192) illustrated in FIG. 23D. In other words, the fourth top segmented region when the second region FG defined based on the touch detection coordinates of a touch in the first region KY and having a 256×256 size is segmented into four in the second direction Dy is allocated.

In the fingerprint registration processing, the data receiver 53 receives fingerprint data output from the detector 40 in the second period described above.

In addition, in the personal authentication processing, the data receiver 53 receives segmentation data output from the detector 40 in the second period described above.

The segmentation patterns (M_s_o) illustrated in FIG. 21 are stored in the fingerprint image storage 54 in advance. FIG. 24 is a diagram illustrating an example of the number of segments and segmentation positions in a fingerprint image in a case of a segmentation pattern illustrated in FIG. 21. FIG. 24 exemplarily illustrates the number of segments and segmentation positions in a case of the segmentation pattern (4_11_12) illustrated in FIG. 21.

In the present embodiment, the number M of segments of a fingerprint image is three or four. Each segmentation position of a fingerprint image in the present embodiment is a row Smy including a position at the segmented image detection start coordinates Sm(Smx, Smy). Specifically, the segmentation positions of the segmentation pattern (4_11_12) illustrated in FIG. 21 are S1y=0 (row 0), S2y=64 (row 64), S3y=128 (row 128), and S4y=192 (row 192).

In addition, the feature point identification region CP extracted by the fingerprint image generator 55 in the fingerprint registration processing and M first segmented images SPm_1 generated by the fingerprint image generator 55 are stored in association with the segmentation pattern (M_s_o) in the fingerprint image storage 54.

FIG. 25 is a diagram illustrating an exemplary storage region in which the first segmented images are stored. In the present disclosure, the M first segmented images SPm_1 are stored at respective different addresses in the storage region in the fingerprint image storage 54 as illustrated in FIG. 25. Consequently, the risk of leakage of the first fingerprint image FP_1 for collation can be reduced.

In addition, M second segmented images SPm_2 generated by the fingerprint image generator 55 in the personal authentication processing are temporarily stored in the fingerprint image storage 54.

In the fingerprint registration processing, the fingerprint image generator 55 generates the first fingerprint image FP_1 for collation based on fingerprint data received by the data receiver 53. In addition, the fingerprint image generator 55 extracts the feature point identification region CP in the generated first fingerprint image FP_1 for collation and stores the extracted feature point identification region CP in the fingerprint image storage 54.

Figure 26:
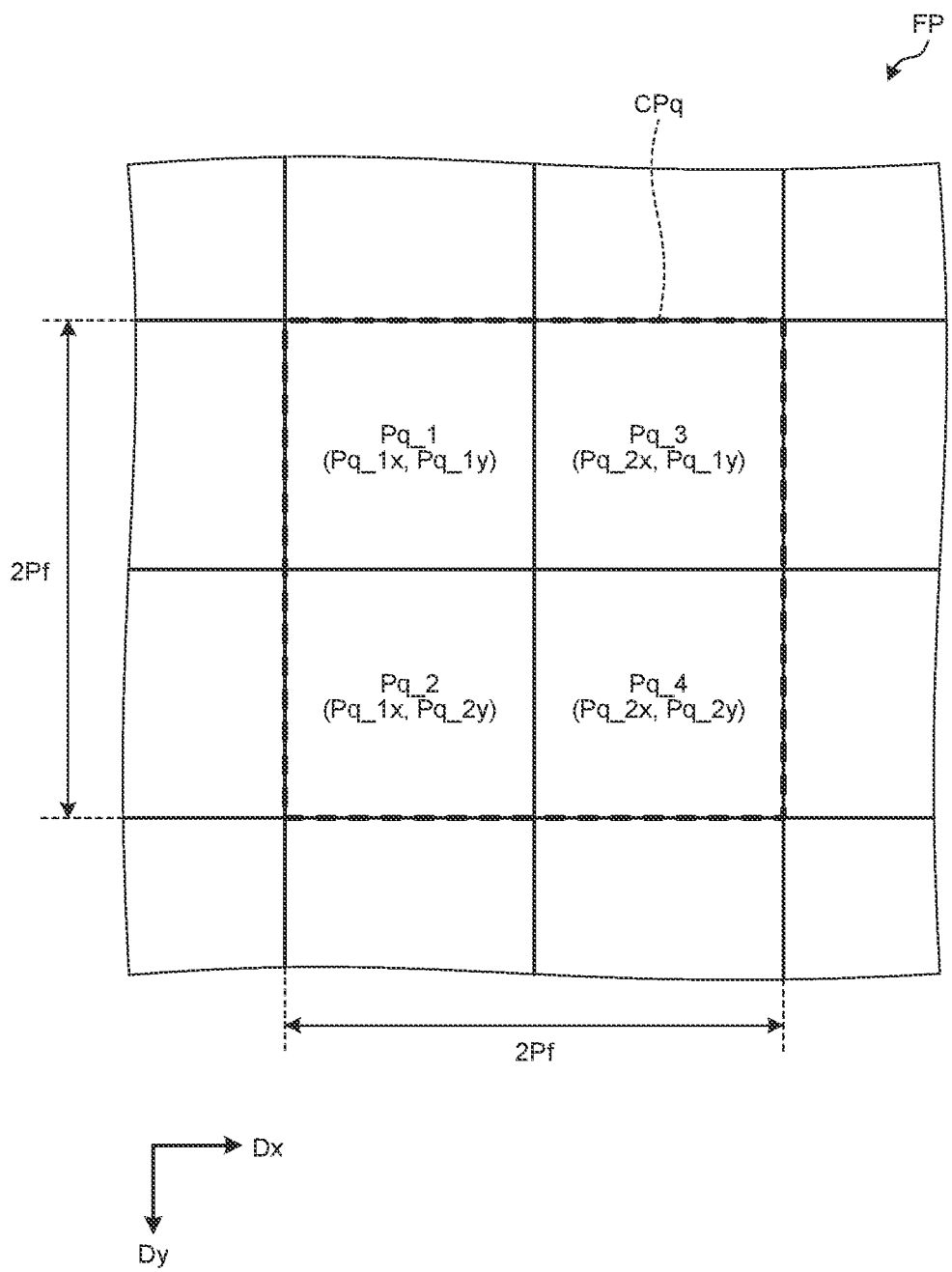
FIG. 26 is a diagram illustrating the coordinates of the feature point identification region illustrated in FIG. 20.

FIG. 26 is a diagram illustrating the coordinates of the feature point identification region illustrated in FIG. 20. FIG. 27 is a diagram illustrating exemplary coordinate information of feature point identification regions stored in the fingerprint image storage. FIGS. 26 and 27 illustrate an example in which Q 2×2 regions in the first fingerprint image FP_1 are extracted as feature point identification regions CPq.

The fingerprint image generator 55 performs segmentation processing of the generated first fingerprint image FP_1 for collation in the fingerprint registration processing. The segmentation processing of the first fingerprint image FP_1 for collation will be described later. In addition, the fingerprint image generator 55 stores the M first segmented images SPm_1 obtained through the segmentation processing in the fingerprint image storage 54 in association with the segmentation pattern (M_s_o). Then, the fingerprint image generator 55 outputs, to the detection controller 11, the second control signal for transition from the second period to the first period.

In the personal authentication processing, the fingerprint image generator 55 sequentially generates, based on the segmentation data received by the data receiver 53, the M second segmented images SPm_2 constituting the second fingerprint image FP_2 for authentication. The fingerprint image generator 55 temporarily stores the sequentially generated M second segmented images SPm_2 in the fingerprint image storage 54. Then, the fingerprint image generator 55 outputs, to the detection controller 11, the second control signal for transition from the second period to the first period.

The fingerprint authenticator 58 performs authentication determination processing of a fingerprint image. Specifically, the fingerprint authenticator 58 collates, for each segmented image number m, the first segmented images SPm_1 and the second segmented images SPm_2 stored in the fingerprint image storage 54. In this case, for example, the fingerprint authenticator 58 may collate a first segmented image SPm_1 and a second segmented image SPm_2 for each segmented image number m and determine that authentication is successful when a predetermined number of feature points match between the segmented images.

Alternatively, the fingerprint authenticator 58 may collate the first fingerprint image FP_1 obtained by compositing the M first segmented images SPm_1 and the second fingerprint image FP_2 obtained by compositing the M second segmented images SPm_2. In this case, for example, the fingerprint authenticator 58 may collate the composited first fingerprint image FP_1 and the composited second fingerprint image FP_2 and determine that authentication is successful when a predetermined number of feature points match between the fingerprint images.

Then, the fingerprint authenticator 58 stores a result of the fingerprint authentication determination in the fingerprint authentication result storage 59. The method of the fingerprint authentication determination by the fingerprint authenticator 58 is not limited to that described above, and the present disclosure is not limited by the fingerprint authentication determination method.

The password authenticator 512 generates an authentication password by compositing keys stored in the password storage 511, performs authentication determination processing on the authentication password, and stores the result of the password authentication determination in the password authentication result storage 513. Specifically, for example, the generated authentication password is collated with a collation password set in advance, and it is determined that authentication is successful when matching is made.

The personal authenticator 514 refers to the password authentication determination result stored in the password authentication result storage 513 and the fingerprint authentication determination result stored in the fingerprint authentication result storage 59, performs personal authentication determination processing, and stores the result of the personal authentication processing in the personal authentication result storage 515. Specifically, the personal authenticator 514 determines that personal authentication is successful when the password authentication determination result indicates that authentication is successful and the fingerprint authentication determination result indicates that authentication is successful.

Figure 28:
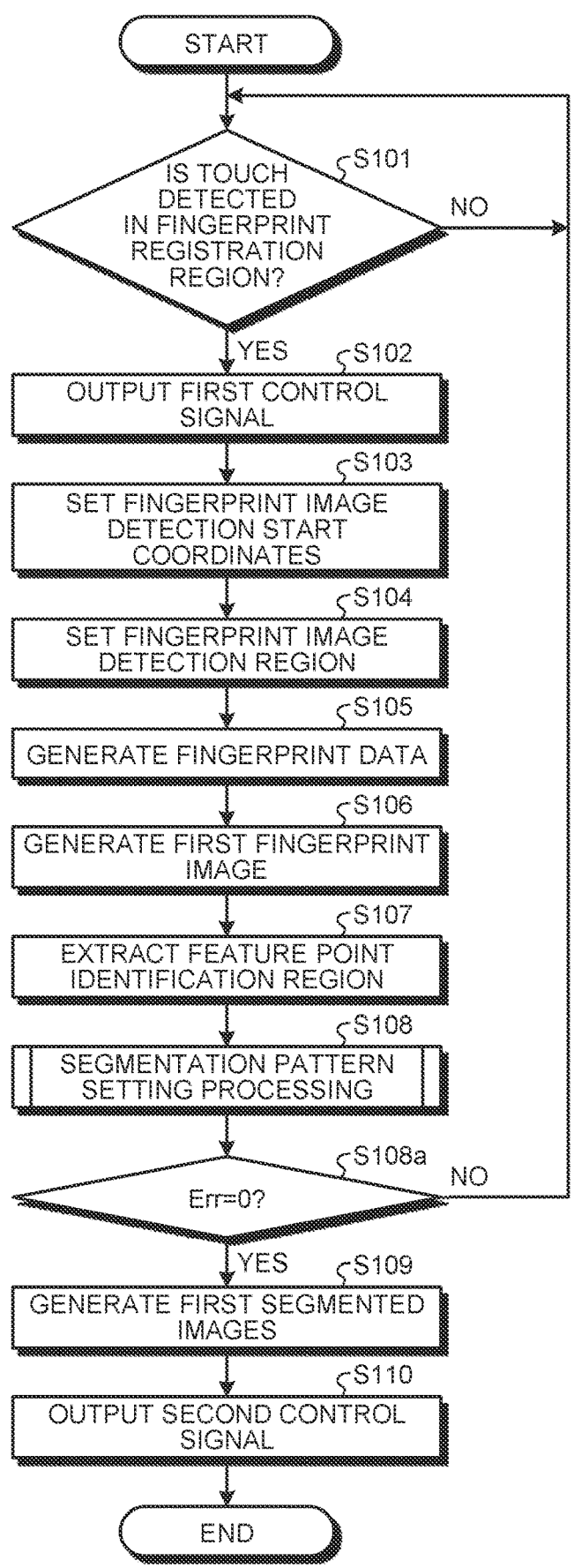
FIG. 28 is a flowchart illustrating exemplary fingerprint registration processing performed in the personal authentication system and the personal authentication device according to the first embodiment.
Figure 29A:
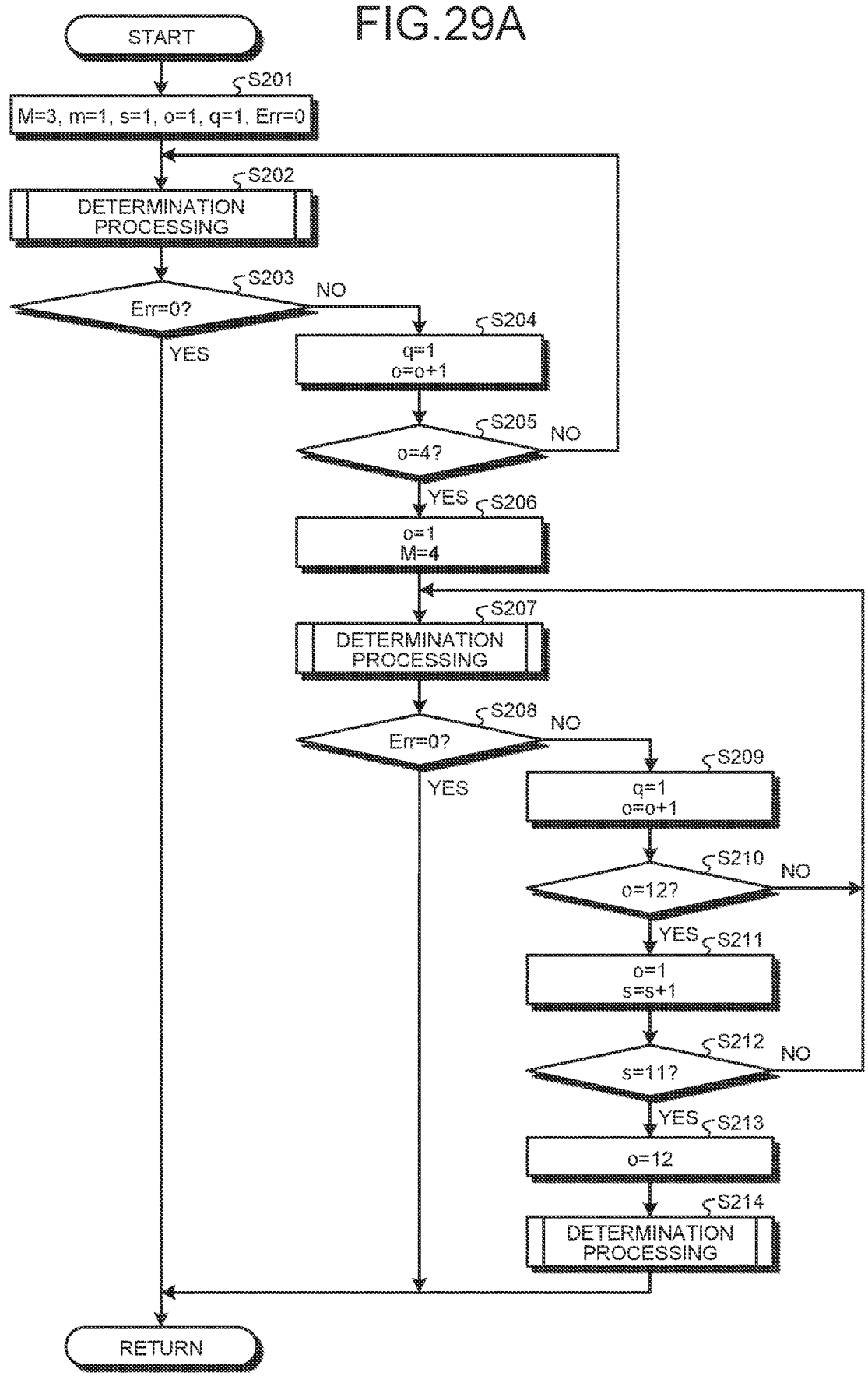
FIG. 29A is a sub flowchart illustrating exemplary segmentation pattern setting processing performed in the personal authentication system and the personal authentication device according to the first embodiment.
Figure 30:
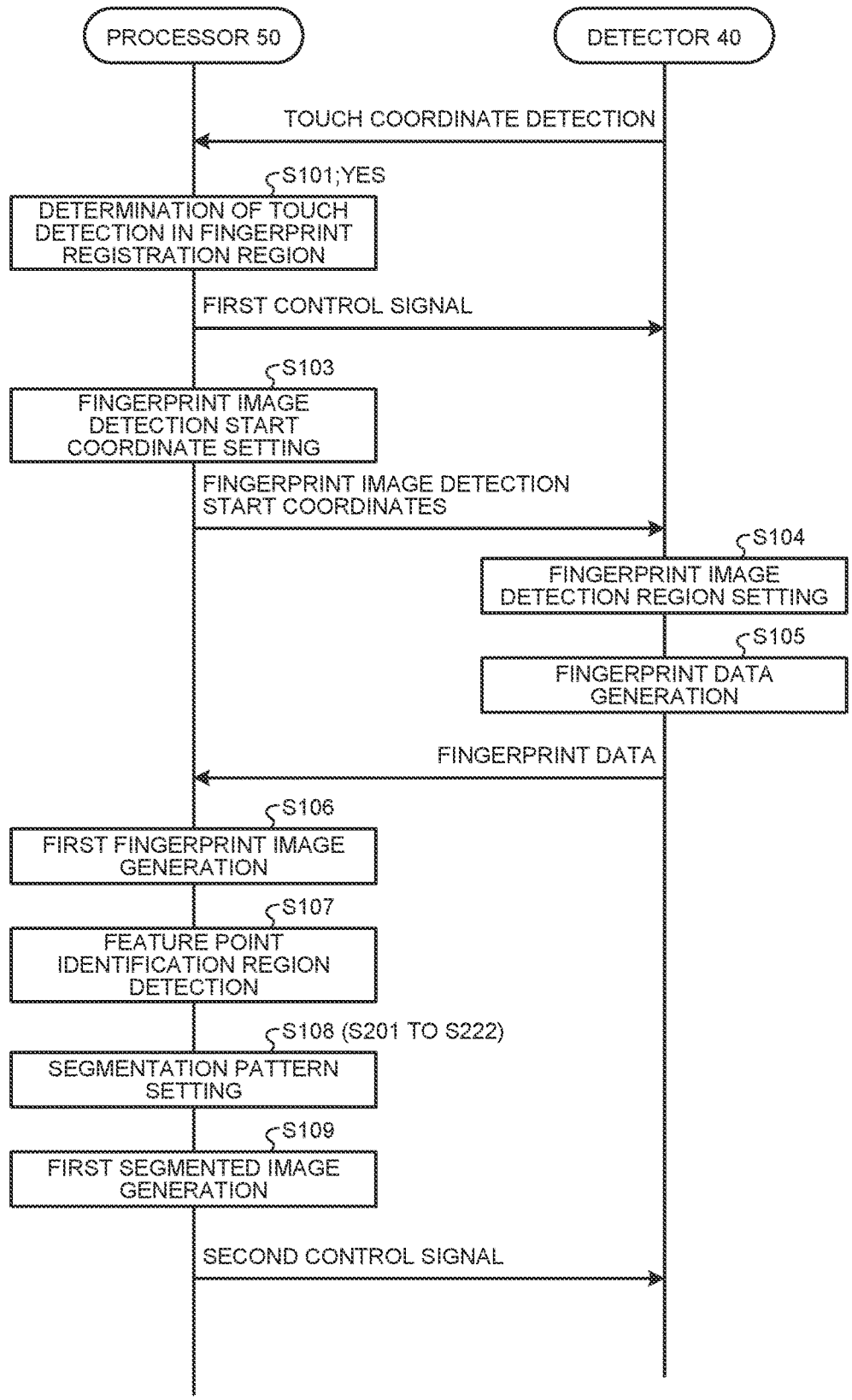
FIG. 30 is a sequence diagram illustrating a specific example of fingerprint registration processing performed in the personal authentication system and the personal authentication device according to the first embodiment.

The following describes a specific example of a fingerprint registration method achieved by the detector 40 and the processor 50 in the personal authentication system 1 and the personal authentication device 1a according to the first embodiment with reference to FIGS. 28, 29A, 29B, and 30. FIG. 28 is a flowchart illustrating exemplary fingerprint registration processing performed in the personal authentication system and the personal authentication device according to the first embodiment. FIGS. 29A and 29B are sub flowcharts illustrating exemplary segmentation pattern setting processing performed in the personal authentication system and the personal authentication device according to the first embodiment. FIG. 30 is a sequence diagram illustrating a specific example of fingerprint registration processing performed in the personal authentication system and the personal authentication device according to the first embodiment.

The personal authentication system 1 and the personal authentication device 1a according to the first embodiment start the fingerprint registration processing based on a fingerprint registration start command from a higher-level system. In the present disclosure, the first segmented images SPm_1 registered through the fingerprint registration processing are associated with the user ID of a user performing fingerprint registration.

In the first period of the fingerprint registration processing, the touch determinator 51 of the processor 50 determines whether a touch is detected in the fingerprint registration region FR (step S101). When no touch is detected (No at step S101), the touch determinator 51 repeatedly executes the processing at step S101 until a touch is detected (Yes at step S101).

When a touch is detected in the fingerprint registration region FR (Yes at step S101), the touch determinator 51 outputs, to the detection controller 11, the first control signal for transition from the first period to the second period (step S102).

The detection start coordinate setter 52 sets the fingerprint image detection start coordinates S (refer to FIG. 22) based on a touch detection coordinates of a touch in the fingerprint registration region FR (step S103) and outputs the fingerprint image detection start coordinates S to the fingerprint detection region setter 46 of the detector 40.

The fingerprint detection region setter 46 sets a fingerprint image detection region with a starting point at the fingerprint image detection start coordinates S output from the detection start coordinate setter 52 (step S104).

The detection controller 11 controls, based on the first control signal output from the touch determinator 51, the first electrode selection circuit 15 and the detection electrode selection circuit 16 to perform fingerprint detection in the fingerprint image detection region set by the fingerprint detection region setter 46.

The data generator 47 of the detector 40 generates, based on a result of the decoding processing by the signal processor 44, fingerprint data of the fingerprint image detection region allocated by the fingerprint detection region setter 46 (step S105) and outputs the fingerprint data to the processor 50.

The fingerprint image generator 55 of the processor 50 generates the first fingerprint image FP_1 for collation based on the fingerprint data received by the data receiver 53 (step S106). In addition, the fingerprint image generator 55 extracts the feature point identification region CPq in the first fingerprint image FP_1 for collation (step S107) and stores the feature point identification region CPq in the fingerprint image storage 54.

Subsequently, the fingerprint image generator 55 executes the segmentation pattern setting processing illustrated in FIG. 29A (step S108 in FIG. 28).

In the first embodiment, at step S108, among the segmentation patterns (M_s_o) illustrated in FIG. 21, a segmentation pattern is set in which the segmentation positions Smy illustrated in FIG. 24 do not match the positions Pq_1y and Pq_2y in the second direction Dy of any feature point identification region CPq illustrated in FIG. 27. The following describes the segmentation pattern setting processing according to the first embodiment with reference to FIGS. 29A and 29B.

The fingerprint image generator 55 performs initial setting of the number M of segments of a fingerprint image, the segmented image number m of a segmentation pattern, the segmented image size number s in the second direction Dy, the segmented image arrangement order number o, the feature point identification region number q, and an error flag Err as initial conditions in the segmentation pattern setting processing illustrated in FIG. 29A (step S201).

Specifically, in this example, the fingerprint image generator 55 sets M=3, m=1, s=1, o=1, q=1, and Err=0 and proceeds to determination processing illustrated in FIG. 29B (step S202 in FIG. 29A). The error flag Err is set as "Err=1" when the segmentation position Smy matches either of the positions Pq_1y and Pq_2y of the feature point identification region CPq in the second direction Dy.

The fingerprint image generator 55 sets, as the segmentation position Smy, the row Smy including the segmented image detection start coordinates Sm(Smx, Smy) in the segmented image SPm of the segmentation pattern (M_s_o) (refer to FIG. 24). The fingerprint image generator 55 also sets, as the position Pq_1y of the feature point identification region CPq, a row Pq_1y including coordinates Pq_1 (Pq_1x, Pq_1y) and Pq_3(Pq_2x, Pq_1y) of the feature point identification region CPq. The fingerprint image generator 55 determines whether the segmentation position Smy of the segmented image SPm matches the position Pq_1y of the feature point identification region CPq (Smy=Pq_1y) (step S221). Alternatively, for example, the segmented image illustrated in FIG. 24 has S1y=0 and S2y=64, and thus the y coordinate of the first segmented image is in a range of 1 to 63. Thus, it is determined whether the y coordinate Pq_1y of the coordinate Pq_1 of the feature point identification region CPq is in the above-described range of 1 to 63.

When the segmentation position Smy of the segmented image SPm does not match the position Pq_1y of the feature point identification region CPq (No at step S221), the fingerprint image generator 55 subsequently sets, as the position Pq_2y of the feature point identification region CPq, a row Pq_2y including coordinates Pq_2(Pq_1x, Pq_2y) and Pq_4(Pq_2x, Pq_2y) of the feature point identification region CPq and determines whether the segmentation position Smy of the segmented image SPm matches the position Pq_2y of the feature point identification region CPq (Smy=Pq_2y) (step S222). Alternatively, for example, the segmented image illustrated in FIG. 24 has S1y=0 and S2y=64, and thus the y coordinate of the first segmented image is in the range of 1 to 63. Thus, it is determined whether the y coordinate Pq_2y of the coordinate Pq_2 of the feature point identification region CPq is in the above-described range of 1 to 63.

When the segmentation position Smy of the segmented image SPm does not match the position Pq_2y of the feature point identification region CPq (No at step S222), the fingerprint image generator 55 increments the segmented image number m (m=m+1) (step S223) and determines whether the segmented image number m is equal to M+1 (in this example, M=3) (m=M+1) (step S224). When the segmented image number m is smaller than M+1 (No at step S224), the fingerprint image generator 55 returns to step S221 and repeatedly executes the processing starting at step S221.

When the segmented image number m is equal to M+1 (m=4) (Yes at step S224), the fingerprint image generator 55 initializes the segmented image number m (m=1), increments the feature point identification region number q (q=q+1) (step S225), and determines whether the feature point identification region number q is equal to "the number Q of feature point identification regions"+1 (q=Q+1) (step S226). When the feature point identification region number q is smaller than "the number Q of feature point identification regions"+1 (No at step S226), the fingerprint image generator 55 returns to step S221 and repeatedly executes the processing starting at step S221. When the feature point identification region number q is equal to "the number Q of feature point identification regions"+1 (q=Q+1) (Yes at step S226), the fingerprint image generator 55 returns to FIG. 29A.

When the segmentation position Smy of the segmented image SPm matches the position Pq_1y of the feature point identification region CPq at step S221 (Yes at step S221) or when the segmentation position Smy of the segmented image SPm matches the position Pq_2y of the feature point identification region CPq at step S222 (Yes at step S222), the fingerprint image generator 55 sets the error flag Err to "1" (Err=1) (step S227), outputs, to the detection controller 11, the second control signal for transition from the second period to the first period (step S228), and returns to FIG. 29A. Alternatively, for example, in specification of the first segmented image as described above, the fingerprint image generator 55 may set the error flag Err to "1" (Err=1) (step S227) when the y coordinate Pq_1y of the coordinate Pq_1 of the feature point identification region CPq is in the range of 1 to 63 and the y coordinate Pq_2y of the coordinate Pq_2 is out of the range of 1 to 63.

Referring back to FIG. 29A, the fingerprint image generator 55 determines whether the error flag Err is "0" (Err=0) (step S203). When the error flag Err is "0" (Err=0) (Yes at step S203), the fingerprint image generator 55 returns to FIG. 28. When the error flag Err is "1" (Err=1) (No at step S203), the fingerprint image generator 55 initializes the feature point identification region number q (q=1), increments the segmented image arrangement order number o (o=o+1) (step S204), and determines whether the segmented image arrangement order number o is four (o=4) (step S205). When the segmented image arrangement order number o is smaller than four (No at step S205), the fingerprint image generator 55 returns to the determination processing illustrated in FIG. 29B (step S202 in FIG. 29A) and repeatedly executes the subsequent processing.

When the segmented image arrangement order number o is four (o=4) at step S205 (Yes at step S205), the fingerprint image generator 55 initializes the segmented image arrangement order number o (o=1), sets the number M of segments of a fingerprint image to 4 (step S206) and proceeds to the determination processing illustrated in FIG. 29B (step S207 in FIG. 29A).

Subsequently, the fingerprint image generator 55 determines whether the segmentation position Smy of the segmented image SPm matches the position Pq_1y of the feature point identification region CPq (Smy=Pq_1y) (step S221).

When the segmentation position Smy of the segmented image SPm does not match the position Pq_1y of the feature point identification region CPq (No at step S221), the fingerprint image generator 55 subsequently determines whether the segmentation position Smy of the segmented image SPm matches the position Pq_2y of the feature point identification region CPq (Smy=Pq_2y) (step S222).

When the segmentation position Smy of the segmented image SPm does not match the position Pq_2y of the feature point identification region CPq (No at step S222), the fingerprint image generator 55 increments the segmented image number m (m=m+1) (step S223) and determines whether the segmented image number m is equal to M+1 (in this example, M=4) (m=M+1) (step S224). When the segmented image number m is smaller than M+1 (No at step S224), the fingerprint image generator 55 returns to step S221 and repeatedly executes the processing starting at step S221.

When the segmented image number m is equal to M+1 (m=5) (Yes at step S224), the fingerprint image generator 55 initializes the segmented image number m (m=1), increments the feature point identification region number q (q=Q+1) (step S225), and determines whether the feature point identification region number q is equal to "the number Q of feature point identification regions"+1 (q=Q+1) (step S226). When the feature point identification region number q is smaller than "the number Q of feature point identification regions"+1 (No at step S226), the fingerprint image generator 55 returns to step S221 and repeatedly executes the processing starting at step S221. When the feature point identification region number q is equal to "the number Q of feature point identification regions"+1 (q=Q+1) (Yes at step S226), the fingerprint image generator 55 returns to FIG. 29A.

When the segmentation position Smy of the segmented image SPm matches the position Pq_1y of the feature point identification region CPq at step S221 (Yes at step S221) or when the segmentation position Smy of the segmented image SPm matches the position Pq_2y of the feature point identification region CPq at step S222 (Yes at step S222), the fingerprint image generator 55 sets the error flag Err to "1" (Err=1) (step S227), outputs, to the detection controller 11, the second control signal for transition from the second period to the first period (step S228), and returns to FIG. 29A.

Referring back to FIG. 29A, the fingerprint image generator 55 determines whether the error flag Err is "0" (Err=0) (step S208). When the error flag Err is "0" (Err=0) (Yes at step S208), the fingerprint image generator 55 returns to FIG. 28. When the error flag Err is "1" (Err=1) (No at step S208), the fingerprint image generator 55 initializes the feature point identification region number q (q=1), increments the segmented image arrangement order number o (o=o+1) (step S209), and determines whether the segmented image arrangement order number o is 12 (o=12) (step S210). When the segmented image arrangement order number o is smaller than 12 (No at step S210), the fingerprint image generator 55 returns to the determination processing illustrated in FIG. 29B (step S207 in FIG. 29A) and repeatedly executes the subsequent processing.

When the segmented image arrangement order number o is 12 (Yes at step S210), the fingerprint image generator 55 initializes the segmented image arrangement order number o (o=1), increments the segmented image size number s in the second direction Dy (s=s+1) (step S211), and determines whether the segmented image size number s in the second direction Dy is 11 (s=11) (step S212). When the segmented image size number s in the second direction Dy is smaller than 11 (No at step S212), the fingerprint image generator 55 returns to the determination processing illustrated in FIG. 29B (step S207 in FIG. 29A) and repeatedly executes the subsequent processing.

When the segmented image size number s in the second direction Dy is 11 (s=11) at step S212 (Yes at step S212), the fingerprint image generator 55 sets the segmented image arrangement order number o to 12 (step S213) and proceeds to the determination processing illustrated in FIG. 29B (step S214 in FIG. 29A).

Subsequently, the fingerprint image generator 55 determines whether the segmentation position Smy of the segmented image SPm matches the position Pq_1y of the feature point identification region CPq (Smy=Pq_1y) (step S221).

When the segmentation position Smy of the segmented image SPm does not match the position Pq_1y of the feature point identification region CPq (No at step S221), the fingerprint image generator 55 subsequently determines whether the segmentation position Smy of the segmented image SPm matches the position Pq_2y of the feature point identification region CPq (Smy=Pq_2y) (step S222).

When the segmentation position Smy of the segmented image SPm does not match the position Pq_2y of the feature point identification region CPq (No at step S222), the fingerprint image generator 55 increments the segmented image number m (m=m+1) (step S223) and determines whether the segmented image number m is equal to M+1 (in this example, M=4) (m=M+1) (step S224). When the segmented image number m is smaller than M+1 (No at step S224), the fingerprint image generator 55 returns to step S221 and repeatedly executes the processing starting at step S221.

When the segmented image number m is equal to M+1 (m=5) (Yes at step S224), the fingerprint image generator 55 initializes the segmented image number m (m=1), increments the feature point identification region number q (q=q+1) (step S225), and determines whether the feature point identification region number q is equal to "the number Q of feature point identification regions"+1 (q=Q+1) (step S226). When the feature point identification region number q is smaller than "the number Q of feature point identification regions"+1 (No at step S226), the fingerprint image generator 55 returns to step S221 and repeatedly executes the processing starting at step S221. When the feature point identification region number q is equal to "the number Q of feature point identification regions"+1 (q=Q+1) (Yes at step S226), the fingerprint image generator 55 returns to FIG. 29A.

When the segmentation position Smy of the segmented image SPm matches the position Pq_1y of the feature point identification region CPq at step S221 (Yes at step S221) or when the segmentation position Smy of the segmented image SPm matches the position Pq_2y of the feature point identification region CPq at step S222 (Yes at step S222), the fingerprint image generator 55 sets the error flag Err to "1" (Err=1) (step S227), outputs, to the detection controller 11, the second control signal for transition from the second period to the first period (step S228), and returns to FIG. 29A.

Referring back to FIG. 28 from the segmentation pattern setting processing illustrated in FIG. 29A, the fingerprint image generator 55 determines whether the error flag Err is "0" (Err=0) (step S108a). When the error flag Err is "0" (Err=0) (Yes at step S108a), the number M of segments of the segmented images, the segmented image size number s in the second direction Dy, and the segmented image arrangement order number o are determined.

Specifically, when the error flag Err is "0" (Err=0) at step S203 in FIG. 29A (Yes at step S203), the segmentation pattern (M_s_o) corresponding to the first fingerprint image FP_1 for collation is determined to be any of the segmentation patterns (3_1_1), (3_1_2), and (3_1_3) illustrated in FIG. 21. In the determined segmentation pattern (3_1_0), each feature point identification region CPq is included in any of the segmented images SPm. Consequently, the total number of feature points in the three first segmented images SPm_1 after segmentation matches the number of feature points in the first fingerprint image FP_1 before segmentation.

When the error flag Err is "0" (Err=0) at step S208 in FIG. 29A (Yes at step S208), the segmentation pattern (M_s_o) corresponding to the first fingerprint image FP_1 for collation is determined to be any of the segmentation patterns (4_1_1) to (4_1_11), (4_2_1) to (4_2_11), (4_3_1) to (4_3_11), (4_4_1) to (4_4_11), (4_5_1) to (4_5_11), (4_6_1) to (4_6_11), (4_7_1) to (4_7_11), (4_8_1) to (4_8_11), (4_9_1) to (4_9_11), and (4_10_1) to (4_10_11) illustrated in FIG. 21. In the determined segmentation pattern (4_s_o), each feature point identification region CPq is included in any of the segmented images SPm. Thus, the total number of feature points in the four first segmented images SPm_1 after segmentation matches the number of feature points in the first fingerprint image FP_1 before segmentation.

When the error flag Err is determined to be "0" (Err=0) in the determination processing (FIG. 29B) at step S214 in FIG. 29A, the segmentation pattern (M_s_o) is determined to be the segmentation pattern (4_11_12) corresponding to the first fingerprint image FP_1 for collation. In this case, the total number of feature points in the four first segmented images SPm_1 after segmentation matches the number of feature points in the first fingerprint image FP_1 before segmentation.

When the error flag Err is determined to be "1" (Err=1) in the determination processing (FIG. 29B) at step S214 in FIG. 29A, in other words, when the error flag Err is "1" at step S108a (No at step S108a), the fingerprint image generator 55 returns to step S101 and repeatedly executes the above-described processing until the error flag Err is "0" at step S108a (Yes at step S108a).

When the error flag Err is "0" (Err=0) at step S108a (Yes at step S108a), the fingerprint image generator 55 segments the first fingerprint image FP_1 for collation into the M first segmented images SPm_1 in accordance with the determined segmentation pattern (M_s_o) (step S109) and associates and stores the first segmentation images SPm_1 and the determined segmentation pattern (M_s_o) in the fingerprint image storage 54. Then, the fingerprint image generator 55 outputs, to the detection controller 11, the second control signal for transition from the second period to the first period (step S110) and ends the fingerprint registration processing.

Through the above-described processing, it is possible to set a segmentation pattern in which no segmentation positions of the first segmented images SPm_1 overlap any feature point identification region CP. Thus, the number of feature points in the first fingerprint image FP_1 matches the total number of feature points in the first segmented images SPm_1, and duplication and omission of registration of feature points in each first segmented image SPm_1 after segmentation are prevented.

Figure 31:
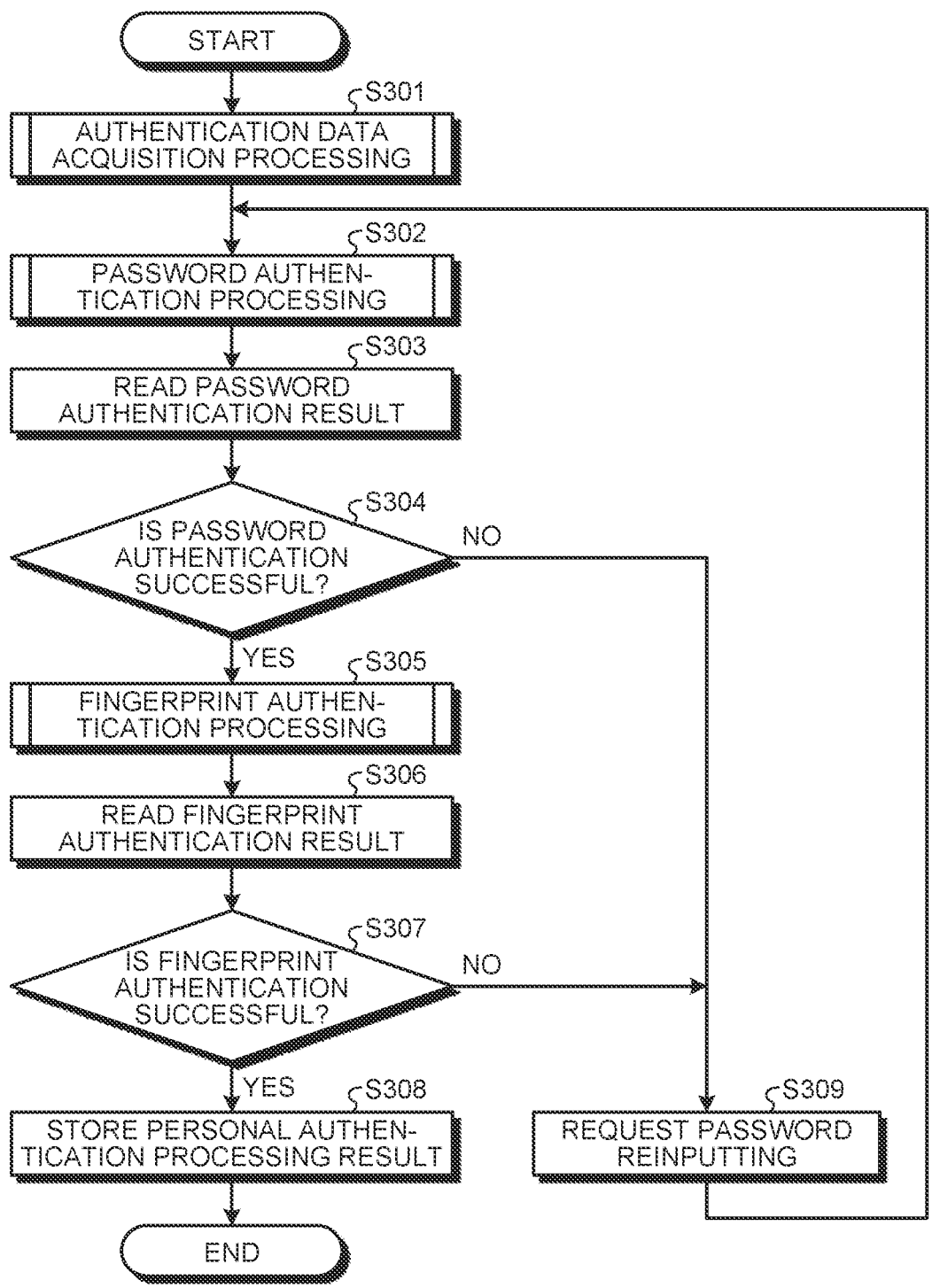
FIG. 31 is a flowchart illustrating exemplary personal authentication processing performed in the personal authentication system and the personal authentication device according to the first embodiment.
Figure 32:
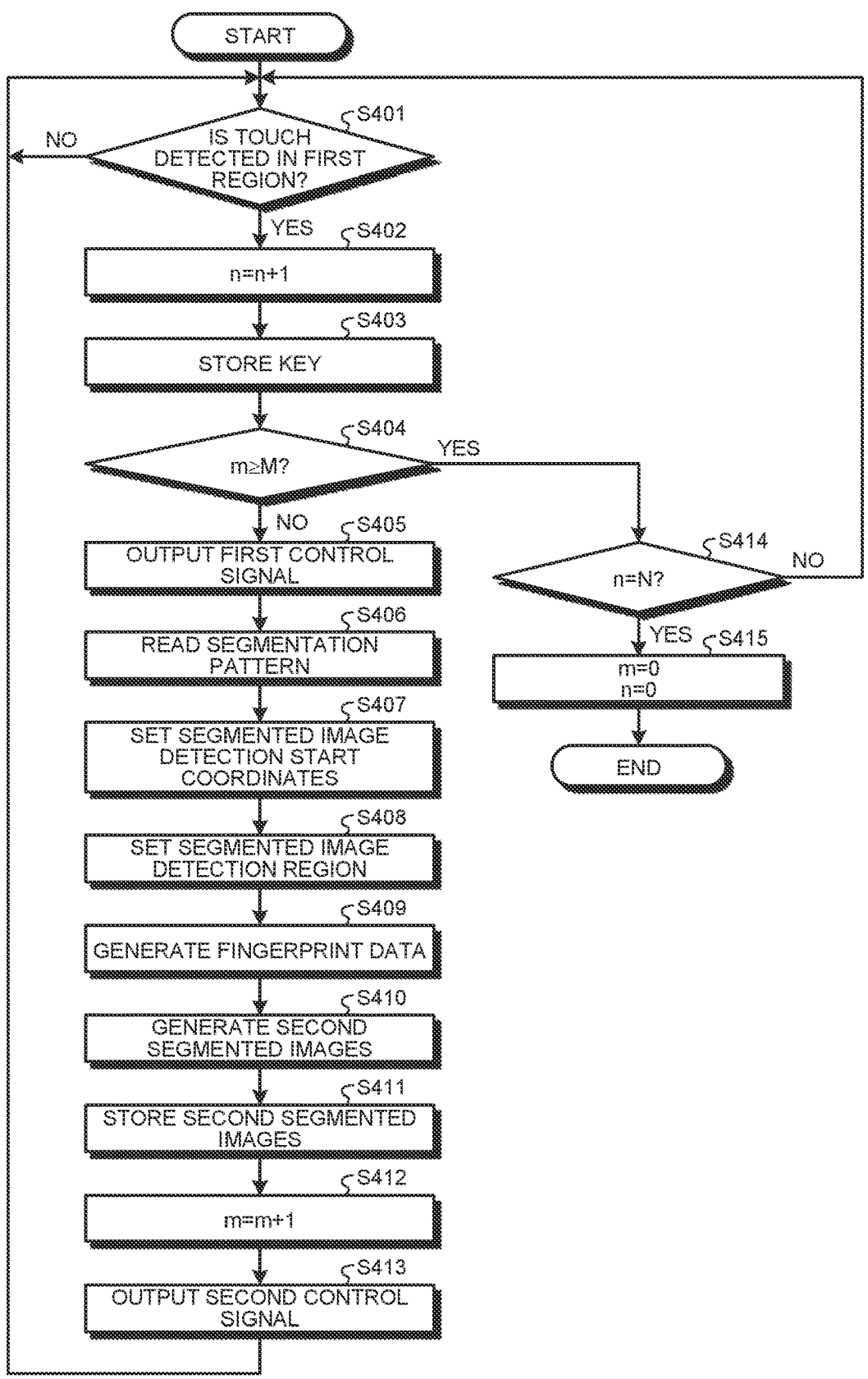
FIG. 32 is a sub flowchart illustrating exemplary authentication data acquisition processing performed in the personal authentication system and the personal authentication device according to the first embodiment.
Figure 33:
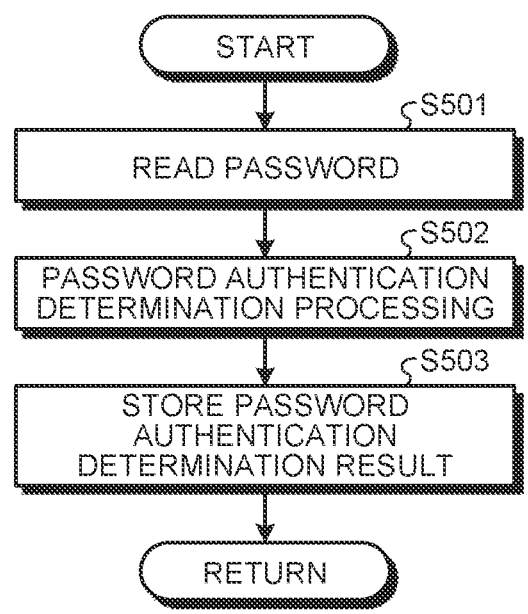
FIG. 33 is a sub flowchart illustrating exemplary password authentication processing performed in the personal authentication system and the personal authentication device according to the first embodiment.
Figure 34:
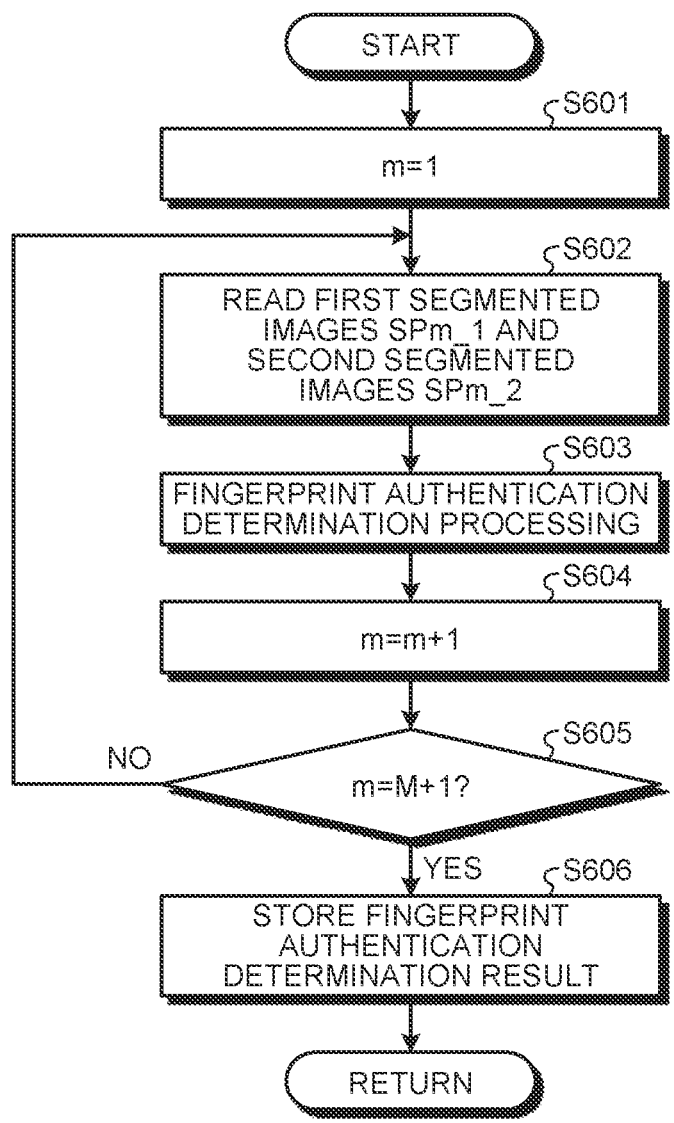
FIG. 34 is a sub flowchart illustrating exemplary fingerprint authentication processing performed in the personal authentication system and the personal authentication device according to the first embodiment.

The following describes a specific example of the personal authentication method achieved by the detector 40 and the processor 50 in the personal authentication system 1 and the personal authentication device 1a according to the first embodiment with reference to FIGS. 31, 32, 33, 34, and 35. FIG. 31 is a flowchart illustrating exemplary personal authentication processing performed in the personal authentication system and the personal authentication device according to the first embodiment. FIG. 32 is a flowchart illustrating exemplary personal authentication data acquisition processing performed in the personal authentication system and the personal authentication device according to the first embodiment. FIG. 33 is a sub flowchart illustrating exemplary password authentication processing performed in the personal authentication system and the personal authentication device according to the first embodiment. FIG. 34 is a sub flowchart illustrating exemplary fingerprint authentication processing performed in the personal authentication system and the personal authentication device according to the first embodiment. FIG. 35 is a sequence diagram illustrating a specific example of personal authentication processing performed in the personal authentication system and the personal authentication device according to the first embodiment.

The personal authentication system 1 and the personal authentication device 1a according to the first embodiment start the personal authentication processing illustrated in FIG. 31 based on a personal authentication start command from the higher-level system. In the present disclosure, in the personal authentication processing, the user ID of a user performing fingerprint registration is specified in advance, and collation determination processing (authentication processing) is executed with a password for collation and the first segmented images SPm_1 for collation, the password and the images being associated with the user ID.

First, the personal authentication system 1 and the personal authentication device 1a according to the first embodiment execute the authentication data acquisition processing (step S301 in FIG. 31) illustrated in FIG. 32.

As a prerequisite of the authentication data acquisition processing illustrated in FIG. 32, the number m of accumulated second segmented images SPm_2 and the number n of accumulated keys are reset (m=0 and n=0).

In the first period of the personal authentication processing, the touch determinator 51 determines whether a touch is detected in a first region KY (step S401). When no touch is detected (No at step S401), the touch determinator 51 repeatedly executes the processing at step S402 until a touch is detected (Yes at step S401).

When a touch is detected in a first region KY (Yes at step S401), the touch determinator 51 increments the number n of accumulated keys stored in the password storage 511 (n=n+1) (step S402) and stores a key ("5" in the example illustrated in FIG. 15) thus key-input in the password storage 511 (step S403).

The touch determinator 51 determines whether the number m of accumulated second segmented images SPm_2 stored in the fingerprint image storage 54 is equal to or larger than the number M of segments (step S404).

When the number m of accumulated second segmented images SPm_2 is smaller than the number M of segments (No at step S404), the touch determinator 51 outputs, to the detection controller 11, the first control signal for transition from the first period to the second period (step S405).

The detection start coordinate setter 52 reads a segmentation pattern (M_s_o) associated with the M first segmented images SPm_1 and stored in the fingerprint image storage 54 in the fingerprint registration processing illustrated in FIG. 28 (step S406), sets the segmented image detection start coordinates Sm (refer to FIGS. 23A, 23B, 23C, and 23D) of the segmented image detection start position based on the segmentation pattern (M_s_o) and the touch detection coordinates of a touch in the first region KY (step S407), and outputs the segmented image detection start coordinates Sm to the fingerprint detection region setter 46 of the detector 40.

The fingerprint detection region setter 46 sets a segmented image detection region with a starting point at the segmented image detection start coordinates Sm output from the detection start coordinate setter 52 (step S408).

The detection controller 11 controls, based on the first control signal output from the touch determinator 51, the first electrode selection circuit 15 and the detection electrode selection circuit 16 to perform fingerprint detection in a segmented image detection region set by the fingerprint detection region setter 46.

The data generator 47 of the detector 40 generates, based on a result of the decoding processing at the signal processor 44, fingerprint data of the segmented image detection region allocated by the fingerprint detection region setter 46 (step S409) and outputs the fingerprint data to the processor 50.

The fingerprint image generator 55 of the processor 50 generates the second segmented images SPm_2 for authentication based on the fingerprint data received by the data receiver 53 (step S410) and stores the second segmented images SPm_2 in the fingerprint image storage 54 (step S411). Then, the fingerprint image generator 55 increments the number m of accumulated second segmented images SPm_2 (m=m+1) (step S412), outputs, to the detection controller 11, the second control signal for transition from the second period to the first period (step S413), and returns to the processing at step S401.

The detection controller 11 controls, based on the second control signal output from the fingerprint image generator 55, the first electrode selection circuit 15 and the detection electrode selection circuit 16 to perform touch detection in the entire area of the detection region FA.

When the number m of accumulated second segmented images SPm_2 stored in the fingerprint image storage 54 has not reached the number M of segments (No at step S404), the processing up to step S413 is repeatedly performed until the number m of accumulated second segmented images SPm_2 stored in the fingerprint image storage 54 reaches the number M of segments (Yes at step S404). Thus, the M second segmented images SPm_2 constituting the second fingerprint image FP_2 for authentication are accumulated in the fingerprint image storage 54.

When the number m of accumulated second segmented images SPm_2 has reached the number M of segments (Yes at step S404), the touch determinator 51 subsequently determines whether the number n of accumulated keys stored in the password storage 511 has reached the number N of password digits (step S414).

When the number n of accumulated keys has not reached the number N of password digits (No at step S414), the process returns to the processing at step S401 and the processing up to step S414 is repeatedly performed until the number n of accumulated keys reaches the number N of password digits (Yes at step S414). Thus, an N-digit password is accumulated in the password storage 511.

When the number n of accumulated keys stored in the password storage 511 has reached the number N of password digits (Yes at step S414), the number m of accumulated second segmented images SPm_2 and the number n of accumulated keys are reset (m=0 and n=0) (step S415) and the process returns to the personal authentication processing illustrated in FIG. 31.

Subsequently, the personal authentication system 1 and the personal authentication device 1a according to the first embodiment execute the password authentication processing (step S302 in FIG. 31) illustrated in FIG. 32.

The password authenticator 512 reads keys stored in the password storage 511 (step S501), generates a personal authentication password, executes the authentication determination processing on the password (step S502), and stores a password authentication determination result in the password authentication result storage 513 (step S503).

Referring back to FIG. 31, the personal authenticator 514 reads the password authentication determination result stored in the password authentication result storage 513 (step S303) and determines whether the password authentication is successful (step S304).

When the password authentication is successful (Yes at step S304), the fingerprint authenticator 58 executes the fingerprint authentication processing (step S305 in FIG. 31) illustrated in FIG. 34.

The fingerprint authenticator 58 performs initial setting of the segmented image number m of a segmentation pattern (m=1) as initial conditions in the fingerprint authentication processing illustrated in FIG. 34 (step S601), reads the first segmented images SPm_1 and the second segmented images SPm_2 stored in the fingerprint image storage 54 (step S602), executes fingerprint authentication determination processing for each segmented image number m (step S603), increments the segmented image number m (m=m+1) (step S604), and determines whether the segmented image number m is equal to "the number M of segments of segmented images"+1 (m=M+1) (step S605). When the segmented image number m is smaller than "the number M of segments of segmented images"+1 (No at step S605), the fingerprint authenticator 58 returns to step S602 and repeatedly executes the processing starting at step S602.

When the segmented image number m is equal to "the number M of segments of segmented images"+1 (m=M+1) (Yes at step S605), a result of the fingerprint authentication determination for each segmented image number m is stored in the fingerprint authentication result storage 59 (step S606).

Although FIG. 34 illustrates the example in which the fingerprint authentication determination processing is executed for each segmented image number m, the present disclosure is not limited thereto. The M first segmented images SPm_1 stored in the fingerprint image storage 54 may be composited to reconstruct the first fingerprint image FP_1, the M second segmented images SPm_2 stored in the fingerprint image storage 54 may be composited to generate the second fingerprint image FP_2, the fingerprint authentication determination processing may be executed with the first fingerprint image FP_1 and the second fingerprint image FP_2, and a result of the fingerprint authentication determination may be stored in the fingerprint authentication result storage 59.

Referring back to FIG. 31, the personal authenticator 514 reads the fingerprint authentication determination result stored in the fingerprint authentication result storage 59 (step S306) and determines whether the fingerprint authentication is successful (step S307).

When the fingerprint authentication is successful (Yes at step S307), the personal authenticator 514 stores, in the personal authentication result storage 515, a personal authentication processing result indicating that personal authentication is successful (step S308).

When the password authentication is unsuccessful (No at step S304) or the fingerprint authentication is unsuccessful (No at step S307), the personal authenticator 514 outputs a password reinput request to a higher-level processing device (not illustrated) (step S309).

Through the personal authentication processing described above, it is possible to acquire segmented images and execute fingerprint authentication at password inputting, and thus it is possible to achieve security reinforcement through fingerprint authentication without degradation of convenience.

Moreover, it is possible to reduce the risk of leakage of a collation fingerprint image used for fingerprint authentication in the personal authentication processing by segmenting and registering the collation fingerprint image at fingerprint registration. In addition, it is possible to further reduce the risk of leakage of the collation fingerprint image by registering the segmented fingerprint images at different addresses in the storage region.

Furthermore, when the collation fingerprint image is segmented and registered, it is possible to prevent duplication and omission of registration of feature points by setting a segmentation pattern in which no segmentation positions of the segmented images overlap any feature point identification region, thereby maintaining the accuracy of the collation fingerprint image after segmentation (segmented images).

According to the present embodiment, it is possible to obtain the personal authentication system 1, the personal authentication device 1a, the display device 100, and the personal authentication method that can achieve both security reinforcement and authentication accuracy improvement without degrading convenience.

Second Embodiment

Figure 36A:
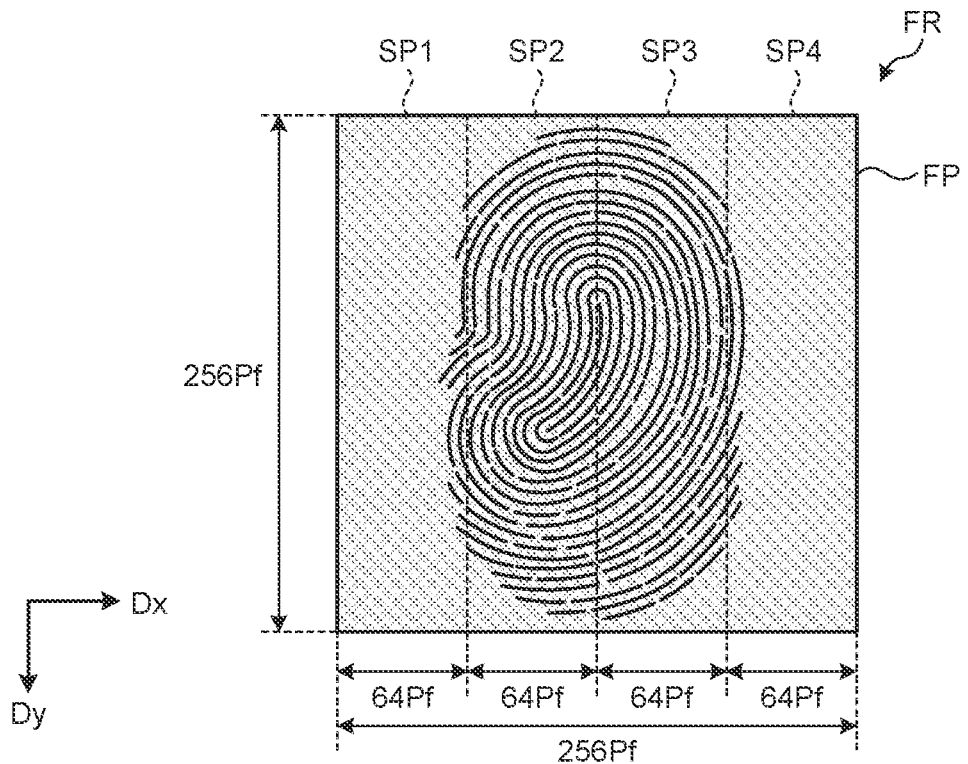
FIG. 36A is a first diagram illustrating an exemplary segmentation pattern of the fingerprint image in a second embodiment.
Figure 36B:
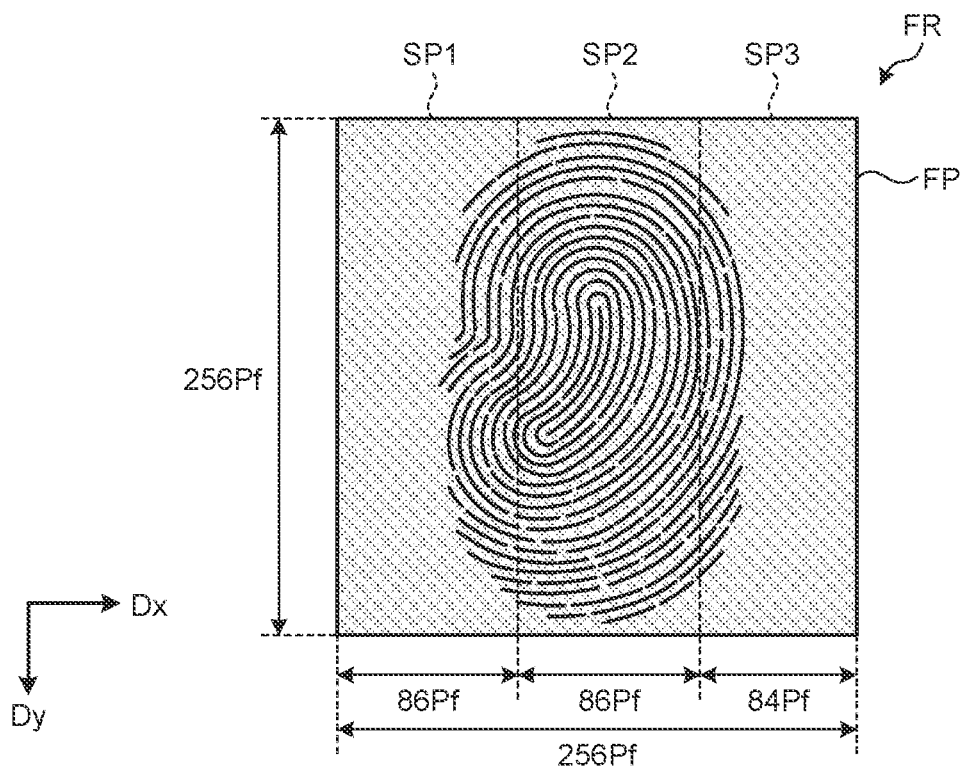
FIG. 36B is a second diagram illustrating an exemplary segmentation pattern of the fingerprint image in the second embodiment.

FIG. 36A is a first diagram illustrating an exemplary segmentation pattern of a fingerprint image in a second embodiment. FIG. 36B is a second diagram illustrating an exemplary segmentation pattern of a fingerprint image in the second embodiment. The following description will be made in detail on difference from the first embodiment and may omit duplicate description as in the first embodiment.

FIG. 36A illustrates an exemplary segmentation pattern in which the fingerprint image FP is segmented into four segmented images SP1, SP2, SP3, and SP4 in the first direction Dx. In the segmentation pattern illustrated in FIG. 36A, the sizes of the segmented images SP1, SP2, SP3, and SP4 in the first direction Dx are each 64 Pf.

FIG. 36B illustrates an exemplary segmentation pattern in which the fingerprint image FP is segmented into three segmented images SP1, SP2, and SP3 in the first direction Dx. In the segmentation pattern illustrated in FIG. 36B, the sizes of the segmented images SP1 and SP2 in the first direction Dx are each 86 Pf and the size of the segmented image SP3 in the first direction Dx is 84 Pf.

FIG. 37 is a diagram illustrating a specific example of segmentation patterns in the personal authentication processing according to the second embodiment. In each segmentation pattern (M_s_o) illustrated in FIG. 37, the numerical value of each segmented image SP represents the size (Pf) of the segmented image SP in the first direction Dx. In each segmentation pattern (M_s_o), M represents the number of segments of the fingerprint image FP, s represents a segmented image size number in the first direction Dx, and o represents a segmented image arrangement order number.

In each segmentation pattern illustrated in FIG. 37, the segmentation direction is the first direction Dx (refer to FIGS. 36A and 36B). In the present embodiment, the number M of segments of the fingerprint image FP in each segmentation pattern is three or four (M=3 or 4).

In a segmentation pattern in which the number M of segments is 3, the pattern of the size of each segmented image SP in the first direction Dx is A=86 or B=84, and the segmentation pattern (M_s_o) has three variations (s=1 and o=1, 2, 3) of combination of these patterns.

In a segmentation pattern in which the number M of segments is 4, the pattern of the size of each segmented image SP in the first direction Dx is A=66, 70, 74, 78, 82, 86, B=64, 66, 68, or C=42, 46, 50, 54, 58, 62, and the relation of A>B>C is satisfied. The segmentation pattern (M_s_o) has 111 variations including 110 variations (s=1 to 10, o=1 to 11) of combination of one segmented image SP having the size pattern A in the first direction Dx, two segmented images SP having the size pattern B in the first direction Dx, and one segmented image SP having the size pattern C in the first direction Dx, and one variation (s=11, o=12) of all segmented images SP1, SP2, SP3, and SP4 having the size of 64 in the first direction Dx.

Figure 38A:
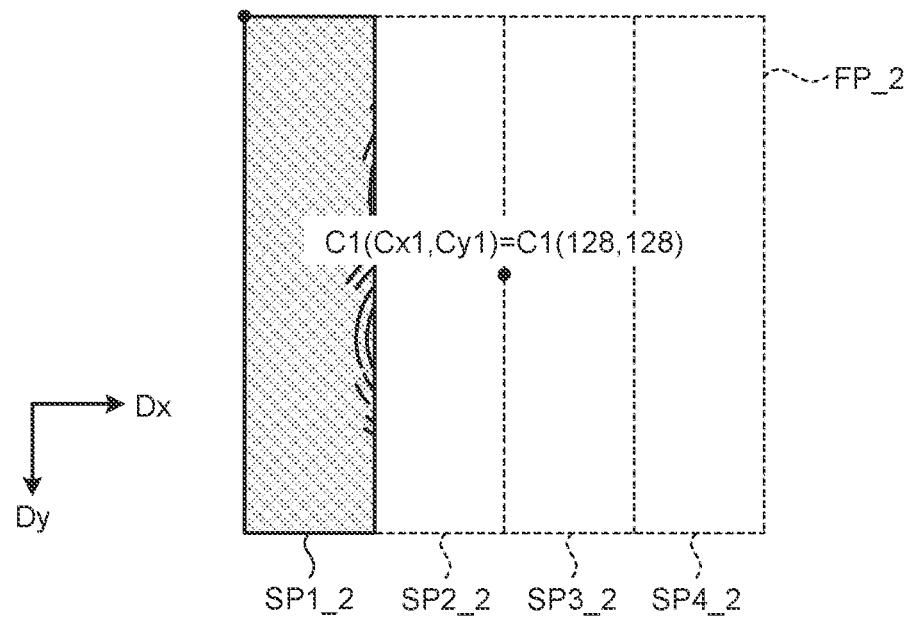
FIG. 38A is a diagram for description of a segmented image acquisition region in the personal authentication processing according to the second embodiment.
Figure 38B:
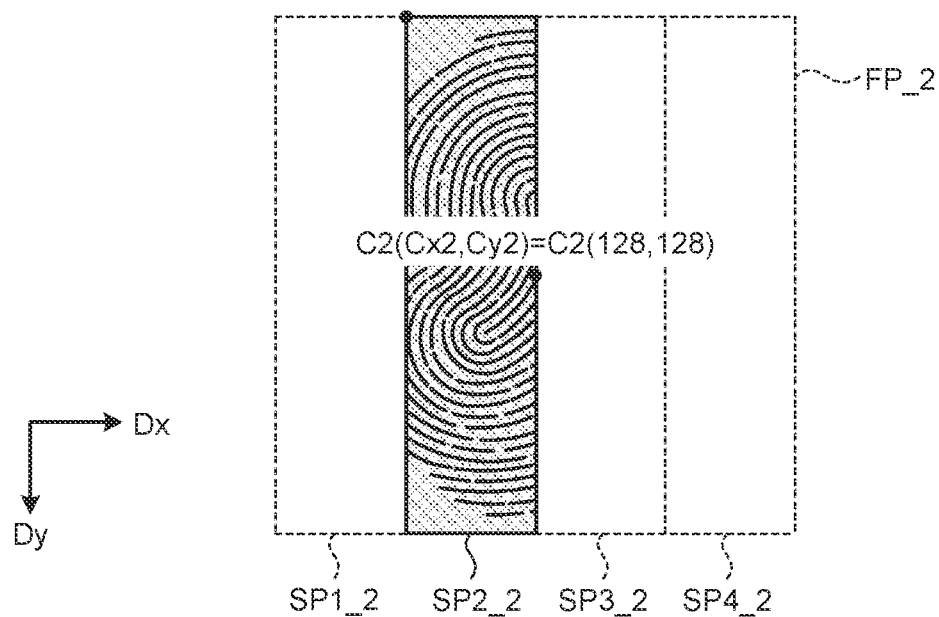
FIG. 38B is a diagram for description of a segmented image acquisition region in the personal authentication processing according to the second embodiment.
Figure 38C:
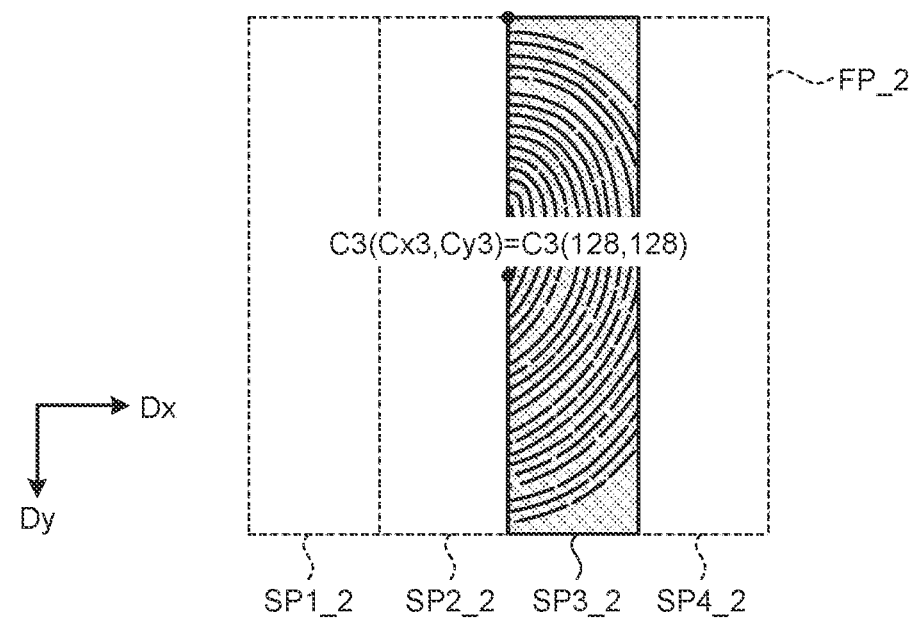
FIG. 38C is a diagram for description of a segmented image acquisition region in the personal authentication processing according to the second embodiment.
Figure 38D:
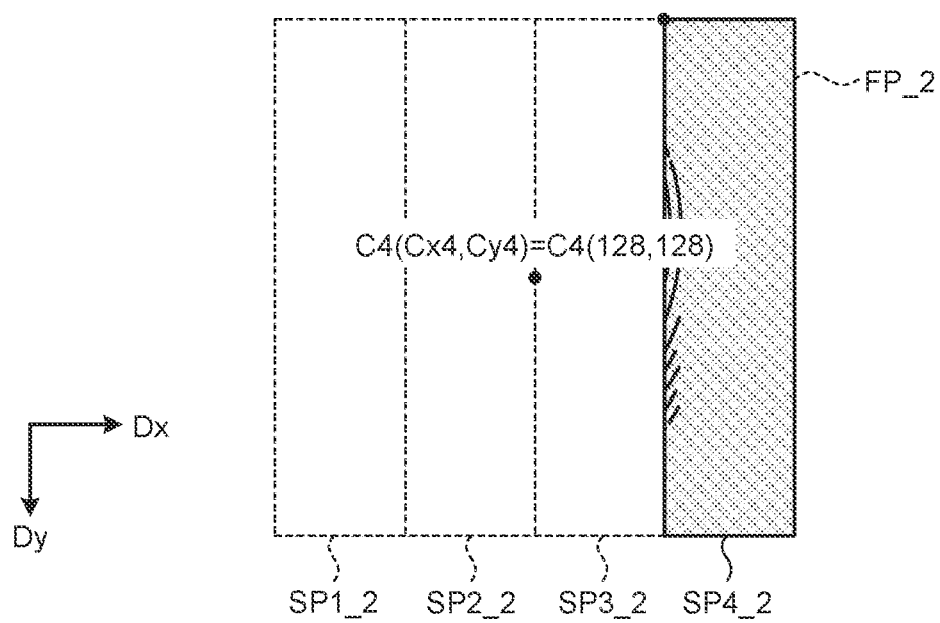
FIG. 38D is a diagram for description of a segmented image acquisition region in the personal authentication processing according to the second embodiment.

FIGS. 38A, 38B, 38C, and 38D are each a diagram for description of a segmented image acquisition region in the personal authentication processing according to the second embodiment. FIGS. 38A, 38B, 38C, and 38D exemplarily illustrate segmented image acquisition regions of second segmented images SPm_2 of a second fingerprint image FP_2 for authentication in a case of a segmentation pattern (4_11_12) illustrated in FIG. 37. FIG. 38A illustrates the segmented image acquisition region of the second segmented image SP1_2, FIG. 38B illustrates the segmented image acquisition region of the second segmented image SP2_2, FIG. 38C illustrates the segmented image acquisition region of the second segmented image SP3_2, and FIG. 38D illustrates the segmented image acquisition region of the second segmented image SP4_2.

In the present disclosure, the segmented image detection start coordinates Sm(Smx, Smy) of the segmented image detection start position in the personal authentication processing are values normalized with the touch detection coordinates in a first region KY as center coordinates Cm(Cmx, Cmy)=Cm(128, 128) of the second region FG.

Specifically, the segmented image detection start coordinates S1(S1x, S1y) of the segmented image detection start position of the second segmented image SP1_2 in the personal authentication processing are set to S1(0, 0) (FIG. 38A). In this case, the fingerprint detection region setter 46 of the detector 40 allocates, as a segmented image detection region for acquiring the second segmented image SP1_2 of the second fingerprint image FP_2 for authentication, a region having a 64×256 size with a starting point at the segmented image detection start coordinates S1(0, 0) illustrated in FIG. 38A.

In addition, the segmented image detection start coordinates S2(S2x, S2y) of the segmented image detection start position of the second segmented image SP2_2 in the personal authentication processing are set to S2(64, 0) (FIG. 38B). In this case, the fingerprint detection region setter 46 of the detector 40 allocates, as a segmented image detection region for acquiring the second segmented image SP2_2 of the second fingerprint image FP_2 for authentication, a region having a 64×256 size with a starting point at the segmented image detection start coordinates S2(64, 0) illustrated in FIG. 38B. In other words, the second left segmented region when the second region FG defined based on the touch detection coordinates of a touch in the first region KY and having a 256×256 size is segmented into four in the first direction Dx is allocated.

In addition, the segmented image detection start coordinates S3(S3x, S3y) of the segmented image detection start position of the second segmented image SP3_2 in the personal authentication processing are set to S3(128, 0) (FIG. 38C). In this case, the fingerprint detection region setter 46 of the detector 40 allocates, as a segmented image detection region for acquiring the second segmented image SP3_2 of the second fingerprint image FP_2 for authentication, a region having a 64×256 size with a starting point at the segmented image detection start coordinates S3(128, 0) illustrated in FIG. 38C. In other words, the third left segmented region when the second region FG defined based on the touch detection coordinates of a touch in the first region KY and having a 256×256 size is segmented into four in the first direction Dx is allocated.

In addition, the segmented image detection start coordinates S4(S4x, S4y) of the segmented image detection start position of the second segmented image SP4_2 in the personal authentication processing are set to S4(192, 0) (FIG. 38D). In this case, the fingerprint detection region setter 46 of the detector 40 allocates, as a segmented image detection region for acquiring the second segmented image SP4_2 of the second fingerprint image FP_2 for authentication, a region having a 64×256 size with a starting point at the segmented image detection start coordinates S4(192, 0) illustrated in FIG. 38D. In other words, the fourth left segmented region when the second region FG defined based on the touch detection coordinates of a touch in the first region KY and having a 256×256 size is segmented into four in the first direction Dx is allocated.

The segmentation patterns (M_s_o) illustrated in FIG. 37 are stored in the fingerprint image storage 54 in advance. FIG. 39 is a diagram illustrating an example of the number of segments and segmentation positions in a fingerprint image in a case of a segmentation pattern illustrated in FIG. 37. FIG. 39 exemplarily illustrates the number of segments and segmentation positions in a case of the segmentation pattern (4_11_12) illustrated in FIG. 37.

In the present embodiment, the number M of segments of a fingerprint image is three or four. Each segmentation position of a fingerprint image in the present embodiment is a column Smx including a position at the segmented image detection start coordinates Sm(Smx, Smy). Specifically, the segmentation positions of the segmentation pattern (4_11_12) illustrated in FIG. 37 are S1x=0 (column 0), S2x=64 (column 64), S3x=128 (column 128), and S4x=192 (column 192).

Figure 40A:
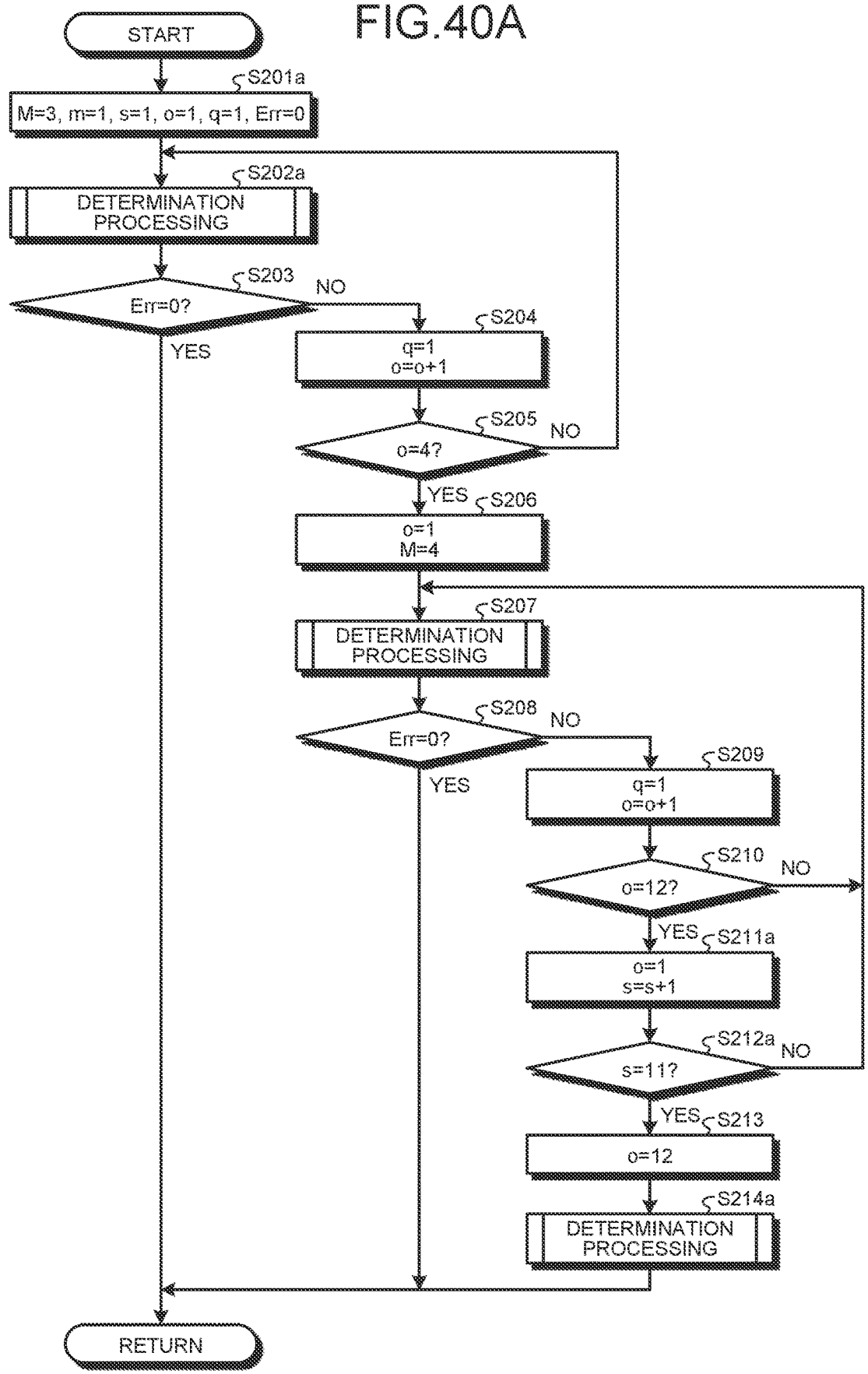
FIG. 40A is a sub flowchart illustrating exemplary segmentation pattern setting processing performed in a personal authentication system and a personal authentication device according to the second embodiment.
Figure 40B:
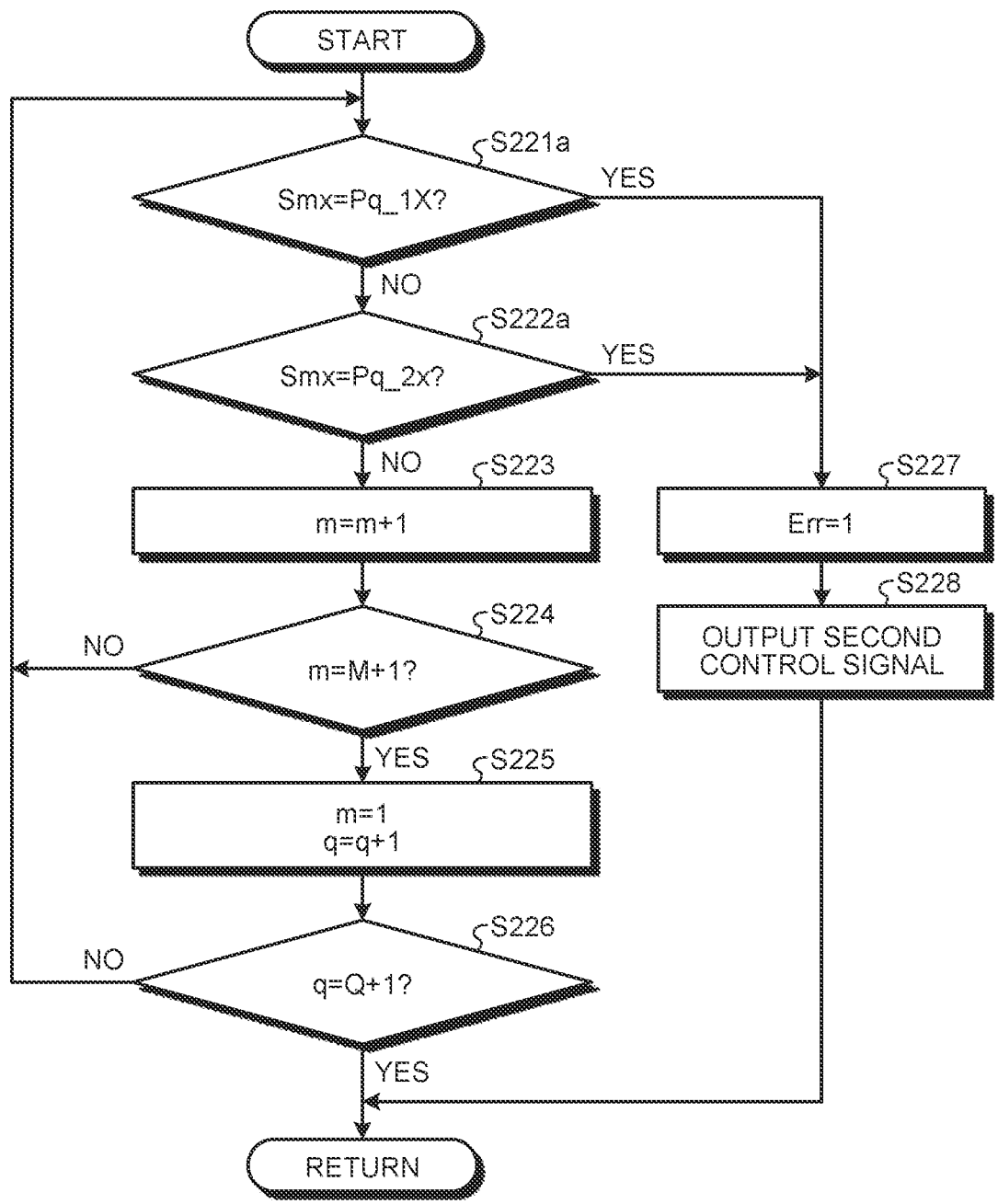
FIG. 40B is a sub flowchart illustrating exemplary segmentation pattern setting processing performed in the personal authentication system and the personal authentication device according to the second embodiment.

The following describes segmentation pattern setting processing in a specific example of a fingerprint registration method achieved by the detector 40 and the processor 50 in the personal authentication system 1 and the personal authentication device 1a according to the second embodiment. FIGS. 40A and 40B are sub flowcharts illustrating exemplary segmentation pattern setting processing performed in the personal authentication system and the personal authentication device according to the second embodiment. The procedure of fingerprint registration processing performed in the personal authentication system and the personal authentication device according to the second embodiment is the same as in FIG. 28 in the first embodiment. In addition, the sequence of fingerprint registration processing performed in the personal authentication system and the personal authentication device according to the second embodiment is the same as in FIG. 30 in the first embodiment.

In the second embodiment, at step S108 illustrated in FIG. 28, among the segmentation patterns (M_s_o) illustrated in FIG. 37, a segmentation pattern is set in which the segmentation positions Smx illustrated in FIG. 39 do not match the positions Pq_1x and Pq_2x in the first direction Dx of any feature point identification region CPq illustrated in FIG. 27.

The fingerprint image generator 55 performs initial setting of the number M of segments of a fingerprint image, the segmented image number m of a segmentation pattern, the segmented image size number s in the first direction Dx, the segmented image arrangement order number o, the feature point identification region number q, and the error flag Err as initial conditions in the segmentation pattern setting processing illustrated in FIG. 40A (step S201a). Specifically, in this example, the fingerprint image generator 55 sets M=3, m=1, s=1, o=1, q=1, Err=0 and proceeds to determination processing illustrated in FIG. 40B (step S202a in FIG. 40A).

The fingerprint image generator 55 sets the column Smx including the segmented image detection start coordinates Sm(Smx, Smy) in the segmented image SPm of the segmentation pattern (M_s_o) (refer to FIG. 39) as the segmentation position Smx. The fingerprint image generator 55 also sets a column Pq_1x including coordinates Pq_1(Pq_1x, Pq_1y) and Pq_3(Pq_2x, Pq_1y) of the feature point identification region CPq as the position Pq_1x of the feature point identification region CPq. The fingerprint image generator 55 determines whether the segmentation position Smx of the segmented image SPm matches the position Pq_1x of the feature point identification region CPq (Smx=Pq_1x) (step S221a).

When the segmentation position Smx of the segmented image SPm does not match the position Pq_1x of the feature point identification region CPq (No at step S221a), the fingerprint image generator 55 subsequently sets, as the position Pq_2x of the feature point identification region CPq, a column Pq_2x including coordinates Pq_2(Pq_1x, Pq_2y) and Pq_4(Pq_2x, Pq_2y) of the feature point identification region CPq and determines whether the segmentation position Smx of the segmented image SPm matches the position Pq_2x of the feature point identification region CPq (Smx=Pq_2x) (step S222a).

When the segmentation position Smx of the segmented image SPm does not match the position Pq_2x of the feature point identification region CPq (No at step S222a), the fingerprint image generator 55 increments the segmented image number m (m=m+1) (step S223) and determines whether the segmented image number m is equal to M+1 (in this example, M=3) (m=M+1) (step S224). When the segmented image number m is smaller than M+1 (No at step S224), the fingerprint image generator 55 returns to step S221a and repeatedly executes the processing starting at step S221a.

When the segmented image number m is equal to M+1 (m=4) (Yes at step S224), the fingerprint image generator 55 initializes the segmented image number m (m=1), increments the feature point identification region number q (q=q+1) (step S225), and determines whether the feature point identification region number q is equal to "the number Q of feature point identification regions"+1 (q=Q+1) (step S226). When the feature point identification region number q is smaller than "the number Q of feature point identification regions"+1 (No at step S226), the fingerprint image generator 55 returns to step S221a and repeatedly executes the processing starting at step S221a. When the feature point identification region number q is equal to "the number Q of feature point identification regions"+1 (q=Q+1) (Yes at step S226), the fingerprint image generator 55 returns to FIG. 40A.

When the segmentation position Smx of the segmented image SPm matches the position Pq_1x of the feature point identification region CPq at step S221a (Yes at step S221a) or when the segmentation position Smx of the segmented image SPm matches the position Pq_2x of the feature point identification region CPq at step S222a (Yes at step S222a), the fingerprint image generator 55 sets the error flag Err to "1" (Err=1) (step S227), outputs, to the detection controller 11, the second control signal for transition from the second period to the first period (step S228), and returns to FIG. 40A.

Referring back to FIG. 40A, the fingerprint image generator 55 determines whether the error flag Err is "0" (Err=0)

(step S203). When the error flag Err is "0" (Err=0) (Yes at step S203), the fingerprint image generator 55 returns to FIG. 28. When the error flag Err is "1" (Err=1) (No at step S203), the fingerprint image generator 55 initializes the feature point identification region number q (q=1), increments the segmented image arrangement order number o (o=o+1) (step S204), and determines whether the segmented image arrangement order number o is four (o=4) (step S205). When the segmented image arrangement order number o is smaller than four (No at step S205), the fingerprint image generator 55 returns to the determination processing illustrated in FIG. 40B (step S202a in FIG. 40A) and repeatedly executes the subsequent processing.

When the segmented image arrangement order number o is four (o=4) at step S205 (Yes at step S205), the fingerprint image generator 55 initializes the segmented image arrangement order number o (o=1), sets the number M of segments of a fingerprint image to 4 (step S206), and proceeds to the determination processing illustrated in FIG. 40B (step S207 in FIG. 40A).

Subsequently, the fingerprint image generator 55 determines whether the segmentation position Smx of the segmented image SPm matches the position Pq_1x of the feature point identification region CPq (Smx=Pq_1x) (step S221a).

When the segmentation position Smx of the segmented image SPm does not match the position Pq_1x of the feature point identification region CPq (No at step S221a), the fingerprint image generator 55 subsequently determines whether the segmentation position Smx of the segmented image SPm matches the position Pq_2x of the feature point identification region CPq (Smx=Pq_2x) (step S222a).

When the segmentation position Smx of the segmented image SPm does not match the position Pq_2x of the feature point identification region CPq (No at step S222a), the fingerprint image generator 55 increments the segmented image number m (m=m+1) (step S223) and determines whether the segmented image number m is equal to M+1 (in this example, M=4) (m=M+1) (step S224). When the segmented image number m is smaller than five (No at step S224), the fingerprint image generator 55 returns to step S221a and repeatedly executes the processing starting at step S221a.

When the segmented image number m is equal to M+1 (m=5) (Yes at step S224), the fingerprint image generator 55 initializes the segmented image number m (m=1), increments the feature point identification region number q (q=Q+1) (step S225), and determines whether the feature point identification region number q is equal to "the number Q of feature point identification regions"+1 (q=Q+1) (step S226). When the feature point identification region number q is smaller than "the number Q of feature point identification regions"+1 (No at step S226), the fingerprint image generator 55 returns to step S221a and repeatedly executes the processing starting at step S221a. When the feature point identification region number q is equal to "the number Q of feature point identification regions"+1 (q=Q+1) (Yes at step S226), the fingerprint image generator 55 returns to FIG. 40A.

When the segmentation position Smx of the segmented image SPm matches the position Pq_1x of the feature point identification region CPq at step S221a (Yes at step S221a) or when the segmentation position Smx of the segmented image SPm matches the position Pq_2x of the feature point identification region CPq at step S222a (Yes at step S222a), the fingerprint image generator 55 sets the error flag Err to "1" (Err=1) (step S227), outputs, to the detection controller 11, the second control signal for transition from the second period to the first period (step S228), and returns to FIG. 40A.

Referring back to FIG. 40A, the fingerprint image generator 55 determines whether the error flag Err is "0" (Err=0) (step S208). When the error flag Err is "0" (Err=0) (Yes at step S208), the fingerprint image generator 55 returns to FIG. 28. When the error flag Err is "1" (Err=1) (No at step S208), the fingerprint image generator 55 initializes the feature point identification region number q (q=1), increments the segmented image arrangement order number o (o=o+1) (step S209), and determines whether the segmented image arrangement order number o is 12 (o=12) (step S210). When the segmented image arrangement order number o is smaller than 12 (No at step S210), the fingerprint image generator 55 returns to the determination processing illustrated in FIG. 29B (step S207 in FIG. 40A) and repeatedly executes the subsequent processing.

When the segmented image arrangement order number o is 12 (Yes at step S210), the fingerprint image generator 55 initializes the segmented image arrangement order number o (o=1), increments the segmented image size number s in the first direction Dx (s=s+1) (step S211a), and determines whether the segmented image size number s in the first direction Dx is 11 (s=11) (step S212a). When the segmented image size number s in the first direction Dx is smaller than 11 (No at step S212a), the fingerprint image generator 55 returns to the determination processing illustrated in FIG. 40B (step S207 in FIG. 40A) and repeatedly executes the subsequent processing.

When the segmented image size number s in the first direction Dx is 11 (s=11) at step S212a (Yes at step S212a), the fingerprint image generator 55 sets the segmented image arrangement order number o to 12 (step S213) and proceeds to the determination processing illustrated in FIG. 40B (step S214a in FIG. 40A).

Subsequently, the fingerprint image generator 55 determines whether the segmentation position Smx of the segmented image SPm matches the position Pq_1x of the feature point identification region CPq (Smx=Pq_1x) (step S221a).

When the segmentation position Smx of the segmented image SPm does not match the position Pq_1x of the feature point identification region CPq (No at step S221a), the fingerprint image generator 55 subsequently determines whether the segmentation position Smx of the segmented image SPm matches the position Pq_2x of the feature point identification region CPq (Smx=Pq_2x) (step S222a).

When the segmentation position Smx of the segmented image SPm does not match the position Pq_2x of the feature point identification region CPq (No at step S222a), the fingerprint image generator 55 increments the segmented image number m (m=m+1) (step S223) and determines whether the segmented image number m is equal to M+1 (in this example, M=4) (m=M+1) (step S224). When the segmented image number m is smaller than five (No at step S224), the fingerprint image generator 55 returns to step S221a and repeatedly executes the processing starting at step S221a.

When the segmented image number m is equal to M+1 (m=5) (Yes at step S224), the fingerprint image generator 55 initializes the segmented image number m (m=1), increments the feature point identification region number q (q=q+1) (step S225), and determines whether the feature point identification region number q is equal to "the number Q of feature point identification regions"+1 (q=Q+1) (step S226). When the feature point identification region number q is smaller than "the number Q of feature point identification regions"+1 (No at step S226), the fingerprint image generator 55 returns to step S221a and repeatedly executes the processing starting at step S221a. When the feature point identification region number q is equal to "the number Q of feature point identification regions"+1 (q=Q+1) (Yes at step S226), the fingerprint image generator 55 returns to FIG. 40A.

When the segmentation position Smx of the segmented image SPm matches the position Pq_1x of the feature point identification region CPq at step S221a (Yes at step S221a) or when the segmentation position Smx of the segmented image SPm matches the position Pq_2x of the feature point identification region CPq at step S222a (Yes at step S222a), the fingerprint image generator 55 sets the error flag Err to "1" (Err=1) (step S227), outputs, to the detection controller 11, the second control signal for transition from the second period to the first period (step S228), and returns to FIG. 40A.

Referring back to FIG. 28 from the segmentation pattern setting processing illustrated in FIG. 40A, the fingerprint image generator 55 determines whether the error flag Err is "0" (Err=0) (step S108a). When the error flag Err is "0" (Err=0) (Yes at step S108a), the number M of segments of the segmented images, the segmented image size number s in the first direction Dx, and the segmented image arrangement order number o are determined.

Specifically, when the error flag Err is "0" (Err=0) at step S203 in FIG. 40A (Yes at step S203), the segmentation pattern (M_s_o) corresponding to the first fingerprint image FP_1 for collation is determined to be any of the segmentation patterns (3_1_1), (3_1_2), and (3_1_3) illustrated in FIG. 37. In the determined segmentation pattern (3_1_0), each feature point identification region CPq is included in any of the segmented images SPm. Thus, the total number of feature points in the three first segmented images SPm_1 after segmentation matches the number of feature points in the first fingerprint image FP_1 before segmentation.

When the error flag Err is "0" (Err=0) at step S208 in FIG. 40A (Yes at step S208), the segmentation pattern (M_s_o) corresponding to the first fingerprint image FP_1 for collation is determined to be any of the segmentation patterns (4_1_1) to (4_1_11), (4_2_1) to (4_2_11), (4_3_1) to (4_3_11), (4_4_1) to (4_4_11), (4_5_1) to (4_5_11), (4_6_1) to (4_6_11), (4_7_1) to (4_7_11), (4_8_1) to (4_8_11), (4_9_1) to (4_9_11), and (4_10_1) to (4_10_11) illustrated in FIG. 37. In the determined segmentation pattern (4_s_o), each feature point identification region CPq is included in any of the segmented images SPm. Thus, the total number of feature points in the four first segmented images SPm_1 after segmentation matches the number of feature points in the first fingerprint image FP_1 before segmentation.

When the error flag Err is determined to be "0" (Err=0) in the determination processing (FIG. 40B) at step S214a in FIG. 40A, the segmentation pattern (M_s_o) is determined to be the segmentation pattern (4_11_12) corresponding to the first fingerprint image FP_1 for collation. In this case, the total number of feature points in the four first segmented images SPm_1 after segmentation matches the number of feature points in the first fingerprint image FP_1 before segmentation.

When the error flag Err is determined to be "1" (Err=1) in the determination processing (FIG. 40B) at step S214a in FIG. 40A, in other words, when the error flag Err is "1" at step S108a (No at step S108a), the fingerprint image generator 55 returns to step S101 and repeatedly executes the above-described processing until the error flag Err is "0" at step S108a (Yes at step S108a).

When the error flag Err is "0" (Err=0) at step S108a (Yes at step S108a), the fingerprint image generator 55 segments the first fingerprint image FP_1 for collation into the M first segmented images SPm_1 in accordance with the determined segmentation pattern (M_s_o) (step S109) and associates and stores the first segmentation images SPm_1 and the determined segmentation pattern (M_s_o) in the fingerprint image storage 54. Then, the fingerprint image generator 55 outputs, to the detection controller 11, the second control signal for transition from the second period to the first period (step S110) and ends the fingerprint registration processing.

Through the above-described processing, similarly to the first embodiment, it is possible to set a segmentation pattern in which no segmentation positions of the first segmented images SPm_1 overlap any feature point identification region CP. Thus, the number of feature points in the first fingerprint image FP_1 matches the total number of feature points in the first segmented images SPm_1, and duplication and omission of registration of feature points in each first segmented image SPm_1 after segmentation are prevented.

The example in which the fingerprint image FP is segmented in the second direction Dy is described in the first embodiment, and the example in which the fingerprint image FP is segmented in the first direction Dx is described in the second embodiment. However, the segmentation direction of the fingerprint image FP is not limited to any of the first direction Dx and the second direction Dy.

Specifically, for example, in the segmentation pattern setting processing according to the first embodiment (FIGS. 29A and 29B), when a segmentation position Smy illustrated in FIG. 24 matches either of the positions Pq_1y and Pq_2y of a feature point identification region CPq illustrated in FIG. 27 in the second direction Dy in all segmentation patterns illustrated in FIG. 21, the segmentation direction of the fingerprint image FP may be changed from the second direction Dy to the first direction Dx, and transition may be made to the segmentation pattern setting processing (FIGS. 40A and 40B) according to the second embodiment.

In addition, for example, in the segmentation pattern setting processing (FIGS. 40A and 40B) according to the second embodiment, when a segmentation position Smx illustrated in FIG. 39 matches either of the positions Pq_1x and Pq_2x of a feature point identification region CPq illustrated in FIG. 27 in the first direction Dx in all segmentation patterns illustrated in FIG. 37, the segmentation direction of the fingerprint image FP may be changed from the first direction Dx to the second direction Dy, and transition may be made to the segmentation pattern setting processing according to the first embodiment (FIGS. 29A and 29B).

Thus, it is possible to further increase the effect of preventing duplication and omission of registration of feature points in each first segmented image SPm_1 after segmentation.

In an example described above in each embodiment, a sensor exploiting the principle of capacitive detection is applied as a detection device, but the aspect of a sensor as a detection device is not limited thereto. Specifically, a sensor as a detection element may be constituted by, for example, a plurality of photodetectors such as organic photodiodes.

Preferable embodiments of the present disclosure are described above, but the present disclosure is not limited to such embodiments. Contents disclosed in the embodiments are merely exemplary, and various kinds of modifications are possible without departing from the scope of the present disclosure. Any modification performed as appropriate without departing from the scope of the present disclosure belongs to the technical scope of the present disclosure.

What is claimed is:

1. A personal authentication system configured to execute fingerprint authentication processing by collating a first fingerprint image registered at fingerprint registration with a second fingerprint image acquired at personal authentication, the personal authentication system comprising:
a detection device configured to detect a touch position on a sensor and fingerprint data; and
a control device configured to generate the first fingerprint image based on fingerprint data acquired at the fingerprint registration, segment the first fingerprint image into a plurality of first segmented images, and register the first segmented images, wherein
the control device holds a plurality of segmentation patterns in each of which a segmentation direction of a fingerprint image, the number of segments, and relative sizes of segmented images are defined, and
at the fingerprint registration, the control device sets, among the segmentation patterns, a segmentation pattern in which no segmentation position of the first fingerprint image overlaps any feature point identification region that is identifiable as a feature point on a fingerprint image, segments the first fingerprint image into a plurality of first segmented images based on the set segmentation pattern, and registers the first segmented images.

2. The personal authentication system according to claim 1, wherein the number of feature points on the first fingerprint image matches the total number of feature points on the first segmented images.

3. The personal authentication system according to claim 1, wherein at the fingerprint registration, when a first segmentation pattern is selected from among the segmentation patterns and a segmentation position of the first fingerprint image overlaps the feature point identification region, the control device sets a second segmentation pattern in which the number of segments of a fingerprint image is different from the number of segments of a fingerprint image in the first segmentation pattern.

4. The personal authentication system according to claim 1, wherein at the fingerprint registration, when a first segmentation pattern is selected from among the segmentation patterns and a segmentation position of the first fingerprint image overlaps the feature point identification region, the control device sets a second segmentation pattern in which the relative sizes of segmented images are different from the relative sizes of segmented images in the first segmentation pattern.

5. The personal authentication system according to claim 1, wherein at the fingerprint registration, when a first segmentation pattern is selected from among the segmentation patterns and a segmentation position of the first fingerprint image overlaps the feature point identification region, the control device sets a second segmentation pattern in which the segmentation direction of a fingerprint image is different from the segmentation direction of a fingerprint image in the first segmentation pattern.

6. The personal authentication system according to claim 1, wherein the control device registers, in association with the first segmented images, a segmentation pattern set at the fingerprint registration.

7. The personal authentication system according to claim 6, wherein the control device acquires a plurality of second segmented images constituting the second fingerprint image by applying the segmentation pattern registered in association with the first segmented images based on fingerprint data acquired at the personal authentication.

8. The personal authentication system according to claim 7, wherein the control device executes the fingerprint authentication processing for each of the second segmented images corresponding to the respective first segmented images, at the personal authentication.

9. The personal authentication system according to claim 7, wherein at personal authentication, the control device reconstructs the first fingerprint image by compositing the first segmented images, generates the second fingerprint image by compositing the second segmented images, and executes the fingerprint authentication processing.

10. The personal authentication system according to claim 7, wherein
the detection device has a plurality of first regions as input keys for a password on the sensor, and
at the personal authentication, the control device sets a second region having center coordinates at touch detection coordinates of a touch detection position detected in the first region at each key inputting of the password and acquires the second segmented images based on fingerprint data acquired in the second region.

11. The personal authentication system according to claim 1, wherein the control device
includes a storage configured to store the first segmented images, and
stores the first segmented images at respective different addresses in a storage region in the storage at the fingerprint registration.

12. A personal authentication device configured to execute fingerprint authentication processing by collating a first fingerprint image registered at fingerprint registration with a second fingerprint image acquired at personal authentication, the personal authentication device comprising:
a detector configured to detect a touch position on a sensor and fingerprint data; and
a processor configured to generate the first fingerprint image based on fingerprint data acquired at the fingerprint registration, segment the first fingerprint image into a plurality of first segmented images, and register the first segmented images, wherein
the processor holds a plurality of segmentation patterns in each of which a segmentation direction of a fingerprint image, the number of segments, and relative sizes of segmented images are defined, and
at the fingerprint registration, the processor sets, among the segmentation patterns, a segmentation pattern in which no segmentation position of the first fingerprint image overlaps any feature point identification region that is identifiable as a feature point on a fingerprint image, segments the first fingerprint image into a plurality of first segmented images based on the set segmentation pattern, and registers the first segmented images.

13. The personal authentication device according to claim 12, wherein the number of feature points on the first fingerprint image matches the total number of feature points on the first segmented images.

14. The personal authentication device according to claim 12, wherein at the fingerprint registration, when a first segmentation pattern is selected from among the segmentation patterns and a segmentation position of the first fingerprint image overlaps the feature point identification region, the processor sets a second segmentation pattern in which the number of segments of a fingerprint image is different from the number of segments of a fingerprint image in the first segmentation pattern.

15. The personal authentication device according to claim 12, wherein at the fingerprint registration, when a first segmentation pattern is selected from among the segmentation patterns and a segmentation position of the first fingerprint image overlaps the feature point identification region, the processor sets a second segmentation pattern in which the relative sizes of segmented images are different from the relative sizes of segmented images in the first segmentation pattern.

16. The personal authentication device according to claim 12, wherein at the fingerprint registration, when a first segmentation pattern is selected from among the segmentation patterns and a segmentation position of the first fingerprint image overlaps the feature point identification region, the processor sets a second segmentation pattern in which the segmentation direction of a fingerprint image is different from the segmentation direction of a fingerprint image in the first segmentation pattern.

17. The personal authentication device according to claim 12, wherein the processor registers, in association with the first segmented images, a segmentation pattern set at the fingerprint registration.

18. The personal authentication device according to claim 17, wherein the processor acquires a plurality of second segmented images constituting the second fingerprint image by applying the segmentation pattern registered in association with the first segmented images based on fingerprint data acquired at the personal authentication.

19. The personal authentication device according to claim 18, wherein the processor executes the fingerprint authentication processing for each of the second segmented images corresponding to the respective first segmented images, at the personal authentication.

20. The personal authentication device according to claim 18, wherein at personal authentication, the processor reconstructs the first fingerprint image by compositing the first segmented images, generates the second fingerprint image by compositing the second segmented images, and executes the fingerprint authentication processing.

21. The personal authentication device according to claim 18, wherein
the detector has a plurality of first regions as input keys for a password on the sensor, and
at the personal authentication, the processor sets a second region having center coordinates at touch detection coordinates of a touch detection position detected in the first region at each key inputting of the password and acquires the second segmented images based on fingerprint data acquired in the second region.

22. The personal authentication device according to claim 12, wherein the processor
includes a storage configured to store the first segmented images, and
stores the first segmented images at respective different addresses in a storage region in the storage at the fingerprint registration.

* * * * *